(12) United States Patent  
Wickramasinghe et al.

(10) Patent No.: US 9,132,389 B2  
(45) Date of Patent: Sep. 15, 2015

(54) MAGNETICALLY RESPONSIVE MEMBRANES

(75) Inventors: Sumith Ranil Wickramasinghe, Fayetteville, AR (US); Xianghong Qian, Fayetteville, AR (US); Heath H. Himstedt, Fort Collins, CO (US); Mathias Ulbricht, Berlin (DE); Michael J. Semmens, St. Paul, MN (US)

(73) Assignee: Colorado State University Research Foundation, Fort Collins, CO (US)

( * ) Notice: Subject to any disclaimer, the term of this patent is extended or adjusted under 35 U.S.C. 154(b) by 618 days.

(21) Appl. No.: 13/570,003

(22) Filed: Aug. 8, 2012

(65) Prior Publication Data

US 2014/0231351 A1    Aug. 21, 2014

Related U.S. Application Data

(60) Provisional application No. 61/521,021, filed on Aug. 8, 2011, provisional application No. 61/535,433, filed on Sep. 16, 2011.

(51) Int. Cl.
| | |
|---|---|
| *B01D 39/00* | (2006.01) |
| *B01D 39/14* | (2006.01) |
| *B01D 63/00* | (2006.01) |
| *B01D 61/00* | (2006.01) |

(Continued)

(52) U.S. Cl.  
CPC .......... *B01D 67/0079* (2013.01); *B01D 65/08* (2013.01); *B01D 69/02* (2013.01); *B01D 69/10* (2013.01); *B01D 69/12* (2013.01); *B01D 69/148* (2013.01); *B01D 71/78* (2013.01); *B01D 71/40* (2013.01); *B01D 71/56* (2013.01); *B01D 71/68* (2013.01); *B01D 2311/2607* (2013.01); *B01D 2321/24* (2013.01); *B01D 2323/38* (2013.01); *B01D 2325/36* (2013.01); *B01D 2325/46* (2013.01)

(58) Field of Classification Search  
CPC ............... B01D 21/00; B01D 2325/36; B01D 2325/46; B01D 67/0079; B01D 69/02; B01D 69/12; B01D 69/148; B01D 71/56; B01D 71/82; B01D 69/141; B01D 71/60  
USPC .......... 210/502.1, 500.35, 490, 321.6; 427/44  
See application file for complete search history.

(56) References Cited

U.S. PATENT DOCUMENTS 3,497,394 A * 2/1970 Berger .......................... 429/300  
4,177,228 A * 12/1979 Prolss .......................... 264/413

(Continued)

OTHER PUBLICATIONS

Sadati et al, "Covalently modified magneticite nanoparticles with PEG:preparation as anonoadsrobentt for removal of lead from wastewater"; Journal of Environmental Health Science and Engineering, 2014, 12:103, Aug. 8, 2014.*

(Continued)

*Primary Examiner* — Ana Fortuna  
(74) *Attorney, Agent, or Firm* — Haukaas Fish PLLP; Michael Haukaas

(57) ABSTRACT

The invention provides permeable magnetically responsive filtration membranes that include a filtration membrane polymer base suitable for fluid filtration; hydrophilic polymers conjugated to the surface of the filtration membrane polymer; and magnetic nanoparticles affixed to the ends of a plurality of the hydrophilic polymers, wherein the hydrophilic polymers are movable with respect to the surface of the filtration membrane polymer surface in the presence of an oscillating magnetic field.

18 Claims, 28 Drawing Sheets

(51) Int. Cl.
  *B01D 67/00* (2006.01)
  *B01D 69/14* (2006.01)
  *B01D 65/08* (2006.01)
  *B01D 69/02* (2006.01)
  *B01D 69/10* (2006.01)
  *B01D 69/12* (2006.01)
  *B01D 71/78* (2006.01)
  *B01D 71/40* (2006.01)
  *B01D 71/56* (2006.01)
  *B01D 71/68* (2006.01)

(56) References Cited

U.S. PATENT DOCUMENTS

| | | | |
|---|---|---|---|
| 5,582,892 A * | 12/1996 | Anderson | 428/64.1 |
| 7,669,719 B2 * | 3/2010 | Ramaswamy et al. | 210/490 |
| 8,177,978 B2 * | 5/2012 | Kurth et al. | 210/652 |
| 8,481,336 B2 * | 7/2013 | Earhart et al. | 436/526 |
| 2004/0118757 A1 * | 6/2004 | Terstappen et al. | 210/94 |
| 2009/0053512 A1 | 2/2009 | Pyun et al. | |
| 2011/0266492 A1 | 11/2011 | Stayton et al. | |
| 2012/0018382 A1 * | 1/2012 | Stein | 210/663 |
| 2012/0145601 A1 | 6/2012 | Lee | |
| 2012/0168383 A1 * | 7/2012 | Koo et al. | 210/688 |
| 2014/0255696 A1 * | 9/2014 | Tang et al. | 428/402 |
| 2014/0288398 A1 * | 9/2014 | Simberg et al. | 600/309 |
| 2014/0369938 A1 * | 12/2014 | Pattayil et al. | 424/9.32 |

OTHER PUBLICATIONS

Biswal et al., "Micromixing with linked chains of paramagnetic particles," Anal. Chem. (2004) 76: 6448-6455.

Biswal et al., "Rotational dynamics of semiflexible paramagnetic particle chains," Physical Review (2004) 69: 041406-1-041406-9.

Edelman et al., "Regulation of drug release from polymer matrices by oscillating magnetic fields," Journal of Biomedical Materials Research (1985) 19: 67-83.

Fernandez et al., "Thinking in terms of structure-activity-relationships (T-SAR): A tool to better understand nanofiltration membranes," Membranes (2011) 1: 162-183.

Franke et al., "Magneto-mechanical mixing and manipulation of picoliter volumes in vesicles," Lab Chip (2009) 9: 2831-2835.

Freger, V., "Nanoscale heterogeneity of polyamide membranes formed by interfacial polymerization," Langmuir (2003) 19: 4791-4797.

Hoare et al., "A magnetically triggered composite membrane for on-demand drug delivery," Nano Letters (2009) 9 (10): 3651-3657.

Lu et al., "A magnetic microstirrer and array for microfluidic mixing," Journal of Microelectromechanical Systems, (2002) 11 (5): 462-469.

Hackney et al., "Cost assessment of produced water treatment," (1996).

Schlemmer et al., "The design of thin polymer membranes filled with magnetic particles on a microstructured silicon surface," Nanotechnology (2009) 20: 1-9.

Singh et al., "Rigid, superparamagnetic chains of permanently linked beads coated with magnetic nanoparticles. Synthesis and rotational dynamics under applied magnetic fields," Langmuir (2005) 21: 11500-11509.

Stuart et al., "Emerging applications of stimuli-responsive polymer materials," Nature Materials (2010) 9: 101-113.

Susanto et al., "Photografted thin polymer hydrogel layers on PES ultrafiltration membranes: Characterization, stability, and influence on separation performance," Langmuir (2007) 23: 7818-7830.

Tomer et al., "Modification of nanofiltration membranes by surface-initiated atom transfer radical polymerization for produced water filtration," Separation Science and Technology (2009) 44: 3346-3368.

Ulbricht et al., "Porous polypropylene membranes with different carboxyl polymer brush layers for reversible protein binding via surface-initiated graft copolymerization," Chem. Mater. (2005) 17: 2622-2631.

Wandera et al., "Stimuli-responseive membranes," Journal of Membrane Science (2010) 357: 6-35.

Ying et al., "Characterization of membranes prepared from blends of poly(acrylic acid)-graft-poly(vinylidene fluoride) with poly(N-isopropylacrylamide) and their temperature-and pH-sensitive microfiltration," Journal of Membrane Science (2003) 224: 93-106.

* cited by examiner

MAGNETICALLY RESPONSIVE MEMBRANES

RELATED APPLICATIONS

This application claims priority under 35 U.S.C. §119(e) to U.S. Provisional Patent Application Nos. 61/535,433 filed Sep. 16, 2011, and 61/521,021 filed Aug. 8, 2011, which applications are incorporated herein by reference.

GOVERNMENT SUPPORT

This invention was made with government support under Grant No. W912HQ-09-C-0002 awarded by the U.S. Army Corp of Engineers and under Grant No. CBET1066505 awarded by the National Science Foundation. The government has certain rights in the invention.

BACKGROUND OF THE INVENTION

Synthetic membranes have become important tools for separation and reaction engineering. An important driving force for developing advanced membranes is the need for more efficient technologies that produce and recycle pure fluids, particularly water. Membranes for pressure-driven filtration procedures, such as reverse osmosis (RO), nanofiltration (NF), and ultrafiltration (UF), play a crucial role. However, in many applications, concentration polarization and membrane fouling limit membrane selectivity, capacity, and productivity. Filtration membranes prone to fouling have only limited usefulness, particularly for applications such as water treatment.

Numerous studies have shown that a variety of factors, not all of them independent, lead to membrane fouling. Fouling is the reduction of membrane performance due to deposition of matter on or in the selective barrier of the membrane. Fouling decreases membrane performance over time by reducing membrane selectivity (ability to separate components) and capacity (throughput). Fouling is often accelerated by concentration polarization. Concentration polarization occurs during tangential flow filtration and is due to convection of rejected species to the membrane surface by the permeate flow. Concentration polarization may be reduced by inducing mixing at the membrane surface to disrupt the boundary layer that forms.

Countermeasures against fouling include optimizing module design, inducing mixing during operation (cross-flow velocity, back pulsing), pretreatment of the feed, and surface modification of the membrane. The latter approach can largely reduce the adsorption or adhesion strength of colloidal or particular foulants, leading to less deposition and/or easier removal of fouling layers. The post-modification of established membranes has become an important approach. Examples of anti-fouling modification can be found in the literature, for instance, based on grafting thin layers of hydrophilic polymers to the surface of RO, NF or UF membranes. While such membranes typically have helpful "static" properties, more sophisticated strategies are based on so called responsive membranes. By using responsive membranes, fouling can be reduced or cleaning can be facilitated by surface properties (e.g., hydrophilicity, charge, modulus) that can be changed by external stimuli, e.g., pH value or temperature. However, with all such modified or even responsive membranes, concentration polarization cannot be influenced directly.

Although the use of membrane technology in industry is increasing, there is still a very real need to create fouling resistant membranes that are adaptable to a wide range of feeds. Accordingly, new polymeric liquid filtration membranes that have fouling resistant properties are needed by industry for numerous applications, including water filtration. There is also a need for filtration membranes that are adaptable to a wide range of feeds and that do not require the modification of bulk feeds to maintain their enhanced fouling resistance properties.

SUMMARY

Concentration polarization and membrane fouling during the filtration of a fluid are caused by accumulation of dissolved and suspended solutes, including colloids, organic salts, proteins, and the like, on or near the membrane surface. Concentration polarization and membrane fouling reduce the efficiency and effectiveness of filtration membranes, thereby reducing the purity of the filtered fluid. The invention provides a novel approach to reduce concentration polarization and fouling during filtration. One approach includes using magnetically responsive micromixing membranes that, upon activation, significantly reduce concentration polarization and membrane fouling, thereby increasing the efficiency of the filtration and increasing the purity of the effluent.

The micromixing can be initiated by magnetically activated polymer brushes on the membrane surface, which creates mixing at the membrane interface. Mixing at the membrane interface can suppress the deposition of particulate matter, break up the concentration boundary layer, and improve membrane performance as a result of the movement of the magnetically activated polymer brushes on the membrane surface.

Accordingly, the invention provides a magnetically responsive filtration membrane that includes a filtration membrane polymer suitable for fluid filtration; a plurality of hydrophilic polymer brushes conjugated to the surface of the filtration membrane polymer; and a plurality of magnetic nanoparticles covalently bonded to a plurality of the hydrophilic polymers. The hydrophilic polymers are movable with respect to the surface of the filtration membrane polymer surface in the presence of an oscillating magnetic field. The magnetic nanoparticles can be attached at a variety of positions along the hydrophilic polymer brushes such as at the end, near the end, or at any location that is at least about 10 nm from the surface of the membrane polymer. Thus, it can be convenient or advantageous to attach the nanoparticles to the ends of the hydrophilic polymers, or substantially near the ends, so that the polymer brushes are sufficiently mobile with respect to the surface of the filtration membrane to affect the boundary layer and membrane fouling.

The filtration membrane suitable for fluid filtration can be microfiltration (MF) membranes, ultrafiltration (UF) membranes, nanofiltration (NF) membranes, or reverse osmosis (RO) membranes. For example, the filtration membrane polymer suitable for fluid filtration can be a polyamide composite nanofiltration (NF) membrane or a polyester microfiltration (MF) membrane. In one embodiment, the filtration membrane polymer suitable for fluid filtration can include a top layer of a semi-aromatic poly(piperazinamide). The layer can be less than about 75 nm thick, less than about 50 nm thick, or less than about 25 nm thick. The layer can reside on top of another polymer membrane such as a porous polysulphone membrane and/or a non-woven polyester support.

The specific hydrophilic polymers is not critical to the invention so long at the polymer can be attached to the base membrane and to a magnetic nanoparticle or its coating. Examples of some specific hydrophilic polymers include poly(2-hydroxyethyl methacrylate) (PHEMA), poly(tert-butyl methacrylate) (PTBMA), poly(acrylic acid) (PAA), combinations thereof, and copolymers including such polymers or derivatives of such polymers. The hydrophilic polymers are end-capped with a variety of different magnetic nanoparticles including paramagnetic nanoparticles and superparamagnetic nanoparticles. In one embodiment, a plurality of the hydrophilic polymers are end-capped with superparamagnetic iron oxide magnetite ($Fe_3O_4$) nanoparticles having diameters of about 10 nm to about 100 nm.

The diameter of the magnetic nanoparticles can be about 5 nm to about 500 nm. The length of the hydrophilic polymer brushes can be about 15 nm to about 1200 nm, or about 20 nm to about 150 nm. Additionally, the degree of grafting of the hydrophilic polymer brushes can be about 10 $\mu g/cm^2$ to about 250 $\mu g/cm^2$.

The invention also provides methods of preparing magnetically responsive filtration membranes. The method can include installing (e.g., conjugating or growing via living polymerization) hydrophilic polymers onto a surface of a filtration membrane polymer that is suitable for fluid filtration, thereby forming a plurality of hydrophilic polymer brushes on the surface of the filtration membrane polymer; and attaching a plurality of magnetic nanoparticles to ends of a plurality of the hydrophilic polymers to provide magnetic nanoparticle end-capped hydrophilic polymers. The magnetic nanoparticle end-capped hydrophilic polymers are movable with respect to the surface of the filtration membrane polymer surface in the presence of an oscillating magnetic field.

The hydrophilic polymer brushes can be grafted to the surface of a filtration membrane polymer via controlled surface-initiated atom transfer radical polymerization (SI-ATRP) or another suitable polymerization or conjugation technique. The surface of the filtration membrane polymer can include a thin layer of a semi-aromatic poly(piperazinamide) on top of a porous polysulphone membrane and a non-woven polyester support, and the hydrophilic polymer brushes can be then end-capped with magnetic nanoparticles such as superparamagnetic nanoparticles. The magnetic nanoparticles can be superparamagnetic iron oxide magnetite ($Fe_3O_4$) nanoparticles, for example, having diameters of about 5 nm to about 500 nm, and the length of the hydrophilic polymer brushes can be about 15 nm to about 1200 nm, or about 20 nm to about 150 nm.

The invention also provides magnetically responsive fluid filtration systems that include a magnetically responsive filtration membrane and an oscillating magnetic field apparatus. The oscillating magnetic field apparatus can include, for example two solenoids. A plurality of hydrophilic polymer brushes can be attached (conjugated or grown via living polymerization) to the surface of a filtration membrane polymer suitable for fluid filtration. A plurality of magnetic nanoparticles can be covalently bonded to the ends of a plurality of the hydrophilic polymers, to provide the magnetically responsive filtration membranes. The hydrophilic polymers are movable with respect to the surface of the filtration membrane polymer surface in the presence of an oscillating magnetic field. The magnetically responsive filtration membrane can be located inside an optionally pressurized filtration cell and the cell can be located within the oscillating magnetic field apparatus (for example, between two solenoids) so that a membrane barrier layer during filtration is normal to a magnetic field generated along a longitudinal axis of the oscillating magnetic field apparatus (e.g., the solenoids). The alternating magnetic field apparatus can include two solenoids, and the alternating magnetic field apparatus can be controlled by a CPU.

The invention further provides methods of filtering a fluid comprising passing a fluid through a fluid filtration system described herein while applying an oscillating field to induce motion of the magnetic nanoparticles bonded to the ends of hydrophilic polymers, thereby reducing concentration polarization and membrane fouling. The magnetically responsive fluid filtration system can effectively reject one or more of colloids, aggregates, salts, metal ions, fatty acids, oils, and proteins.

The invention also provides a method of improving mass transfer of a membrane by disrupting concentration polymerization, a method of reducing the rate of cake formation at the membrane surface, and a method to improve the cleaning of a membrane after filtration. The cleaning of a membrane after a filtration process can include removing a filter cake or adhering fouling layer from the polymer membrane surface and/or from the area of the polymer brushes.

The invention thus provides the novel polymers, filters, and methods described herein, intermediates for the synthesis of such polymers and filters, as well as methods of preparing and using the polymers and filters. The invention also provides polymers that are useful as intermediates for the synthesis of other useful polymers and filters. The invention further provides for the use of the polymers for the manufacture of systems useful for the treatment of fluids, such as industrial water and produced water.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 22).

DETAILED DESCRIPTION

The invention provides magnetically responsive micromixing membranes, and methods of making and using such membranes. For example, hydrophilic polymer chains such as poly(2-hydroxyethyl methacrylate) (PHEMA) can be grafted via controlled surface-initiated atom transfer radical polymerization (SI-ATRP) on the surface of polyamide composite nanofiltration (NF) membranes and then end-capped with superparamagnetic iron oxide magnetite (Fe$_3$O$_4$) nanoparticles. Each of the functionalization steps, including bromide ATRP initiator immobilization, SI-ATRP, conversion of PHEMA endgroups from bromides to amines, and carboxyl-functional Fe$_3$O$_4$ nanoparticle immobilization via peptide coupling, have been confirmed by X-ray photoelectron spectroscopy (XPS) and field emission scanning electron microscopy (FESEM).

Figure 1:
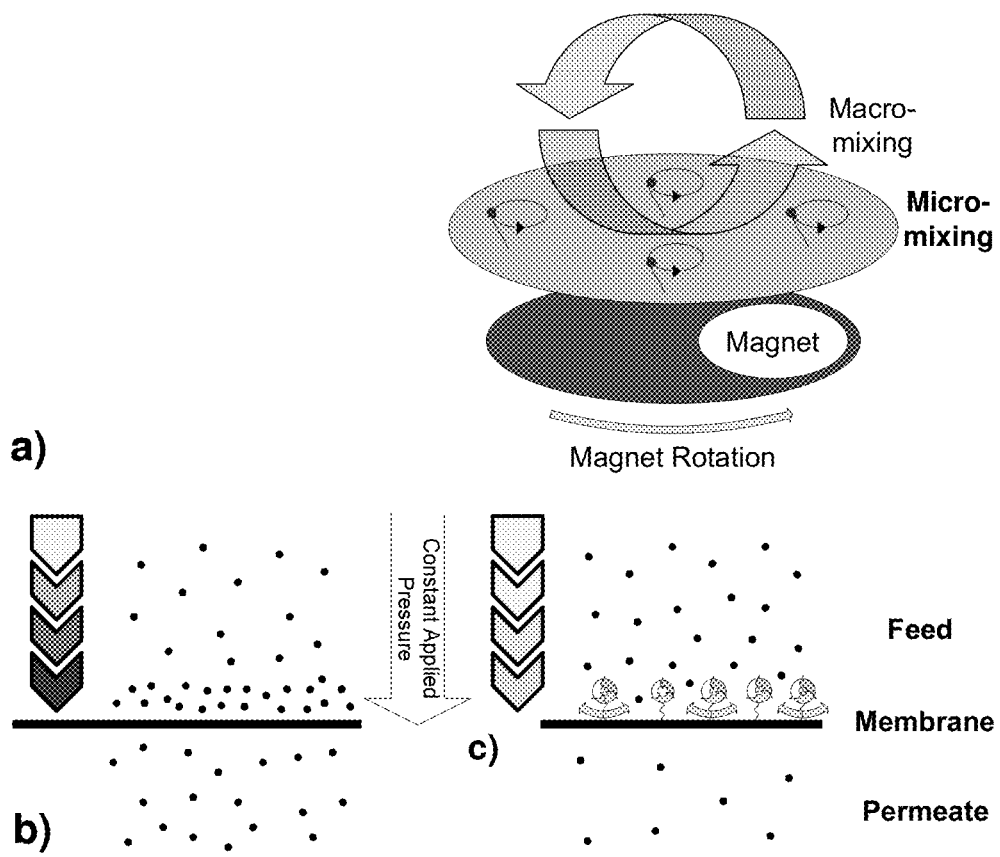
FIG. 1. Schematic depiction of: a. micromixers on the membrane surface activated by oscillating magnetic field with a magnet rotating with a certain frequency, causing macromixing; b. concentration polarization, leading to an increased concentration of rejected species in the boundary layer (left), and reduction of concentration polarization by mixing induced at the membrane surface (right); in NF processes with a given feed and trans-membrane pressure, concentration polarization causes a higher permeate concentration of salt, i.e., a lower salt rejection, than without concentration polarization.

The end-capped nanoparticles experience a magnetic force as well as torque under an oscillating external magnetic field. The resulting movement of the polymer brushes at certain magnetic field frequencies induces mixing directly above the membrane surface, which can be confirmed by particle image velocimetry (PIV). The nanofiltration performance of such membranes is significantly improved (e.g., increased flux and salt rejection) by an oscillating magnetic field. The oscillating magnetic field induces mixing directly above the membrane surface, thereby reducing concentration polarization in the boundary layer (FIG. 1a).

The active alteration of macroscopic flow via surface-anchored micromixers based on polymer-nanoparticle conjugates can be applied to a wide range of filtration techniques and applications. The nanoscale movement of the nanoparticle-capped chains leads to mixing on both the micro- and macro-scales. The membranes can be scaled up to large surface areas using membrane modules. Accordingly, the modified membranes can be used for any pressure driven filtration processes, including reverse osmosis, nanofiltration, ultrafiltration and microfiltration, or non-pressure driven filtration processes such as forward osmosis and pervaporation.

In reverse osmosis there are no pores so modification is carried out on the barrier surface of a membrane. In microfiltration (the other extreme), the modification occurs along the pore walls. For nanofiltration, the major effect is obtained by modification of the barrier surface. For ultrafiltration, the pores and the barrier surface can both be modified. For tight UF membranes, it can be advantageous to use monomers with large molecular weights to prevent modification of the pore wall. Examples of suitable polymers include polyethylenglycolmethacrylate or polyethylenglycolacrylate with appropriate molecular weight of the PEG side group (e.g., about 500 Da, about 2000 Da, about 3000 Da, about 5000 Da, about 10,000 Da, or about 20,000 Da).

The synthesis of magnetically responsive micromixing NF membranes is described herein. Particle image velocimetry (PIV) confirms that the movement of a group of polymer brushes at certain magnetic field frequencies induces mixing directly above the membrane surface. With the magnetically responsive membranes described herein, concentration polarization at the boundary layer can be significantly reduced by hydrodynamic mixing generated by application of an alternating or oscillating magnetic field, thereby enhancing the NF performance, as measured by an increase of flux and salt rejection (FIG. 1b).

Figure 2:
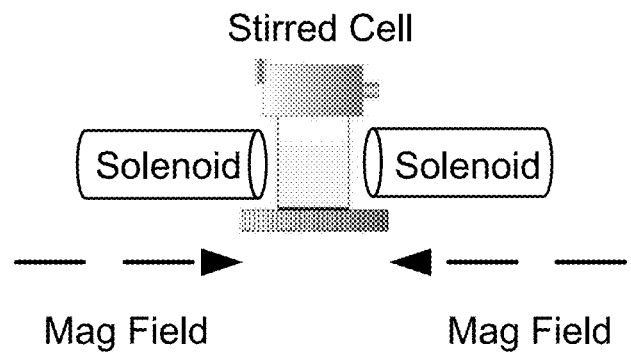
FIG. 2. Schematic showing the orientation of the alternating magnetic field apparatus with respect to the membrane filtration cell.
Figure 3:
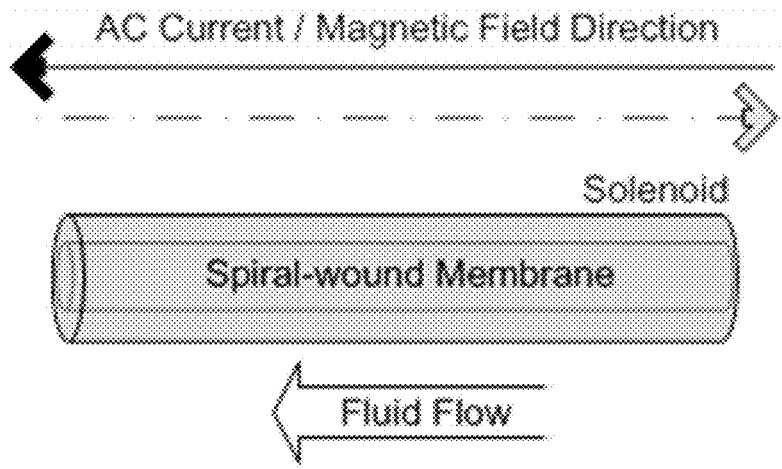
FIG. 3. The spiral-wound membrane module is surrounded by a wire-wrapped solenoid connected to an AC current. The fluid flows along the longitudinal axis of the module. As the AC current travels through the wire and propagates along the longitudinal axis, a magnetic field is generated in the same direction as fluid flow. As the current alternates direction and propagates along the axis in the opposite direction, a field is generated along the longitudinal axis in the opposite direction to the first case.

A CPU-controlled alternating magnetic field apparatus consisting of two solenoids can be constructed for activation of the magnetically responsive micromixing NF membranes. The membrane can be placed inside a filtration cell, and the cell can be placed in between the two solenoids so that the membrane barrier (topmost) layer is normal to the magnetic field generated along the longitudinal axis of the solenoids (see, for example, FIGS. 2 and 3). Because the polymer brushes are concentrated on the membrane surface, the perpendicular magnetic field will impart its maximum torque and force. This leads to maximum brush movement.

Although superparamagnetic nanoparticles have been previously used to create micromixers, these micromixers were free in solution and only induced random mixing (Biswal et al., *Anal. Chem.* 2004, 76, 6448-6455; Singh et al., *Langmuir,* 2005, 21, 11500-11509; Lu et al., *J. Microelectromech. Syst.* 2002, 11, 462-469; Franke et al., *Lab Chip.* 2009, 9, 2831-2835; Biswal et al., *Phys. Rev. E.* 2004, 69, 041406; Lu et al., *Angew. Chem. Int. Ed.* 2007, 46, 1222-1244), while the micromixers described herein provide ordered and concentrated micromixing, for example, at the boundary layer. Also, previous micromixers could only induce mixing on extremely small scales because they were collections of individual mixers and did not employ the cooperation of a surface of grafted polymer brushes. By anchoring the micromixers described herein to the surface of a membrane, mixing can be induced across the entire membrane surface in the presence of a magnetic field. This mixing is therefore analogous to the motion of bacterial cilia. By attaching superparamagnetic nanoparticles to flexible polymer chains, mixing on a large scale suitable for commercial filtration can be achieved.

The performance of the membranes described herein can be activated at any time during filtration; i.e., via activation of the particles of the magnetically responsive membrane. Other responsive membranes have shown promise for reducing fouling using stimuli such as pH and temperature; however, these responsive membranes require changes to the bulk feed to obtain a membrane response. Added chemicals or large changes in temperatures can affect final product quality. Because magnetically responsive membranes can be stimulated through an external stimulus, the characteristics of the bulk feed are therefore unaffected.

DEFINITIONS

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation.

The term "and/or" means any one of the items, any combination of the items, or all of the items with which this term is associated. The phrase "one or more" is readily understood by one of skill in the art, particularly when read in context of its usage. For example, one or more substituents on a phenyl ring refers to one to five, or one to four, for example if the phenyl ring is disubstituted.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percent, proximate to the recited range that are equivalent in terms of the functionality of the individual ingredient, the composition, or the embodiment.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percent or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to treat a condition or to bring about a recited effect. For example, an effective amount of magnetic field can be an amount of magnetic field effective to induce the movement of nanoparticle end-capped polymer brushes on a filtration membrane, effective to reduce concentration polarization and/or to reduce membrane fouling. The determination of an effective amount is well within the capacity of persons skilled in the art, especially in light of the detailed disclosure provided herein. The term "effective amount" is thus intended to include such variable amounts such as an amount of a polymer described herein, a surface area of a filtration membrane described herein, an amount of a reagent used in the preparation of an intermediate described herein, a value of a magnetic field strength, or an amount of purified monomer, reaction solution chemicals, and/or nanoparticles described herein, e.g., that is effective to provide the reactant of interest in excess such that all potential reaction sites are reacted Thus, an "effective amount" generally means an amount that provides the desired effect.

The term "concentration polarization" refers to the accumulation of rejected matter at the boundary layer during filtration.

The term "membrane fouling" refers to the reduction of membrane performance due to deposition of matter on or in the selective barrier of the membrane.

The term "boundary layer" refers to a typically thin layer or increased concentration space of rejected species near the surface of a filter, where transport to or away from the membrane surface is diffusion limited.

The term "magnetically responsive" refers to a characteristic of a membrane and its nanoparticle-capped polymer chains where the application of an external magnetic field yields a physical movement (response) of some degree. The magnetic field is at an effective amount when the response to its application yields physical movement of the nanoparticle-capped polymer chains that enhances the filtration effectiveness of a magnetically responsive filtration membrane.

The term "micromixing" refers to the process of rearranging ingredient particles to form a blend on a microscopic scale. Micromixing can reduce concentration polarization during filtration.

The term "micromixer" refers to a unit that disrupts the behavior of a liquid boundary layer above a membrane surface, for example, by magnetically responsive mixing. This term can refer to the membrane as a whole or an individual superparamagnetic particle-capped grafted polymer chain attached to the membrane.

A "nanoparticle" refers to a particle, often coated, that is about 1 nm in diameter to about one micron in diameter, although typically less than 1 micron in diameter. As used herein, "nanoparticle" often refers to a magnetic particle, such as a superparamagnetic magnetite ($Fe_3O_4$) particle or other analogous small magnetic particle that can be conjugated to the end of a polymer brush.

The property of "paramagnetism" refers to a form of magnetism that occurs only in the presence of an externally applied magnetic field. Paramagnetic materials have a relative magnetic permeability of 1 or more. Paramagnets do not retain any magnetization in the absence of an externally applied magnetic field.

The property of "superparamagnetism" refers to a characteristic of a sufficiently small magnetic particle where the time-averaged magnetic moment of the particle is zero or essentially zero. Superparamagnetic nanoparticles respond to an external field instantaneously with no hysteresis. Superparamagnetism is a form of magnetism which appears in small ferromagnetic or ferrimagnetic nanoparticles. The magnetic susceptibility of a superparamagnetic nanoparticle is much larger than that of a paramagnetic nanoparticle. Magnetization randomly flips direction under the influence of temperature. The typical time between two flips is called the Néel relaxation time. In the absence of external magnetic field, the magnetization of a superparamagnet appears to be on average zero, thus the particles are said to be in the superparamagnetic state. In this state, an external magnetic field is able to magnetize the nanoparticles, similarly to a paramagnet.

A "polyamide composite membrane" refers to a polymeric membrane created through interfacial polymerization where the barrier layer of the membrane is a very thin polymer layer (polyamide) atop one or more polymeric support layers (often polysulfone and/or polyethersulfone). The resulting composite membranes often have a thin (<50 nm) layer of a semi-aromatic material such as poly(piperazinamide) (di- or tri-carboxybenzene) on top of a porous polysulphone membrane and a non-woven polyester support.

A "nanofiltration membrane" refers to a membrane used in the pressure-driven filtration operation of nanofiltration. These membranes reject solutes, which have an effective diameter of a few nanometers, via a combination of size exclusion and charge repulsion (Donnan exclusion). Characteristics of nanofiltration membranes include greater than 99% rejection of multivalent ions, 0-70% rejection of monovalent ions and greater than 90% rejection of small organic compounds with molecular weights greater than 300 g/mol.

A "hydrophilic polymer" refers to a polymer that is compatible as a surface chain on a filtration membrane for filtering polar fluids such as water. Examples of hydrophilic monomers that can be converted to hydrophilic polymers include 2-hydroxyethyl methacrylate (HEMA), tert-butyl methacrylate (TBMA), and/or acrylic acid (AA), ethylene glycol methacrylate (EGMA), N-isopropyl acrylamide (NIPAAM), allylamine, and the like.

"Surface-initiated atom transfer radical polymerization" or "SI-ATRP" refers to a controlled radical polymerization technique used to graft polymer chains (such as a hydrophilic polymer recited herein) to a membrane surface. Important characteristics of SI-ATRP include its flexibility of reactants, mild operating conditions, and highly controlled polymerization kinetics, resulting in very small grafted polydispersity.

The "improved performance" or "increased performance" of a filtration membrane refers to increased flux, increased solute or suspension rejection, reduced flux decline, or less decline in rejection, for example, compared to a filter that does not include polymer brushes or where magnetically responsive brushes are not activated. Also, improved performance can mean fewer membrane cleanings/replacements needed over the course of a particular period of time or number of filtration runs.

"Dead-end filtration", also referred to as normal filtration, refers to a filtration process where a static pressure (driving force) is applied perpendicular to the membrane surface. The entire liquid feed is forced toward the membrane under pressure. The membrane acts as a barrier to the entire feed, and rejected species build up above the membrane, hence the term dead-end.

"Tangential filtration", also referred to as cross-flow filtration, refers to a process where a pressurized feed flows parallel to a membrane surface. Rejected species are removed by the cross-flow velocity of the pressurized feed. The feed is recycled over multiple passes until a desired rejection/concentration is achieved.

"Particle image velocimetry" or "PIV" refers to an imaging technology used to characterize the behavior of a fluid layer. Laser light is shone through a liquid layer containing small suspended particles. The light that reflects off of suspended particles is captured by high-speed cameras. Subsequent images are compared to calculate velocity vectors of the suspended particles. By analyzing the velocity vectors of the suspended particles, fluid behavior and motion can be ascertained.

Membrane Substrates

Substrates that can be used to provide an effective basis for magnetically responsive filtration membranes include a variety of filtration membranes having functional groups that can be used to graft (e.g., attach or grow) additional polymers to its surface. A variety of types of filtration membranes can be modified, including membranes used for microfiltration (MF), ultrafiltration (UF), nanofiltration (NF), and reverse osmosis (RO) (cited in order of decreasing pore size). Reverse osmosis membranes are effective to remove nearly all dissolved solutes from water. Microfiltration membranes are effective, for example, for removing relatively large particles such as bacteria, some proteins, and for "coarse" pre-filtration before applying a fluid to finer membranes. Non-pressure-driven filtration system membranes can also be modified by the magnetically responsive brushes and nanoparticles described herein. Such systems include pervaporation (PV) and forward osmosis (FO). Accordingly, the techniques and methods of the invention can be applied to a variety of membrane processes such as the aforementioned filtration techniques as well as to membranes for processes that suffer from concentration polarization such as electrodialysis, reverse electrodialysis, pressure-retarded osmosis, and the like.

Filtration membranes that can be modified to include magnetically responsive nanoparticle end-capped brushes include, but are not limited to, PET membranes, cellulosic membranes, various composite membranes, and the like. Examples can include various polyolefins, polyamides, polyimides, polyacetylenes, polystyrenes, polynitriles, polysulfones, polyethersulfones, polysulfamides, polyesters, polytetrafluorethylenes, polyvinylidenfluoride, zeolites, carbon nanotube membranes, titanium dioxide membranes, zirconium oxide membranes, and other metal oxide or inorganic membranes, or combinations and/or copolymers thereof. Specific examples can include polypropylene (PP), ethylene-vinyl acetate copolymer (EVAc), methyl cellulose, ethyl cellulose, hydroxymethyl cellulose, hydroxyethylcellulose, polydimethylsiloxane (PDMS), poly-(vinylpyrrolidone) (PVP), or combinations and/or copolymers thereof.

Some filtration membranes that can be modified (e.g., for NF or RO) include polyamide thin-film composites such as Dow-Filmtec NF 270, NF 90, or BW 30, and GE-Osmonics Desal51HL or Desal5DL. Membranes having amine or amino acid functional groups can be purchased or membranes such as those recited above can be modified to provide, for example, an amine-functionalized Dow-Filmtec NF 270 membrane. Polysulfone or polyethersulfone membranes (e.g., for MF) can be obtained from, for example, Sterlitech (PES series membranes), Pall (HT Tuffryn series membranes, Supor series membranes, or Mustang series membranes), or Millipore (Biomax series). Cellulosic membranes (e.g., for MF) can be obtained from, for example, Sartorius (Sotobind series) or Whatman (RC58, RC55, or RC60, as examples).

Filtration membranes are well known in the art and a wide variety suitable and effective membrane bases or substrates can be modified according to the techniques described herein. An overview of more examples for suitable monomers can be found in FIG. 5 of a recent review (Q. Yang, N. Adrus, F. Tomicki, M. Ulbricht, "Composites of functional polymeric hydrogels and porous membranes", *J. Mater. Chem.* 2011, 21, 2783). Specific examples of such membrane-forming momomers include, but are not limited to, Acrylamide, Methacrylamide, Methacryloyl-2-hydroxypropane, N-Vinylformamide, N-Vinyl-2-pyrrolidone, N-Vinylcaprolactam, Diethyleneglycolmethacrylate, Methoxydiethyleneglycolmethacrylate, Triethyleneglycolmethacrylate, Methoxydiethyleneglycolmethacrylate, Tetraethyleneglycolmethacrylate, Methoxyltetraethyleneglycolmethacrylate, Polyethyleneglycolmethacrylate, Methoxypolyethyleneglycolmethacrylate, Diethyleneglycolacrylate, Methoxydiethyleneglycolacrylate, Triethyleneglycolacrylate, Methoxydiethyleneglycolacrylate, Tetraethyleneglycolacrylate, Methoxyltetraethyleneglycolacrylate, Polyethyleneglycolacrylate, Methoxypolyethyleneglycolacrylate, N,N-Dimethyl-N-(2-methacryloyloxyethyl)-N-(3-sulfopropyl)ammonium betain, 2-Methacryloyloxy)ethyl phosphorylcholin, Allyl glucoside and other allyl sugar monomers, D-Gluconamidoethyl methacrylate and other sugar-substituted methacrylates, D-Gluconamidoethyl acrylate and other sugar-substituted acrylates, Acrylic acid, Methacrylic acid, Vinylsulfonic acid, Vinylphosphonic acid, substituted 2-oxazolines, and AH, AMPS, METAC, DMAEMA, SS, and VP (e.g., from the Yang FIG. 5), and the like.

Polymer Brushes

Polymer chains that extend from the surface of a membrane are commonly referred to as polymer "brushes". A variety of hydrophilic polymers can be used to provide the brushes for magnetically responsive filtration membranes. These polymer brushes can then be end-capped by covalently attaching nanoparticles to the ends of the brushes. Any polymer that can be attached to a substrate and end-capped can be used. Suitable methods for attaching the brushes include ATRP, RAFT polymerization, UV-initiated polymerization, and conventional synthetic attachments of pre-formed chains via amide, ester, ether, carbonate, or sulfonate linkages, and the like. Examples of such hydrophilic polymers include polymers of monomers such as 2-hydroxyethyl methacrylate (HEMA), tert-butyl methacrylate (TBMA), acrylic acid (AA), and others described herein. Diblock polymers that include combinations of hydrophilic polymers can also be used. Examples of some hydrophilic polymers are shown below.

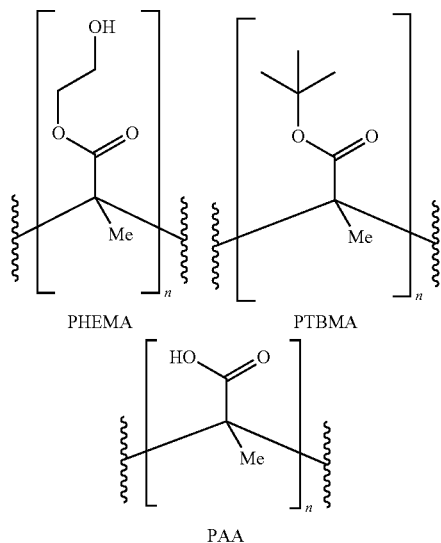

Other suitable hydrophilic polymers that can be used as polymer brushes for attachment of magnetic nanoparticles include polyethylene glycol, polypropylene glycol, and copolymers of any suitable polymer described herein. One end of such polymers can be attached to a membrane base or substrate, and the other end can be capped with a nanoparticle. The side-chains of the polymers provide certain characteristics to the brushes such as the degree of hydrophilicity and/or other parameters that aid in filtration and membrane clog resistance.

Polymer brushes of various lengths can be used to prepare the micromixer membranes. Suitable brushes can be about 10 nm long, in some embodiments, to about 500 nm in other embodiments. Some polymer brushes are about 10 nm to about 150 nm in length, about 10 nm to about 100 nm in length, about 15 nm to about 100 nm in length, about 10 nm to about 50 nm in length, about 10 nm to about 40 nm in length, about 15 nm to about 40 nm in length, about 25 nm to about 40 nm in length, about 10 nm to about 25 nm in length, or about 15 nm to about 25 nm in length.

The degree of grafting of the polymer brushes can be controlled by various factors, as described in the examples below. In some embodiments, the degree of grafting, as measured in $\mu g/cm^2$, can be about 10 to about 250, about 20 to about 200, about 20 to about 150, about 25 to about 120, about 30 to about 100, about 35 to about 70, about 35 to about 55, about 15 to about 25, about 20 to about 40, about 40 to about 60, about 60 to about 80, about 80 to about 100, about 100 to about 120, or about 100 to about 150.

Magnetic Nanoparticles

Particles that can be covalently attached to the ends of polymer brushes include any particle that can be suitably affected by a magnetic field such that the activation provides movement of the particle, resulting in micromixing, during a filtration process. The particles can be paramagnetic, ferromagnetic, or superparamagnetic. The metal core of the particles can be, for example, iron, cobalt, nickel, and/or their oxides. In some embodiments, the nanoparticles are preferably non-leaching and non-toxic to mammals and/or plants.

The diameter of the magnetic nanoparticles can have important effects on their reaction to an oscillating magnetic field. The magnetic nanoparticles can be about 10 nm to about 1 micron in diameter, however the nanoparticles are preferably about 500 nm in diameter or less. In some embodiments, the nanoparticles are about 5 nm to about 250 nm in diameter, about 10 nm to about 200 nm in diameter, about 15 nm to about 100 nm in diameter, about 15 nm to about 75 nm in diameter, about 15 nm to about 50 nm in diameter, about 15 nm to about 25 nm in diameter, or about 10 nm, about 15 nm, about 20 nm, about 25 nm, about 30 nm, about 40 nm, about 50 nm, about 75 nm, about 100 nm, about 150 nm, or about 200 nm in diameter, or a range from any one to another of a specific preceding value. The core of the magnetic particles can be, for example, about 1 nm, about 5 nm, about 10 nm, about 15 nm, about 20 nm, about 25 nm, about 30 nm, about 40 nm, or about 50 nm less than the diameter of the coated particle.

Useful magnetic nanoparticles can have various magnetic properties, including but not limited to, diamagnetic, paramagnetic, superparamagnetic, ferromagnetic, ferrimagnetic, antiferromagnetic, spin glass, and electromagnetic properties. Various magnetic nanoparticles that can be covalently linked to polymer brushes, preparations thereof, and techniques for conjugation are described in U.S. Patent Publication Nos. 2009/0053512 (Pyun et al.), 2011/0266492 (Stayton et al.), 2012/0018382 (Stein et al.), and 2012/0145601 (Lee).

The metallic core is not particularly limited. Examples include magnetic or ferromagnetic metallic cores, including combinations of two or more metals, semi-metals, metal oxides, or doped metal oxides in the core. Further, preferred cores contain Co, Ni and/or Fe, alone or in combination, optionally in combination with at least one metal selected from Ti, V, Cu, Zn, Zr, Mo, Ru, Rh, Ag, Au, Pt, Re, Ir, Os, Cr, Nb, Hf, Ta and W. The metallic core can contain metal alloys or transition metal-metalloid alloys containing Fe, Co, or Ni in combination with for example B, C, Si, P, or Al. Other ferromagnetic materials include ZnZr. Other materials for the core include metal oxides such as magnetite ($Fe_3O_4$), maghemite ($Fe_2O_3$), cobalt ferrite ($CoFe_2O_4$) and manganese ferrite ($MnFe_2O_4$). The core may contain semi-metals such as bismuth, magnetic oxides such as perovskites, including manganate perovskite. Doped metal oxides can also be used. In some preferred embodiments, the nanoparticle is superparamagnetic.

Magnetically Responsive Polymer Brush Membranes

Commercially available nanofiltration (NF) and microfiltration (MF) membranes can be modified to create filtration membranes whose performance can be stimulated by an external magnetic field. The extent of stimulation is controllable, and the membranes can be stimulated during filtration, requiring no adjustments of feed properties. Polymer nanobrushes can be grown on the surface of the membranes using living polymerization techniques such as, but not limited to, UV-initiated free radical polymerization, surface-initiated atom transfer radical polymerization (SI-ATRP), and reversible addition-fragmentation chain transfer (RAFT) polymerization, and post-synthesis attachment of pre-formed polymers.

In some embodiments, 2-hydroxyethyl methacrylate (HEMA), tert-butyl methacrylate (TBMA), and/or acrylic acid (AA) were used as monomers. Di-blocks of HEMA-TBMA were also prepared. The functional group at the end of polymer brushes can be modified using newly developed techniques, as described herein. Superparamagnetic nanoparticles can then be covalently attached to the ends of the nanobrushes. For example, magnetite iron-oxide core nanoparticles with either carboxylic acid or amine coatings can be used to form the endgroups. Polymerization and nanoparticle attachment can be verified using a combination of contact angle measurements, attenuated total reflectance Fourier transform infrared (ATR-FTIR) spectroscopy, x-ray photoelectron spectroscopy (XPS), zeta potential measurements, gravimetric data, and membrane permeability measurements.

Filtration experiments were conducted using feed streams of DI water containing polyamide particles and detergent. Permeate flux and rejection of the detergents were significantly improved in the presence of an oscillating magnetic field for modified membranes. Dead-end filtration tests using both DI water and idealized feed solutions have shown a definite magnetic response leading to improved permeability and rejection capability of the membranes. The improved performance was due to movement of the nanobrush-nanoparticle complexes in the magnetic field.

An alternating field induces motion of the nanobrush complex. This motion creates mixing above the membrane surface, decreasing concentration polarization, leading to reduced membrane fouling. Mixing above the membrane surface can be observed using a particle image velocimetry (PIV) setup, which shows that the velocity and behavior of water above the membrane surface changes in the presence of a magnetic field. The magnetically-responsive membranes described herein can be used to reduce colloidal fouling during membrane filtration, leading to improved membrane performance and longer membrane lifetimes. This technique can be used to improve membrane performance during filtration of wastewaters, as well as other fluid filtration processes.

The invention thus provides anti-fouling, magnetically stimulated filtration membranes, methods of preparing them, and methods of using them. The membranes can include porous materials having pores of less than about 1 nm in diameter, and/or pores of one to about several hundred nm (e.g., 200 nm, 400 nm, 500 nm, 750 nm, 800 nm, or 900 nm), or up to about 1 µm in diameter. In certain embodiments, the membranes can have pores of at least about 5 nm, about 10 nm, about 15 nm, about 20 nm, or about 25 nm in diameter. While nanofiltration and microfiltration membranes were extensively evaluated, the filtration membranes can be applied to reverse osmosis, forward osmosis, and ultrafiltration techniques, among others.

In forward osmosis (FO), it is advantageous to modify the internal structure of the membrane with brushes because reducing the internal concentration polarization is important to improve filtration effectiveness in FO. In microfiltration (MF), it is advantageous to modify the internal pores and in some cases, also the surface. In reverse osmosis (RO) and nanofiltration (NF), the membrane surface can be modified. The modifications can be carried out by forming nanoparticle capped polymer brushes, as described herein. The filtration techniques described herein are applicable for both dead-end flow and tangential flow filtration.

Hydrophilic or hydrophobic polymer chains can be grafted onto the membrane surface using polymerization methods such as UV initiated polymerization, SI-ATRP, RAFT, or by simply grafting pre-formed polymer chains of a desired length (e.g., about 20-100 nm) to the filter membrane surface. For polymerization methods that produce alkyl halides, such as SI-ATRP, the Gabriel synthesis can be applied to convert the end of the polymer chains to amines, which ensures that only the ends of the chains are available for subsequent modification steps.

A magnetic component, such as superparamagnetic nanoparticles, can be attached to the polymer chains to provide the magnetically responsive properties. A variety of such magnetic components are available commercially, such as iron oxide core particles with various chemical coatings. Magnetically responsive components can also be prepared using a variety of techniques to coat iron oxide particles.

An apparatus, such as a solenoid or Helmholtz coil, capable of generating an alternating magnetic field can be used to stimulate the nanoparticles attached at the polymer chain ends on the membrane surface. The degree of membrane response to the field is highly tunable by varying polymerization conditions (chain density, length, and the like) and magnetic field parameters (strength, frequency, and the like). For example, longer polymerization times results in longer polymer brush chains, which can result in greater disruption (increased mixing) of the boundary layer. With longer chains, it can be advantageous to reduce the frequency of the magnetic field applied to obtain a response from the magnetically responsive membranes. In such instances, it may also be advantageous to increase the magnetic field strength. The completed membranes are suitable for both dead-end and tangential filtration of a variety of liquid feeds.

Methods of Preparing Micromixing Membranes

Hydrophilic polymers can be grafted on the surface of commercially available nanofiltration (NF) and microfiltration (MF) membranes. In one embodiment, PET 400 MF membranes and NF 270 membranes were modified as described below. The monomers used for grafting included 2-hydroxyethylmethacrylate (HEMA), tert-butylmethacrylate (TBMA), and acrylic acid (AA). Di-blocks of HEMA-TBMA were also investigated. These hydrophilic monomers are readily swollen (flexible) in aqueous solutions, therefore they are highly suitable for the polymerization techniques of interest. Two polymerization grafting methods that can be used include atom transfer radical polymerization (ATRP) and UV-initiated free radical polymerization to create the polymer brushes. Superparamagnetic nanoparticles were then covalently bonded to the end of the polymer brushes. Scheme 1 schematically illustrates the process, according to one embodiment.

Scheme 1. A general process for preparing magnetically responsive filtration membranes.

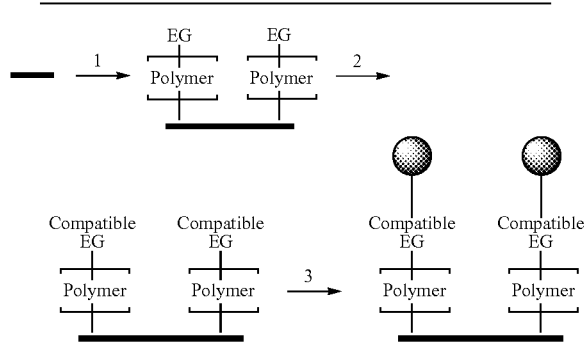

Scheme 1 illustrates a modification scheme where polymer brushes are grown from a membrane surface, for example, using either UV polymerization or ATRP. When employing ATRP, the end group (EG) of the polymer can be converted to a compatible end group (amine) before attachment of carboxyl group-coated nanoparticles. For UV polymerization, this end group conversion is not necessary.

Initial Membrane Preparation.

Filtration membranes such as polyethylene terephthalate (PET) 400 microfiltration (MF) membranes and thin-film composite polyamide NF 270 NF membranes (for example, derived from 3,5-bis(1-piperazinylcarbonyl)-benzoic acid) can be obtained in sheet form. Membrane discs can be cut from a larger membrane sheet using a hammer and dye. The MF membranes can be washed according to appropriate methods, as would be recognized by one of skill in the art. On appropriate washing procedure can include washing with Milli-Q water, washing in shaken methanol, followed by washing in shaken ethanol. The membranes can be allowed to air-dry before being dried in a vacuum oven. The NF membranes can then be washed and dried additional times to ensure they are free from contaminants.

Two modification routes were evaluated for the microfiltration (MF) membranes. The membranes were either used as received, or the membranes were first "pre-functionalized" to introduce a greater number of reactive groups to the membrane surface. Pre-functionalizing increased the grafting density (number of brushes per area) of the polymer grafting.

MF High Density Initiator Immobilization.

High density (HD) initiator immobilization on MF membranes can be achieved on a variety of different types of membrane surfaces. For example, for PET membranes or NF 270 NF membranes, the process can include four steps: 1.) oxidation, 2.) activation, 3.) pre-functionalization, and 4.) initiator immobilization. Reactions were performed at room temperature (~23° C.). Briefly, hydroxyl groups on the membrane surface were oxidized to carboxyl groups. These newly oxidized groups along with carboxyl groups originally present on the membrane surface are then converted to esters or amides. Finally, the bromine-terminated ATRP initiators are conjugated to the amides.

1.) Oxidative Hydrolysis/Carboxylation. The dry membrane sheets were placed in a solution of 7.50 g $KMnO_4$ in 150 mL 0.75N $H_2SO_4$. A glass bowl containing the membranes and solution was sealed tightly. The membranes were allowed to react in the room temperature shaken solution for 2.5 hours and were then washed twice with purified water. The membranes were then washed further as follows: 4× shaken 6M HCl for 2 minutes, 4× Milli-Q water for 2 minutes, and finally twice in ethanol for 2 minutes. The membrane sheets were then dried for approximately 3 hours at 50° C.

2.) Activation and 3.) Pre-Functionalization. The newly oxidized membranes were submerged in a solution to prepare them for the attachment of the polymerization initiator. The solution can include reagents such as 1-benzohydroxytriazolehydrate (EDC) and N,N-diisopropylcarbodiimide in DMF. The membranes can then be washed with DMF and then immediately placed in the pre-functionalization solution. For pre-functionalization, the membranes can be shaken in a solution of ethanolamine in DMF at room temperature. The membranes can then be washed with DMF, then ethanol, and dried in a vacuum oven.

4.) Initiator Immobilization. Polymerization initiators can be immobilized on a membrane surface by a variety of techniques. For membranes having amine functionality available at the membrane surface, the following procedure can be used. The membranes can be placed in a solution of triethylamine, 4-(N,N-dimethylamino)pyridine (DMAP), and α-bromoisobutyryl bromide in dried acetonitrile. The membranes can then be reacted in a shaken solution at room temperature, or at elevated temperatures in some embodiments (e.g., about 30° C. to about 80° C.), to provide the initiator immobilized membrane ready for brush attachment.

Scheme 2a illustrates the amide forming reaction where IV can be, for example, H, $CO_2H$, or another chain of the $NF_{270}$ membrane (optionally resulting in crosslinking); m can be about 10 to about 10,000; and the polymer of the $NF_{270}$ membrane can terminate at a hydrogen, carboxylic acid, piperazine group, or the like. The membranes can be washed in acetonitrile and methanol before being dried in an oven. After initiator immobilization, the membranes can be cut to size, for example, into 25 mm diameter rounds using a dye-punch and hammer. The membranes can be placed in individual zip-top plastic bags for storage.

Scheme 2a. Initiator Immobilization.

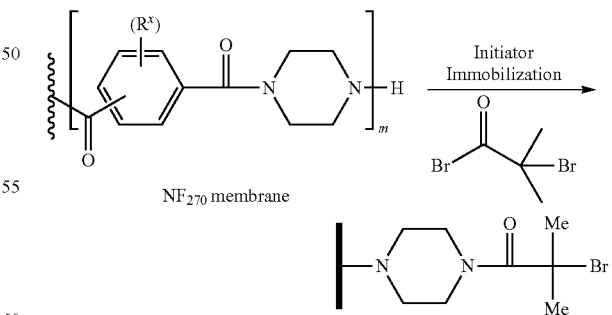

As would be readily recognized by one skilled in the art, other sorts of base filter membranes can be used to prepare the micromixing membranes, and a variety of techniques can be used to prepare the membranes for addition of brushes by immobilizing initiators. Schemes 2b-2f provide several examples of other membrane surfaces that can be modified to immobilize initiators in preparation for attaching (e.g., grafting, growing, affixing, or conjugating) brushes.

Polyester membranes such as PET can be optionally subjected to oxidative hydrolysis to expose additional hydroxyl and carboxyl groups. The hydroxyl groups can then be oxidized to carboxylic acids and immobilization can be carried out as shown in FIG. 2b.

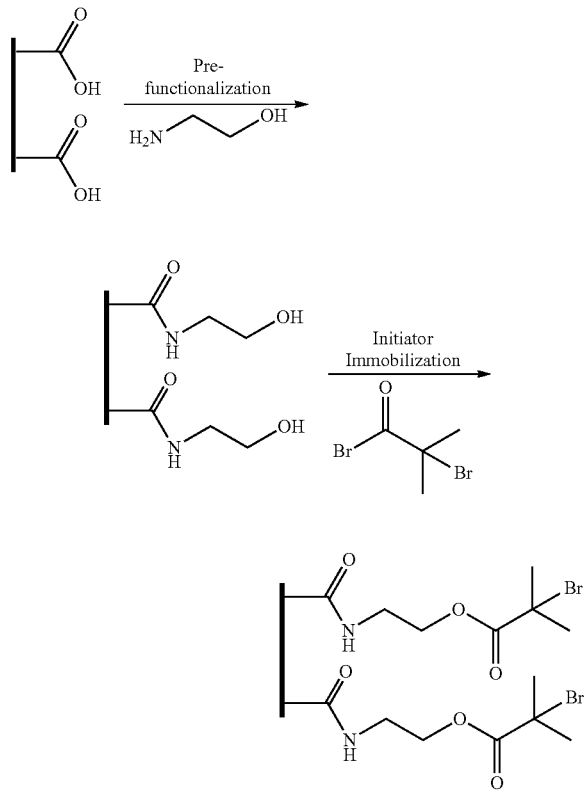

Oxidative hydrolysis can be carried out using reagents such as $KMnO_4$ and $H_2SO_4$. Lower density initiator immobilization can be achieved by omitting the oxidation of surface hydroxyl groups to carboxylic acids. The pre-functionalization can be carried out using reagents such as N,N-carbodiisopropyl diimide, HOBt, and a ($C_2$-$C_{20}$)amino alcohol in a polar solvent such as DMF. Initiator immobilization can be carried out with reagents such as triethylamine with a catalytic amount of DMAP in a polar solvent such as acetonitrile. After initiator immobilization, polymerization for form brushes can be carried out as described below.

Initiator immobilization on membranes having surface amino acids can be carried out by oxidizing the amino acids to aldehydes and then to carboxylic acids using strong oxidation agents such as sodium hypochlorite. The immobilization can then proceed as described above in Scheme 2b.

Initiator immobilization on membranes having surface amine groups can be carried out by a variety of techniques such as pre-functionalizing the amines by conjugating an (alpha-omega) ($C_2$-$C_{20}$)hydroxy acid or an (alpha-omega) ($C_2$-$C_{20}$)halo alcohol to the amine. The immobilization can then proceed as described above in Scheme 2b.

MF Low Density Initiator Immobilization.

Low density (LD) initiator immobilization was carried out by methods similar to that of the HD method described above. First, 25 mm diameter rounds were cut from the unmodified, or base, membrane sheet as received from the company. The membranes were washed with Milli-Q water and ethanol, dried for 15 minutes in a 45° C. vacuum oven, and then massed. An initiator immobilization reaction solution as described above was prepared. The membrane rounds were placed in small glass vials to which 5 mL of the reaction solution was added. The membranes were allowed to react for 2 hours. This procedure was followed by one acetonitrile wash, two methanol washes, and one deionized water wash, all for 2 minutes. The membranes were then dried for 30 minutes at 45° C. in a vacuum oven. Similar to the HD membranes, the LD membranes were then massed and placed in individual zip-top plastic bags for storage.

NF Initiator Immobilization.

NF 270 membranes are thin-film composite membranes consisting of a thin polyamide top-most selective barrier layer. Two support layers, polyester and polysulfone, underneath the polyamide layer, add stability to the selective layer with very little hydrodynamic resistance. Due to their chemical nature, NF 270 membranes are incompatible with DMF; therefore, immobilization of NF membranes followed the MF LD initiator immobilization procedure.

ATRP Polymerization Procedures.

HEMA ATRP Grafting.

HEMA and TBMA monomers were distilled before use to remove any inhibitors. All three membranes (MF HD and LD as well as NF) followed the same HEMA ATRP procedure. The reaction solution for the ATRP grafting of HEMA consisted of purified monomer (2M), CuCl, $CuCl_2$, and BPY Reagent Plus dissolved in equal parts water and methanol. The ratios used were 100:0.5:0.1:1.5 for monomer:CuCl:$CuCl_2$:BPY.

First, a 100 mL mixture of 50% methanol in water was prepared. Purified HEMA monomer (24.26 mL) was added and the stirred solution was degassed for 5 minutes with nitrogen gas. BPY Reagent Plus (468 mg) was then added and degassing continued for 15 minutes. The vials containing the membrane rounds were then evacuated under vacuum and then filled with nitrogen gas. The process was repeated two more times to ensure that the membranes were in a nitrogen exclusive environment. CuCl (99 mg) was then added to the reaction solution. The solution was degassed for 10 minutes under strong stifling before the addition of 26.9 mg of $CuCl_2$. The stirred solution was degassed for another 10 minutes. Immediately after degassing, 6 mL of reaction solution was injected into each of the sealed vials containing the membrane rounds. The membranes were allowed to react for a desired amount of time.

After reacting, the membranes were placed in a quenching solution to halt the ATRP growth and cap the end of each polymer chain with a bromine group. To prepare the quenching solution, 500 mg of $CuBr_2$ and 1250 μL of N,N,N,N,N-pentamethyldiethylenetriamine (PMDETA) were dissolved into 100 mL of 50% methanol in water. After 10 minutes in the shaken quenching solution, the membranes were washed with shaken Milli-Q water for 2 minutes, washed with methanol for 2 minutes, and allowed to rest in shaken Milli-Q water for 2 hours. The membranes were then dried at 45° C. for 30 minutes in a vacuum oven (MF) or in a 40° C. oven overnight (NF) and then massed. The reaction according to one embodiment is illustrated in Scheme 3 below.

Scheme 3. Atom Transfer Radical Polymerization (ATRP).

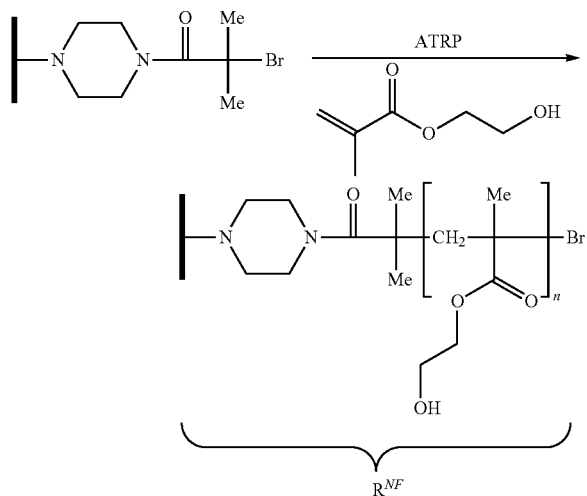

TBMA ATRP Grafting.

After being dried and massed, the membranes can also be grafted with a layer of TBMA. For TBMA grafting, 100 mL of reaction solution was prepared by combining 32.6 mL of purified TBMA monomer and 67.4 mL of DMF. Tris(2-(dimethylamino)ethyl)amine ($Me_6TREN$) (458 μL) was added to the solution and degassed using nitrogen gas under strong stirring for 20 minutes. The glass vials containing the membranes were thrice evacuated and filled with nitrogen as before. CuCl (166 mg) was then added to the reaction solution and the solution degassed for another 20 minutes.

As with the HEMA ATRP procedure, 6 mL of reaction solution was injected into the sealed vials containing the membranes, and the reaction proceeded for a desired length of time. The ratios for the reaction solution were 120:1:1 for monomer:$Me_6$TREN:CuCl. The TBMA quenching solution consisted of 1250 μL of PMDETA and 500 mg of $CuBr_2$ dissolved in 100 mL of DMF. After 10 minutes in the shaken quenching solution, the membranes were washed for 2 minutes in shaken DMF, twice for two minutes in shaken methanol, and then allowed to rest in shaken Milli-Q water for 2 hours before being dried at 45° C. for 30 minutes in a vacuum oven (MF) or in a 40° C. oven overnight (NF) and massed. When a particular solvent of a grafting technique may be incompatible with a particular type of membrane, a compatible solvent can be substituted for the incompatible solvent. For example, in some embodiments, methanol or ethanol can be exchanged for DMF.

Brushes can be grafted to membranes having surface polymers such as polysulfone (PSF) or polyethersulfone (PES) by chlorination of the surface followed by polymerization and modification of the end group to provide an amine or carboxylic acid group for attachment of carboxy-coated nanoparticles or amine-coated nanoparticles, respectively, using techniques such as those described by Li and co-workers (*J. Appl. Poly. Sci.* 111 (4), 2008, 1942-1946).

UV-Initiated Polymerization.

UV-initiated polymerization can be used to provide polymer brushes on a membrane surface by generating a radical with a photoinitiator such as benzophenone and light in the presence of acrylic acid or similar monomer. For example, benzophenone, a type II photoinitiator, was dissolved to saturation in DI water at room temperature. Acrylic acid monomer was then added resulting in solutions that were 1% or 2%, by weight, acrylic acid. The acrylic acid solution was then purged with nitrogen gas for 15 minutes. Membrane discs (25 mm in diameter), cut from a larger membrane sheet, were placed in a 15 mL Petri dish and the purged benzophenone-saturated monomer solution (5 mL) was added. A piece of filter paper was placed on top of the membrane and the cover of the Petri dish was inverted and placed on top of the filter paper to force out any air bubbles in the reaction solution. The Petri dish "sandwich" was then placed in the UV reactor. The membranes were incubated in the monomer solution for 15 minutes before the UV source was turned on. The average intensity falling on the membrane (covered with filter paper) was approximately 13 $mW/cm^2$. Membranes in 1% acrylic acid solution were irradiated for 15 minutes while membranes in 2% acrylic acid solution were irradiated for either 10 or 15 minutes. Multiple membrane samples were modified at each condition.

Following irradiation, the membranes were rinsed twice with 10 mL of DI water. They were then placed in a 100 mL beaker containing 50 mL DI water at room temperature for 30 minutes with slow stifling. Next, the membranes were washed for 60 minutes with 50 mL of DI water at 45° C. and then 50 mL of room temperature DI water, both in 100 mL beakers with slow stirring. The membranes were again rinsed twice with 10 mL of DI water and air dried for 15 minutes. This process provides polymer brushes with terminal carboxylic acid groups for attachment of, for example, amine-coated nanoparticles.

Alternatives to ATRP and UV-Initiated Polymerization.

Cationic polymerization and anionic polymerization can be complicated to implement, in particular for synthesis of hydrophilic polymers (even traces of water are not allowed in the reaction system). Additionally, they are not well compatible with surface-grafting, i.e. to obtain end-on grafted polymer chains. On the other hand, the advantage is the high control and the option to obtain grafted block copolymers.

In particular, cationic (ring opening) polymerization of the monomer 2-oxazolines gives access to grafted polyethylenimines which, depending on the substitution of the nitrogen atom in the chain can be very hydrophilic (see, for instance, R. Jordan, A, Ulman, *J. Amer. Chem. Soc.* 1998, 120, 243.). Therefore, surface-initiated cationic polymerization and anionic polymerization, can be advantageous for the preparation of various brushes of interest.

In other embodiments, surface-initiated ring opening metathesis (ROMP) polymerization can be used to provide suitable polymer brushes (see, for instance, the extensive work by M. R. Buchmeiser: *Macromol. Symp.*, 2010, 298, 17-24). Moreover, stepwise synthesis of polypeptides is another option to achieve a variety of other polymer brushes (see, for instance, work by H. Menzel, chapter in book "Polymer brushes"; Ed. V. Rühe et al.; Wiley-VCH).

Additional relevant techniques include two other controlled radical polymerization techniques (in addition to ATRP): reversible addition-fragmentation chain transfer (RAFT) polymerization and nitroxide-mediated polymerization (NMP); both can be used to obtain surface-grafted (hydrophilic) polymer chains.

Gabriel Synthesis Procedures.

The Gabriel synthesis is an efficient method for converting alkyl halides into primary amines. Although the method was first proposed in the late 1800s, it has only recently been applied to polymer chains. This disclosure significantly extends the technique by using the Gabriel synthesis to modify the end of polymer chains attached to a membrane surface, where previous techniques have only been applicable to compounds or polymers free in solution.

The polymer brushes can then be capped with bromine groups after soaking in the quenching solution. The brushes can be functionalized to react with the carboxylic acid coated nanoparticles, or alternatively, with amine coated nanoparticles. To create a covalent amide linkage between the end of the polymer nanobrush and the nanoparticle, the alkyl halide polymer brush ends were converted to primary amines through the Gabriel synthesis. Briefly, potassium phthalimide was combined with the brushes to attach the phthalimide group to the end of the brushes. Hydrazinolysis then provided a primary amine. The phthalimide by-product precipitated and was washed away. The reaction is schematically shown in Scheme 4 where $R^{NF}$ represents the polymer chain on the membrane surface.

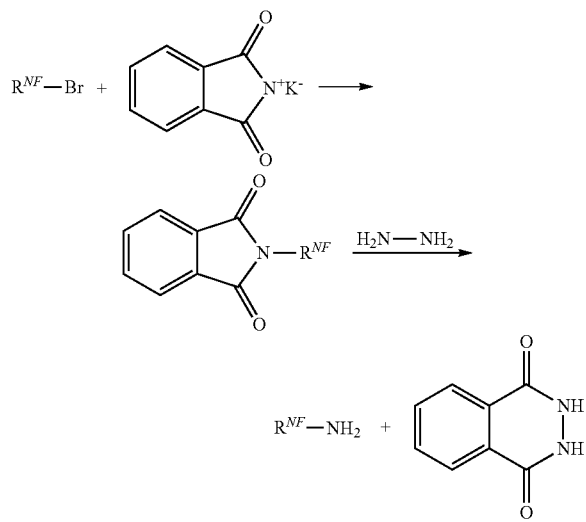

Scheme 4. Gabriel Synthesis on Polymer Substrates.

The Gabriel synthesis as applied to immobilized bromides works best in the presence of a polar solvent such as DMF, ethanol, t-butanol, and the like. For the first step of the Gabriel synthesis, potassium phthalimide can be dissolved in ethanol and transferred to a small glass vial containing one modified membrane disk. The vials can be sealed and placed in an oil bath to activate the reaction. After the reaction, the membrane can be rinsed with DMF followed by DI water and ethanol before being dried and weighed.

The second step of the Gabriel synthesis includes of dissolving hydrazine hydrate into 6M HCl. This solution can be placed in a small glass vial containing a membrane disk. The vials can be placed in an oil bath until the reaction is complete. Upon completion of the reaction, the product is washed. The membrane can be, for example, washed with DI water, methanol, again with DI water, with ethanol, and finally with DI water, to ensure that no phthalimide precipitate remains. The membranes can then be dried and weighed. An alternative Gabriel synthesis procedure is described in Example 7 below.

Nanoparticle Attachment.

Superparamagnetic magnetite ($Fe_3O_4$) nanoparticles or similar magnetic nanoparticles can be obtained commercially, for example, from Ocean Nanotech, LLC (Springdale, Ark.). The diameter of one type of magnetite particles was 25 nm, which included a 15 nm magnetic core and 5 nm thick coating layer. The surfaces of the nanoparticles were either amine or carboxylic acid functionalized. The nanoparticle attachment method was similar to growing polymer brushes using UV initiated polymerization or ATRP; the difference being the functional groups on the nanoparticle. The attachment procedure can be carried out as illustrated in Scheme 5.

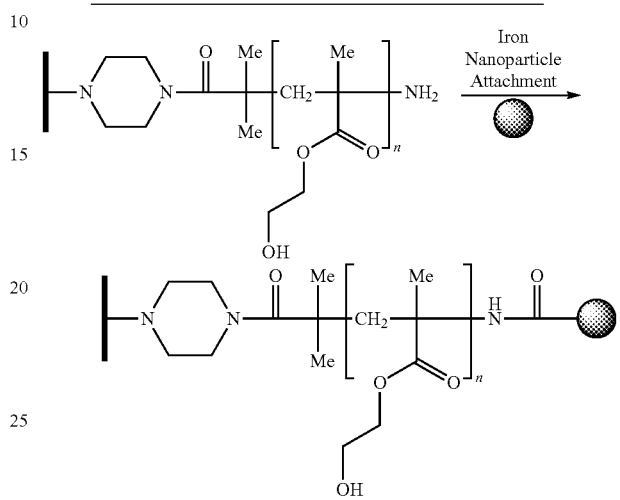

Scheme 5. Post-Gabriel Synthesis Nanoparticle Attachment by Peptide Bond Formation.

For example, EDC and NHS can be added to DI water and shaken vigorously using a vortex mixer. Then superparamagnetic nanoparticles in a buffer solution (5 g/L) can be added. This solution can then be added to a plastic jar containing a modified membrane, which can be sealed and incubated in the dark. After incubation, the membrane can be removed, washed in DI water, then with ethanol, and finally in DI water. The membrane can then be dried. The magnetic nanoparticles are thus attached to the polymer brushes by an amide linkage. For UV-initiated grafting, the carboxylic acid at the end of the polyacrylic acid (pAA) brushes were bound with the amine coating of the particles, and carboxylic acid coated particles were bound to the amine end functionality of the HEMA brushes grafted using ATRP.

Evaluation and Properties of Polymeric Membranes.

Successful grafting of the polymer nanobrushes can be confirmed using a combination of methods including spectroscopy and membrane permeability measurements. X-ray photoelectron spectroscopy (XPS) can confirm that the Gabriel synthesis successfully converts the final end group of the HEMA, TBMA, and HEMA-TBMA polymer brushes from bromides to primary amines. Spectroscopy, contact angle, and zeta potential measurements can confirm attachment of superparamagnetic nanoparticles. Once the modification of the membranes is confirmed, the behavior of the membranes can be studied in an alternating magnetic field. Membrane permeability, or flux, and rejection of idealized solutions can be performed in a dead-end filtration mode. Fluid behavior above the membrane surface can be studied and visualized using a PIV setup.

Advantages of Various Embodiments.

Liquid filtration membranes are often composed of polymers. Numerous studies have shown that many factors, not all of them independent, lead to membrane fouling. Fouling decreases membrane performance over time by reducing membrane capacity (throughput) and selectivity (ability to separate components). Although membrane use in industry is increasing, there is still a very real need to create fouling resistant membranes that are adaptable to numerous feed types. Several research groups have investigated stimulus responsive membranes, including pH and temperature response, among others (Wandera et al., *J. Membr. Sc.*, 2010, 357, 6-35). The characteristics of such membranes can be modified in situ through application of an appropriate stimulus. These membranes have shown promise for adjustable fouling resistance; however, the major disadvantage is that the characteristics of the bulk feed must be modified, which can be expensive and time-consuming. The magnetic membranes described herein possess the benefits of other stimulus responsive membranes without affecting the bulk feed, and they are more fouling resistant due to the movement of grafted polymer chains at the membrane surface.

The magnetically responsive micromixing membranes can also be used for a variety of purposes. Purification of various forms of water can be accomplished by filtering the water through a system that employs the magnetically responsive micromixing membranes. Other fluids besides water can also be filtered, including various polar and non-polar solvents or solvent systems. Examples of polar fluids besides water that can be filtered include methanol, ethanol, DMSO, and the like. Examples of non-polar fluids that can be filtered and purified include organic solvents such as $CCl_4$, $CHCl_3$, $CH_2Cl_2$, octanol, and other oils and hydrocarbons such as octane, various other organic solvents, and the like. When a non-polar fluid is filtered, it can be advantageous to use polymer brushes having less hydrophilic character. Provided that the fluid to be filtered is compatible with the membrane and the magnetically responsive nanoparticle-capped brushes, any type of fluid can be filtered and purified. The modified membranes described herein also provide improved performance compared to non-responsive membranes, for example, for the removal of a variety of solutes from various fluids. Examples of such solutes include colloids, aggregates, detergents, fatty acids, oils, salts, borates, inorganics such as metals, and herbicides, pesticides, and/or fraking chemicals.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

Magnetically Responsive Micromixing Membranes

Hydrophilic polymers were grafted on the surface of commercially available nanofiltration (NF) and microfiltration (MF) membranes. Specifically, PET 400 MF membranes and NF 270 membranes were modified as described below. The monomers used for grafting included 2-hydroxyethylmethacrylate (HEMA), tert-butylmethacrylate (TBMA), and acrylic acid (AA). Di-blocks of HEMA-TBMA were also investigated. Two polymerization grafting methods were used included atom transfer radical polymerization (ATRP) and UV-initiated free radical polymerization. Superparamagnetic nanoparticles were then covalently bonded to the end of the polymer brushes.

Initial Membrane Preparation.

Polyethylene terephthalate (PET) 400 microfiltration (MF) membranes and thin-film composite polyamide NF 270 NF membranes were obtained in sheet form. Membrane discs were cut from the larger membrane sheet using a hammer and dye. The MF membranes were washed with Milli-Q water for 1 minute, washed in shaken methanol for 15 minutes, and washed in shaken ethanol for 1 minute. The membranes were allowed to air-dry under ambient conditions for about 2 minutes before being dried for 15 minutes at 45° C. in a vacuum oven. The NF membranes were washed twice with Milli-Q water for 1 minute each. After each washing, the membranes were allowed to air dry under ambient conditions for roughly 3 minutes. After a third washing with Milli-Q water, the membranes were lightly dabbed dry and then dried overnight at 45° C.

For the MF membranes, two routes were evaluated. The membranes were either used as received, or the membranes were first "pre-functionalized" to introduce a greater number of reactive groups to the membrane surface. Pre-functionalizing increased the grafting density (number of brushes per area) of the polymer grafting.

MF High Density Initiator Immobilization.

This process included four steps: oxidation, activation, pre-functionalization, and initiator immobilization. Reactions were performed at room temperature (~23° C.). Briefly, hydroxyl groups on the membrane surface are first oxidized to carboxyl groups. These newly oxidized groups along with carboxyl groups originally present on the membrane surface are then converted to esters and then amides. Finally, the amides are replaced with the bromine-terminated ATRP initiator.

Oxidative Hydrolysis/Carboxylation.

The dry membrane sheets were placed in a solution of 7.50 g $KMnO_4$ in 150 mL 0.75N $H_2SO_4$. A glass bowl containing the membranes and solution was sealed tightly. The membranes were allowed to react in the room temperature shaken solution for 2.5 hours and were then washed twice with purified water. The membranes were then washed further as follows: 4× shaken 6M HCl for 2 minutes, 4× Milli-Q water for 2 minutes, and finally twice in ethanol for 2 minutes. The membrane sheets were then dried for ~3 hours at 50° C.

Activation and Pre-Functionalization.

The newly oxidized membranes were submerged in a solution of 2.30 g 1-benzohydroxytriazolehydrate and 0.95 g N,N-diisopropylcarbodiimide in 150 mL DMF and shaken for 30 minutes. The membranes were washed twice with DMF and then immediately placed in the pre-functionalization solution. For pre-functionalization, the membranes were shaken in a solution of 4.58 g ethanolamine in 150 mL of DMF for 3 hours at room temperature. The membranes were washed twice with DMF for 2 minutes, twice with ethanol for 2 minutes, and then dried for 1 hour in a 50° C. vacuum oven.

Initiator Immobilization.

The membranes were placed in a solution of 1.515 g triethylamine, 91.5 mg 4-(N,N-dimethylamino)pyridine (DMAP), and 2.76 g α-bromoisobutyryl bromide in 150 mL of dried acetonitrile. The membranes reacted in the shaken solution for 2 hours at room temperature. The membranes were then washed twice each in acetonitrile for 2 minutes and methanol for 2 minutes before being dried overnight in a 50° C. oven. After initiator immobilization, the membranes were cut into 25 mm diameter rounds using a dye-punch and hammer. The membranes were then massed and placed in individual zip-top plastic bags for storage.

MF Low Density Initiator Immobilization.

The low density (LD) initiator immobilization is very similar to that of the HD method described above. First, 25 mm diameter rounds were cut from the unmodified, or base, membrane sheet as received from the company. The membranes were washed with Milli-Q water and ethanol, dried for 15 minutes in a 45° C. vacuum oven, and then massed. A reaction solution as described for immobilization was produced and the membrane rounds were placed in small glass vials to which 5 mL of the reaction solution was added. The membranes were allowed to react for 2 hours. This was followed by one acetonitrile wash, two methanol washes, and one deionized water wash, all for 2 minutes. The membranes were then dried for 30 minutes at 45° C. in a vacuum oven. Similar to the HD membranes, the LD membranes were then massed and placed in individual zip-top plastic bags for storage.

NF Initiator Immobilization.

NF 270 membranes are thin-film composite membranes consisting of a thin polyamide top-most selective barrier layer. Two support layers, polyester and polysulfone, underneath the polyamide layer add stability to the selective layer with very little hydrodynamic resistance. Due to their chemical nature, NF 270 membranes are incompatible with DMF; therefore, all NF membranes followed the MF LD initiator immobilization procedure.

ATRP Polymerization Procedures

HEMA ATRP Grafting.

HEMA and TBMA monomers were distilled before use to remove any inhibitors. All three membranes (MF HD and LD as well as NF) followed the same HEMA ATRP procedure. The reaction solution for the ATRP grafting of HEMA consisted of purified monomer (2M), CuCl, $CuCl_2$, and BPY Reagent Plus dissolved in equal parts water and methanol. The ratios used were 100:0.5:0.1:1.5 for monomer:CuCl:$CuCl_2$:BPY.

First, a 100 mL mixture of 50% methanol in water was prepared. Purified HEMA monomer (24.257 mL) was added and the stirred solution was degassed for 5 minutes with nitrogen gas. BPY Reagent Plus (468 mg) was then added and degassing continued for 15 minutes. The vials containing the membrane rounds were then evacuated under vacuum and then filled with nitrogen gas. The process was repeated two more times to ensure that the membranes were in a nitrogen exclusive environment. CuCl (98.99 mg) was then added to the reaction solution. The solution was degassed for 10 minutes under strong stifling before the addition of 26.89 mg of $CuCl_2$. The stirred solution was degassed for another 10 minutes. Immediately after degassing, 6 mL of reaction solution was injected into each of the sealed vials containing the membrane rounds. The membranes were allowed to react for a desired amount of time.

After reacting, the membranes were placed in a quenching solution to halt the ATRP growth and cap the end of each polymer chain with a bromine group. To prepare the quenching solution 500 mg of $CuBr_2$ and 1250 μL of N,N,N,N,N-pentamethyldiethylenetriamine (PMDETA) were dissolved into 100 mL of 50% methanol in water. After 10 minutes in the shaken quenching solution, the membranes were washed with shaken Milli-Q water for 2 minutes, washed with methanol for 2 minutes, and allowed to rest in shaken Milli-Q water for 2 hours. The membranes were then dried at 45° C. for 30 minutes in a vacuum oven (MF) or in a 40° C. oven overnight (NF) and then massed.

TBMA ATRP Grafting.

After being dried and massed, the membranes were ready to be grafted with a layer of TBMA. For TBMA grafting, 100 mL of reaction solution was prepared by combining 32.6 mL of purified TBMA monomer and 67.4 mL of DMF. Tris(2-(dimethylamino)ethyl)amine ($Me_6TREN$) (458 μL) was added to the solution and degassed using nitrogen gas under strong stirring for 20 minutes. The glass vials containing the membranes were thrice evacuated and filled with nitrogen as before. CuCl (166 mg) was then added to the reaction solution and the solution degassed for another 20 minutes.

As with the HEMA ATRP procedure, 6 mL of reaction solution was injected into the sealed vials containing the membranes, and the reaction proceeded for a desired length of time. The ratios for the reaction solution were 120:1:1 for monomer:$Me_6TREN$:CuCl. The TBMA quenching solution consisted of 1250 μL of PMDETA and 500 mg of $CuBr_2$ dissolved in 100 mL of DMF. After 10 minutes in the shaken quenching solution, the membranes were washed for 2 minutes in shaken DMF, twice for two minutes in shaken methanol, and then allowed to rest in shaken Milli-Q water for 2 hours before being dried at 45° C. for 30 minutes in a vacuum oven (MF) or in a 40° C. oven overnight (NF) and massed. No NF membranes underwent modification via TBMA grafting because DMF gradually destroys the selective barrier layer.

UV-Initiated Polymerization.

Benzophenone, a type II photoinitiator, was dissolved to saturation in DI water at room temperature. Acrylic acid monomer was then added resulting in solutions that were 1% or 2%, by weight, acrylic acid. The acrylic acid solution was then purged with nitrogen gas for 15 minutes. Membrane discs (25 mm in diameter), cut from a larger membrane sheet, were placed in a 15 mL Petri dish and the purged benzophenone-saturated monomer solution (5 mL) was added. A piece of filter paper was placed on top of the membrane and the cover of the Petri dish was inverted and placed on top of the filter paper to force out any air bubbles in the reaction solution. The Petri dish "sandwich" was then placed in the UV reactor. The membranes were incubated in the monomer solution for 15 minutes before the UV source was turned on. The average intensity falling on the membrane (covered with filter paper) was ~13 $mW/cm^2$. Membranes in 1% acrylic acid solution were irradiated for 15 minutes while membranes in 2% acrylic acid solution were irradiated for either 10 or 15 minutes. Multiple membrane samples were modified at each condition.

Following irradiation, the membranes were rinsed twice with 10 mL DI water. They were then placed in a 100 mL beaker containing 50 mL DI water at room temperature for 30 minutes with slow stifling. Next, the membranes were washed for 60 minutes with 50 mL DI water of 45° C. and 50 mL of room temperature DI water, both in 100 mL beakers with slow stirring. The membranes were again rinsed twice with 10 mL DI water and air dried for 15 minutes.

Gabriel Synthesis Procedure.

The polymer brushes were capped with bromine after soaking in the quenching solution. To create a covalent amide linkage between the end of the polymer nanobrush and the nanoparticle, the alkyl halide polymer brush ends were converted to primary amines through the Gabriel synthesis. Briefly, potassium phthalimide was reacted with the brushes to attach the phthalimide group to the end of the brushes. Hydrazinolysis then yields a primary amine. The phthalimide by-product precipitates and is washed away. Scheme 4 above shows on example of the Gabriel synthesis on the polymer brushes.

For the first step of the Gabriel synthesis, 1 g of potassium phthalimide was dissolved into 20 mL of ethanol. A portion of this solution (4.5 mL) was placed into a small glass vial containing one membrane disk. The vials were sealed and placed in a 40° C. oil bath for 6 hours. After the reaction, the membrane was rinsed with DMF followed by DI water twice for two minutes, and finally ethanol before being dried and weighed.

The second step of the Gabriel synthesis included of dissolving 7 mL of hydrazine hydrate into 25 mL of 6M HCl. A portion of this solution (4 mL) was placed in a small glass vial containing a membrane disk. The vials were placed in a 40° C. oil bath for 6 hours. Upon completion of the reaction, the third step (washing) was performed. The membrane was washed twice with DI water, once with methanol, again with DI water, once with ethanol, and finally with DI water to ensure that no phthalimide precipitate remained. The membranes were then dried and weighed.

Nanoparticle Attachment.

Superparamagnetic magnetite ($Fe_3O_4$) nanoparticles of 25 nm in diameter were used for attachment to the polymer brushes. The magnetic core of the particles was approximately 15 nm in diameter and the coating layer was approximately 5 nm thick. The surfaces of the nanoparticles were amine or carboxylic acid functionalized. The nanoparticle attachment method was the same for polymer brushes grown using UV initiated polymerization or ATRP; the only difference being the functional groups on the nanoparticle.

EDC (31.2 mg) and NHS (38.7 mg) were added to 10 mL of DI water and shaken vigorously using a vortex mixer. Then 0.3 mL of superparamagnetic nanoparticles in a buffer solution (5 g/L) were added, but not agitated. A portion of this solution (1.5 mL) was then added to a plastic jar containing a membrane. The container was sealed and incubated in the dark for 4 hours. After incubation, the membrane was removed, washed twice in DI water for 5 minutes, then with ethanol, and finally in DI water for 10 minutes. The membrane was then dried overnight at 40° C. The magnetic nanoparticles were attached to the polymer brushes through the creation of an amide linkage. For UV-initiated grafting, the carboxylic acid at the end of the polyacrylic acid (pAA) brushes was bound to the amine coating of the particles, and carboxylic acid coated particles was bound to the amine end functionality of the HEMA brushes grafted using ATRP.

Polymeric Membranes Evaluation.

Successful grafting of the polymer nanobrushes was confirmed using a combination of methods including spectroscopy and membrane permeability measurements. X-ray photoelectron spectroscopy (XPS) confirmed that the Gabriel synthesis successfully converted the final end group of the HEMA, TBMA, and HEMA-TBMA polymer brushes from bromides to primary amines. Spectroscopy, contact angle, and zeta potential measurements confirmed attachment of superparamagnetic nanoparticles. Once the modification of the membranes was confirmed, the behavior of the membranes was studied in an alternating magnetic field. Membrane permeability, or flux, and rejection of idealized solutions were performed in a dead-end filtration mode. Fluid behavior above the membrane surface was studied and visualized using a PIV setup.

Selected Modification Results.

As discussed above, multiple types of monomers and polymerization methods were used to graft the polymer chains onto the membrane surface. Data confirming the grafting of PAA via UV-initiated polymerization are provided in Table 1.

TABLE 1

Contact angle measurements for UV polymerization of PAA onto NF membranes.

| Membrane | Average Contact Angle |
|---|---|
| Control | 17 ± 3 |
| 1%, 15 min | 23 ± 1 |

TABLE 1-continued

Contact angle measurements for UV polymerization of PAA onto NF membranes.

| Membrane | Average Contact Angle |
|---|---|
| 2%, 10 min | 28 ± 2 |
| 2%, 15 min | 38 ± 2 |

Table 1 shows the average contact angle data for NF membranes grafted with PAA using UV-initiated polymerization. The contact angle of the unmodified membrane is around 17°, indicating the membrane is extremely hydrophilic. Increasing monomer concentration and polymerization time both lead to an increase in contact angle; i.e., a more hydrophobic membrane. This increase in hydrophobicity directly correlates to an increase in PAA grafted to the membrane surface. This is because PAA is deprotonated, and therefore hydrophobic, at the pH of the water used for the contact angle measurements (~6). Therefore, the polymer chains make the topmost layer of the membrane more hydrophobic.

Figure 4:
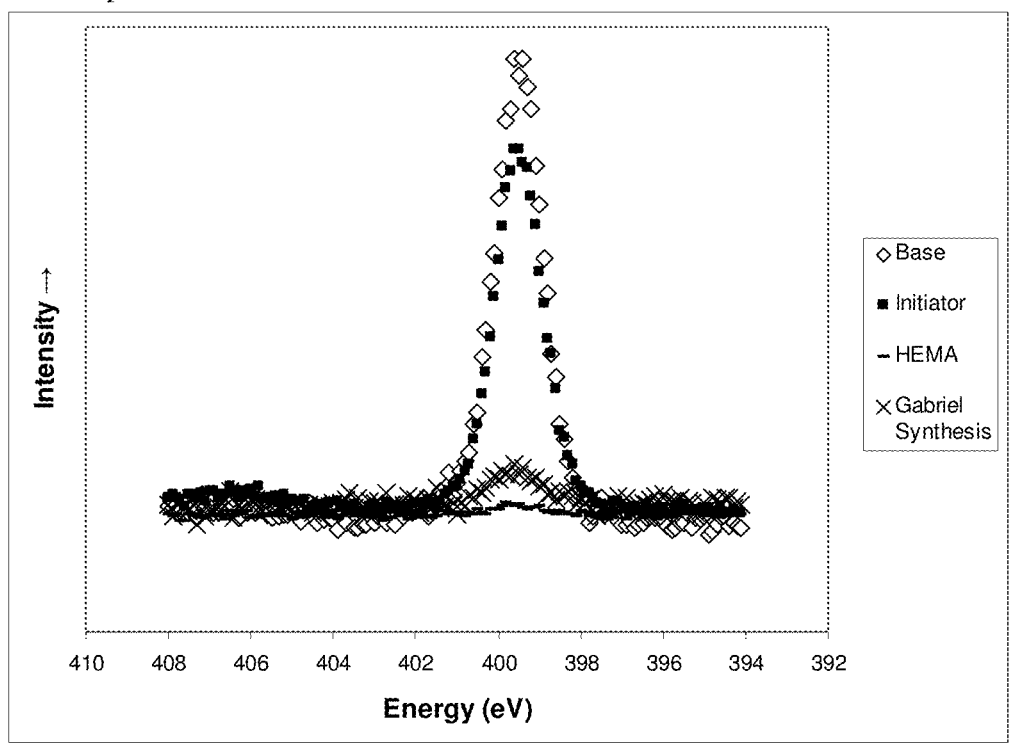
FIG. 4. High-resolution XPS spectrum focusing on the amine region for poly(2-hydroxyethyl methacrylate) (PHEMA) grafting using ATRP.

Results for PHEMA preparation via ATRP and subsequent nanoparticle attachment are shown in FIG. 4 and FIG. 4. These data represent only two specific embodiments. Modification of membrane surfaces using other embodiments was verified using the same or similar methods.

A high resolution XPS spectrum from the nitrogen is region is shown in FIG. 4. As indicated in the figure, the unmodified membrane shows a very strong amine peak at ~399 eV due to the chemical nature of the membrane. This peak is slightly diminished by the immobilization of the initiator onto the membrane surface. No amine peak is present after polymerization of the HEMA brushes because no amine groups present in the resulting PHEMA. This analysis also verifies that the PHEMA chains are at least 10 nm long because XPS can only analyze the topmost 10 nm of a sample, and no amine peak from the underlying NF membrane is observed for the HEMA spectrum (solid, horizontal line in FIG. 4).

After the Gabriel synthesis has been performed, the peak at ~399 eV returns, confirming that the polymer brushes have been successfully capped with an amine group. This is notable because, although the Gabriel synthesis is a well-established method for converting halides to primary amines, it has previously only been used on compounds free in solution and not on polymers affixed to a surface. Performing the synthesis on polymers fixed to a surface at one end presented difficulties, specifically compatibility of the membrane with chemicals and temperatures normally used in the Gabriel synthesis.

Figure 5:
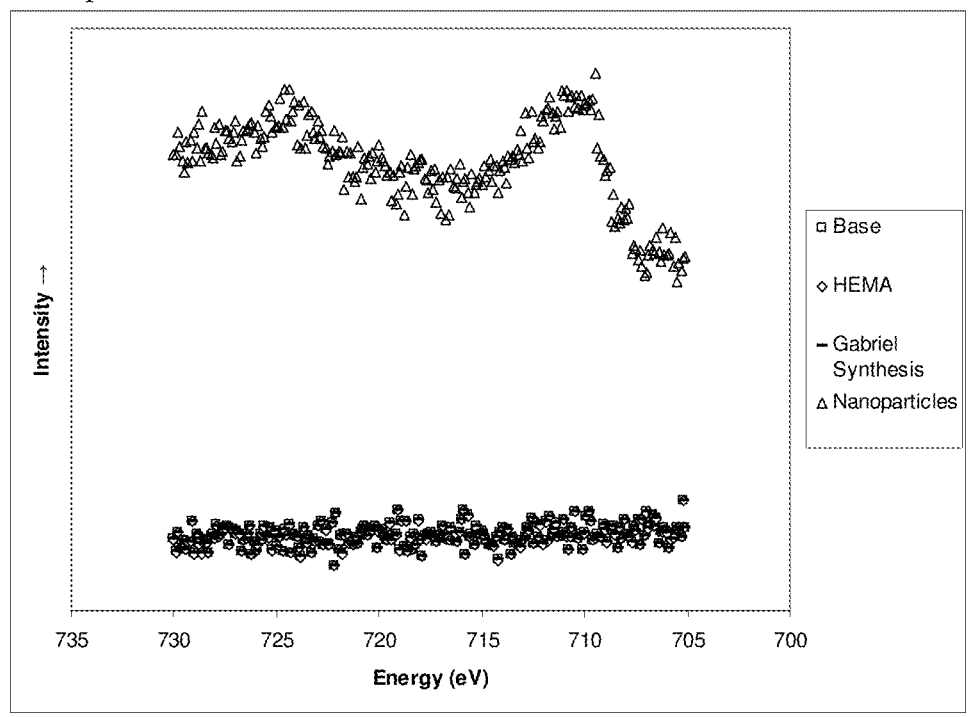
FIG. 5. High resolution XPS spectra focusing on the iron region for PHEMA grafting using ATRP.

FIG. 5 shows high-resolution XPS spectra for the iron region. This figure clearly shows that there is no iron present during any of the stages of membrane modification prior to nanoparticle attachment. After the nanoparticles are attached to the ends of the PHEMA chains there are two very strong iron peaks.

Selected Filtration Results.

Pure water membrane permeability was evaluated after filter modification. Each example maintained a satisfactory permeability for liquid filtration. Next, the performance of the membranes was tested using a mixture of 20 μm neutrally-buoyant polyamide particles (3.25% w/w), and detergent (0.02% w/w) in deionized water. Rejection was calculated as $$R = 1 - \left(\frac{c_p}{c_f}\right) \quad (1)$$

where R is the rejection and $c_p$ and $c_f$ are the concentration of the permeate and the feed, respectively. The concentrations were calculated using UV spectroscopy and column chromatography. Both flux and rejection were tested with and without the alternating magnetic field. FIGS. 6-9 illustrate the flux and rejection results for NF membranes modified using UV polymerization and SI-ATRP.

Figure 6:
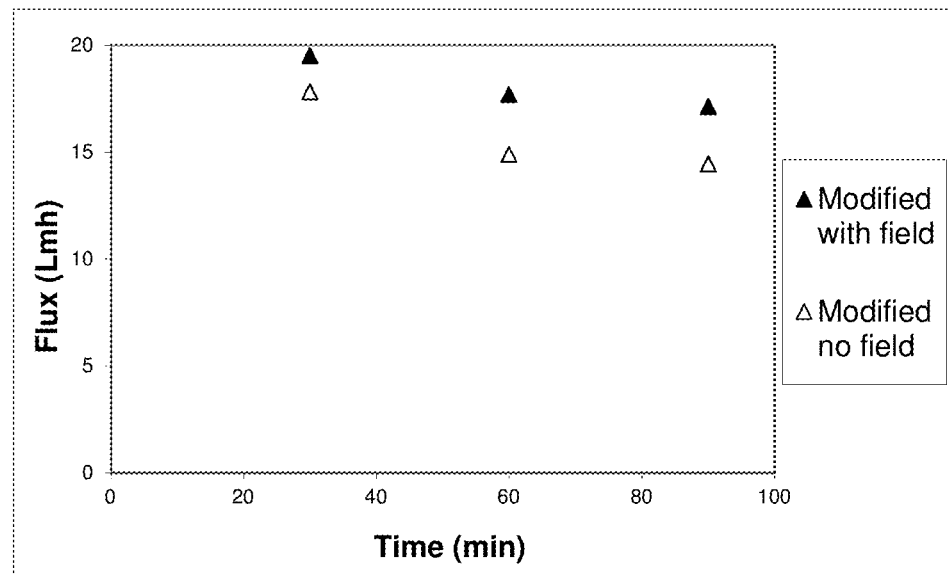
FIG. 6. Flux of detergent and polyamide particles mixture vs. time for NF membranes prepared using UV polymerization. Flux was measured at 45 psig (3.1 bar).
Figure 7:
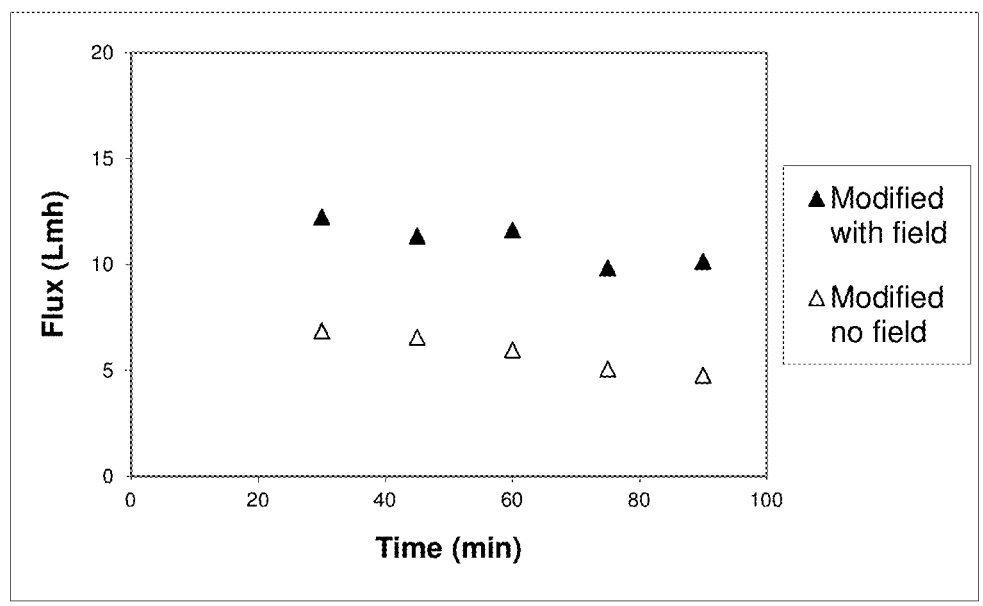
FIG. 7. Flux of polyamide particles in detergent mixture vs. time for SI-ATRP modified NF Membranes. Flux was measured at 45 psig (3.1 bar).

Unmodified, or control, membranes showed no difference in either flux or rejection with the application of an alternating field. FIG. 6 and FIG. 7 show that the application of an alternating magnetic field has a marked effect on membrane permeability. This difference is due to concentration polarization of the oily detergent film. With the magnetic field, however, the flux through the membrane is improved compared to without the field. The concentration polarization is broken up by the mixing resulting from the movement of the polymer brushes, thus increasing flux. This mixing also prevents deposition of the oily film onto the membrane surface, which would decrease flux decline with longer filtration times; i.e., the flux of the membrane in the field would remain higher with longer filtrations while the flux membrane without the field would steadily decrease. The values in FIG. 7 are slightly lower because there was a greater degree of polymerization compared to the membrane represented in FIG. 6, thus imparting a slightly greater resistance.

Figure 8:
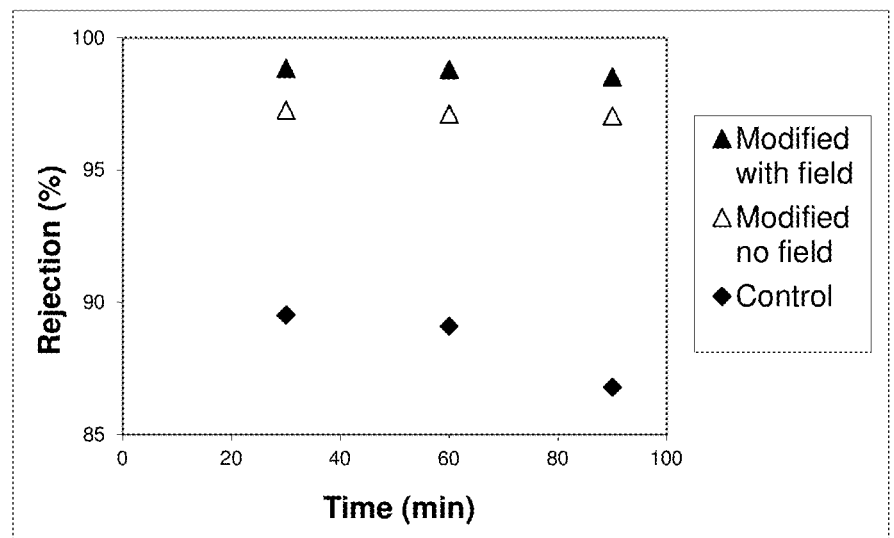
FIG. 8. Rejection of detergent and polyamide particles mixture vs. time for NF membranes prepared using UV polymerization. Rejection was measured at 45 psig (3.1 bar).
Figure 9:
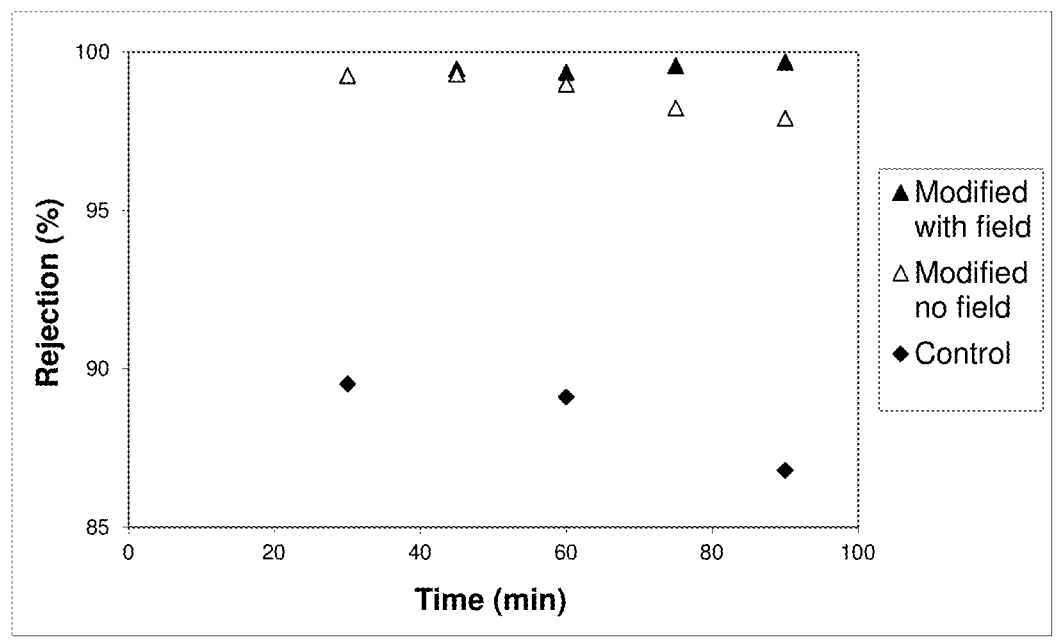
FIG. 9. Rejection of polyamide particles in detergent mixture vs. time for SI-ATRP modified NF membrane. Rejection was measured at 45 psig (3.1 bar).

Similarly, the examples summarized by FIG. 8 and FIG. 9 showed noticeable improvements in particle rejection after polymer modification. The increased detergent particle rejection by the modified membranes is due to a greater membrane resistance after modification, thus making it more difficult for the detergent to pass through the membrane. The rejection is further improved with the application of an alternating magnetic field. Similar to the explanation of the increased membrane flux, the movement of the polymer chains on the membrane surface induces mixing. This mixing decreases concentration polarization and particle deposition. One remarkable result is illustrated by FIG. 9, where the latter data points show decreasing rejection for both the unmodified membrane and the modified membrane in the absence of a field. The modified membrane in the field shows no decrease in rejection. Over time, this disparity can become become even greater.

Selected PIV Results.

Particle image velocimetry (PIV) is a known technique useful for observing fluid behavior by tracking the movement of dispersed particles within a fluid. Laser light reflected by dispersed particles is captured by a camera, and velocity profiles of the fluid overtime can be constructed. The magnetic response of the membranes can be observed by comparing velocity profiles both with and without the magnetic field present.

Unmodified and modified NF 270 membranes were each observed in the PIV setup with and without a magnetic field present. Two-dimensional projections (4 µm depth of field) of the fluid velocity field were calculated. Data was taken at 1000 frames per second over one second. The rotational speed of the shaft, upon which the permanent magnet was placed, was varied to generate three different time-alternating magnetic fields. The motor was increased in increment of 30% of total output resulting in four oscillating frequencies: 0, 9, 22, and 30 Hz.

Multiple examples were observed using the PIV; however, only one characteristic data set is presented in FIG. 10, which shows velocity vectors and field lines. The velocity vectors (arrows in the figure) represent the calculated velocity of the fluid at that point, and field lines (lines superimposed above velocity vectors) were calculated to visually "connect" similar velocities.

Figure 10A:
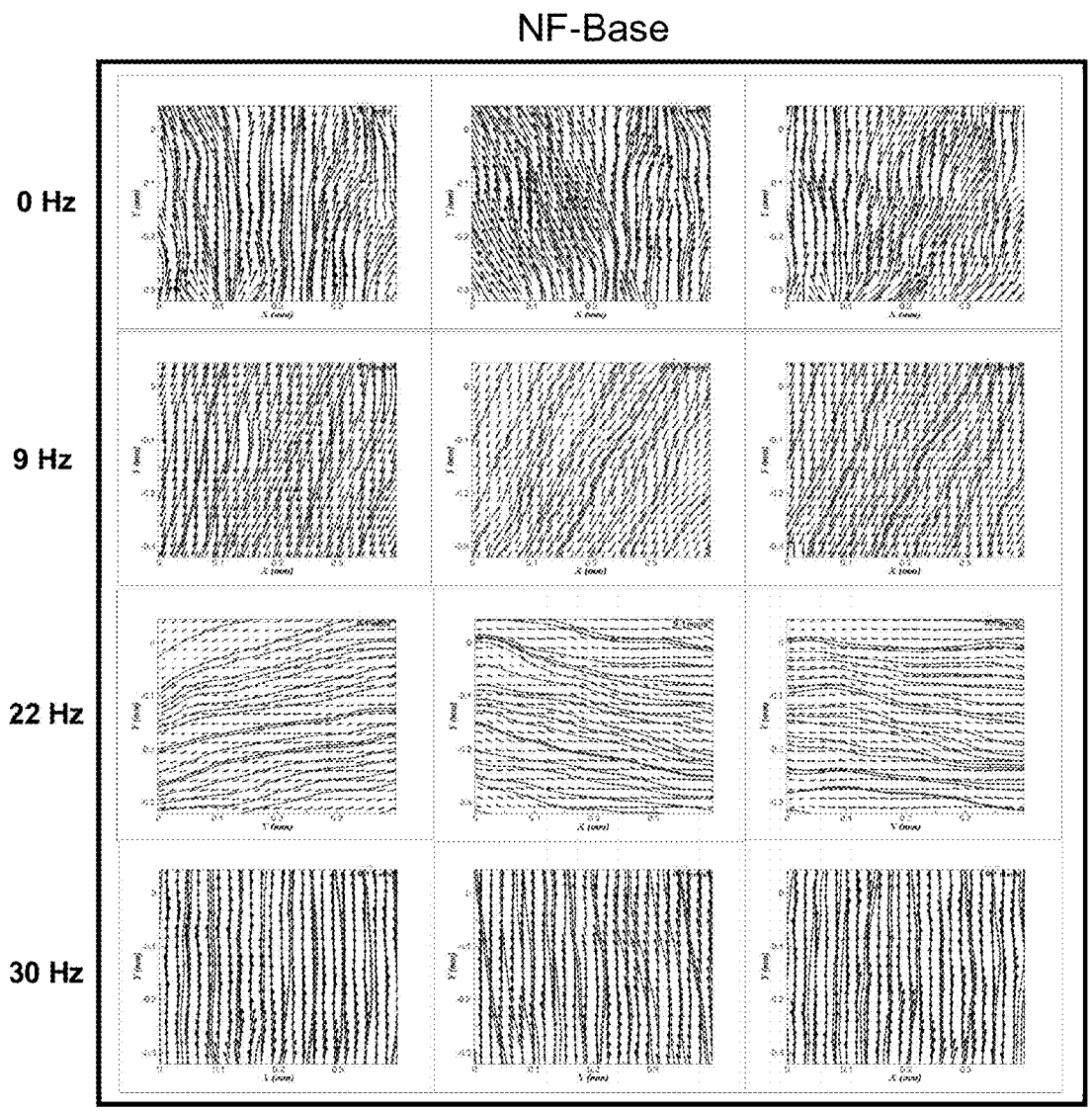
FIG. 10. Series of three successive PIV vector diagrams for magnet rotation speed of 0, 9, 22, and 30 Hz (a. unmodified filter membrane; b. magnetically responsive brush modified filter membrane). Each vector diagram is averaged over 1 ms of time; therefore, 3 ms time is shown for each of the four frequencies. The greatest amount of turbulence due to the movement of polymer brushes in the magnetic field can be seen in the 9 Hz sample.
Figure 10B:
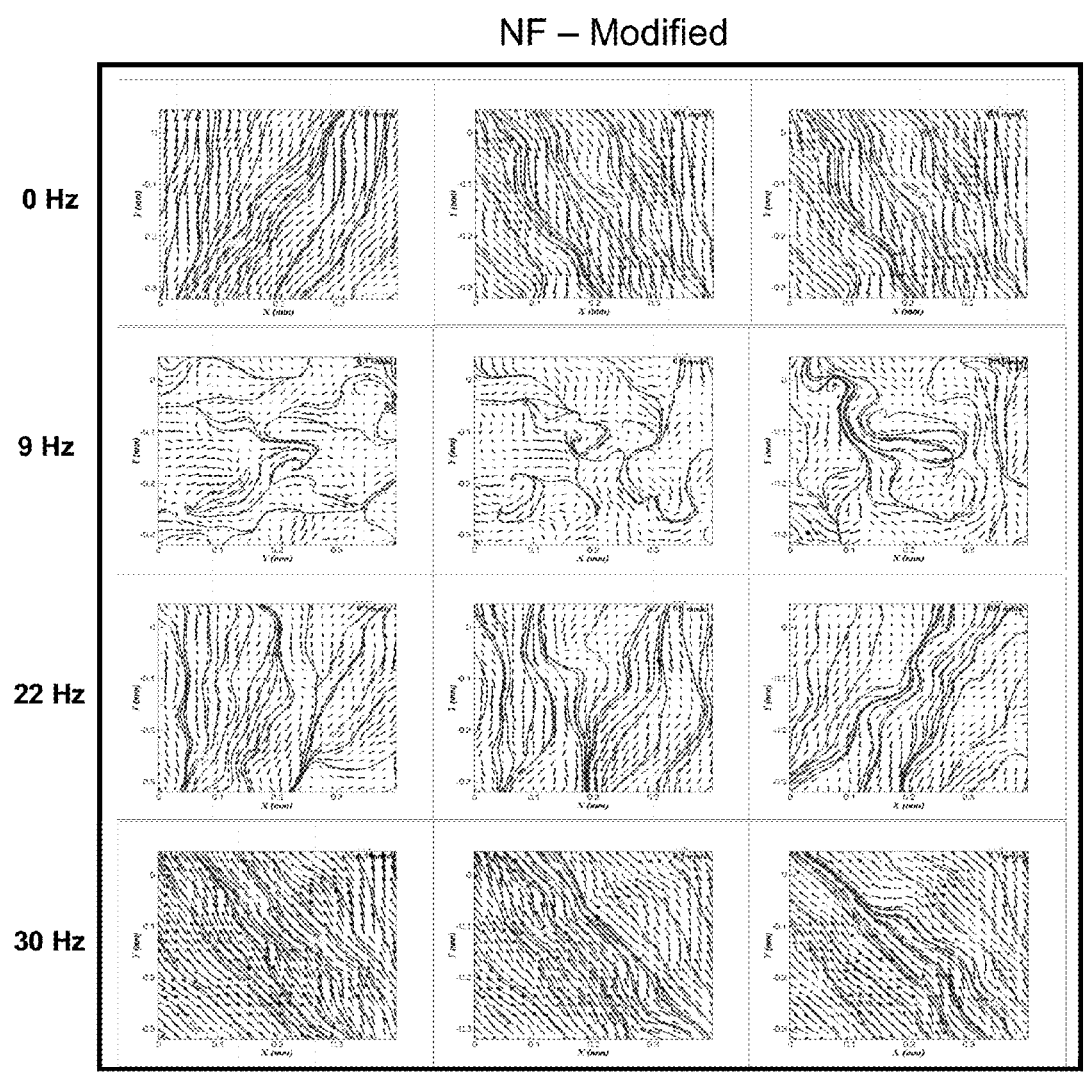
Figure 11:
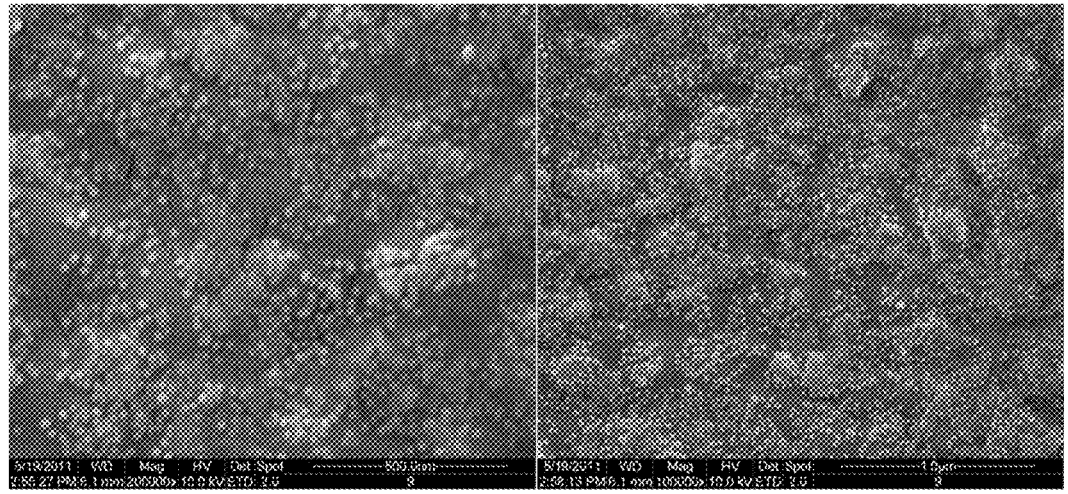
FIG. 11. Nr. 9 DG=138.8 µg/cm$^2$, 100% initiator density, NP conc. 0.15 g/L.
Figure 12:
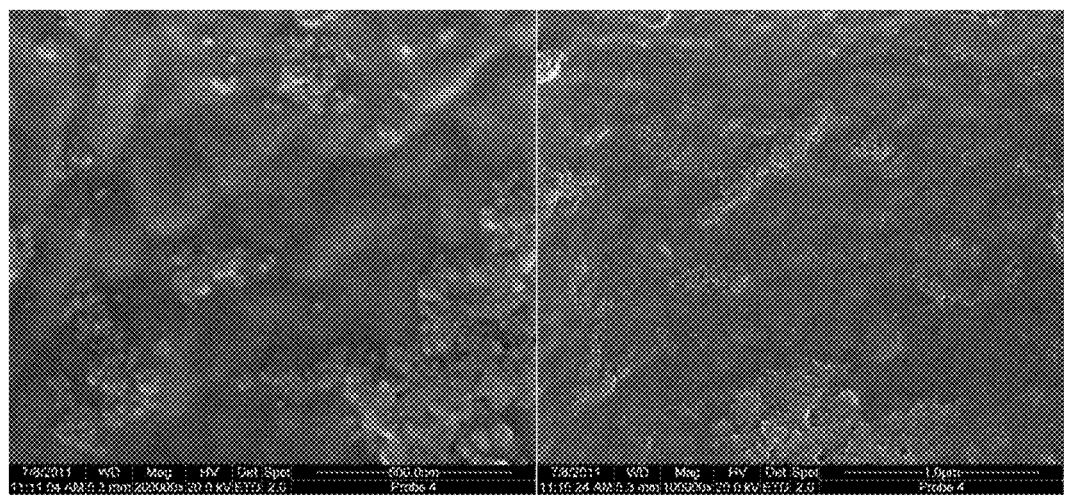
FIG. 12. Nr. 64 DG=100.2 µg/cm$^2$, 4 h, 100% initiator density, NP conc. 0.015 g/L.
Figure 13:
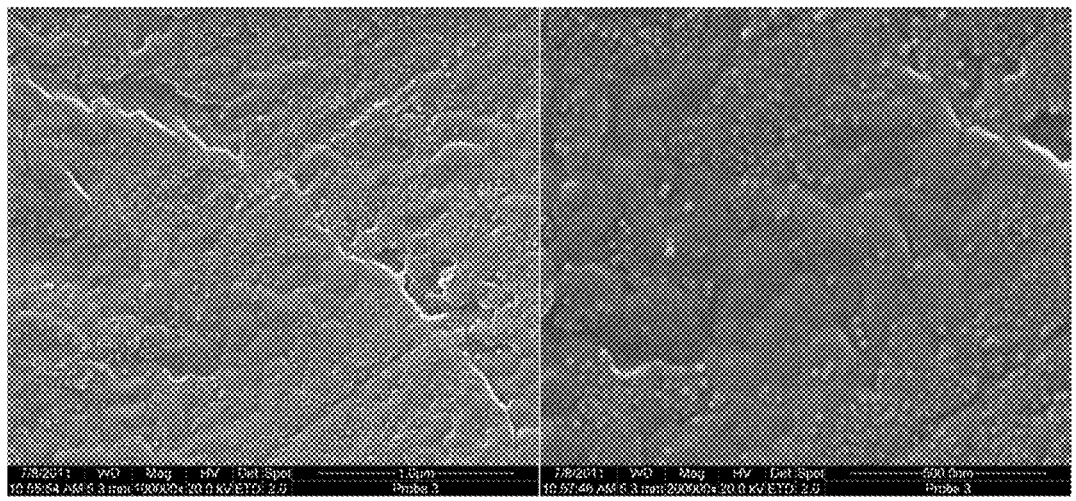
FIG. 13. Nr. 62 DG=32.7 µg/cm$^2$, 1 h, 100% initiator density, NP conc. 0.015 g/L.
Figure 14:
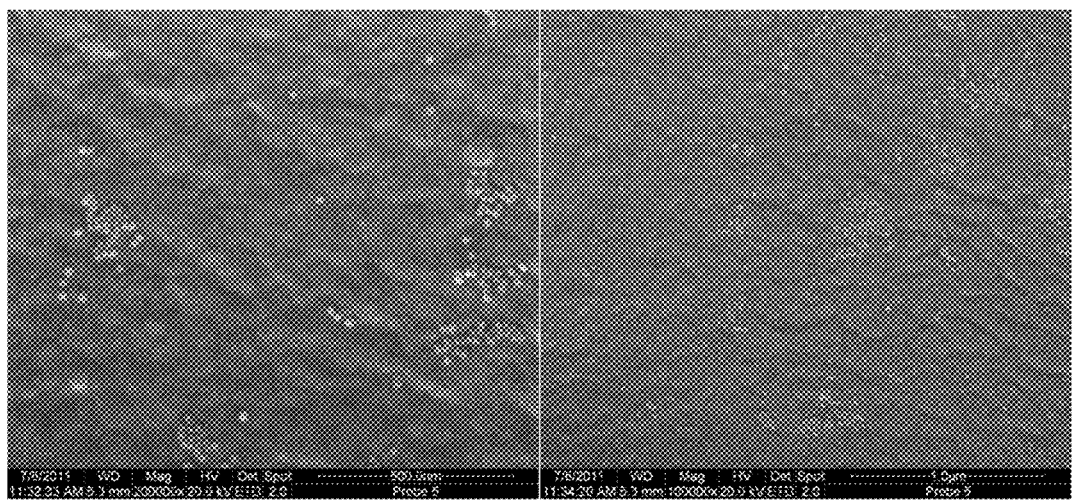
FIG. 14. Nr. 68 DG=10.2 µg/cm$^2$, 1 h, 50% initiator density, NP conc. 0.015 g/L.
Figure 15:
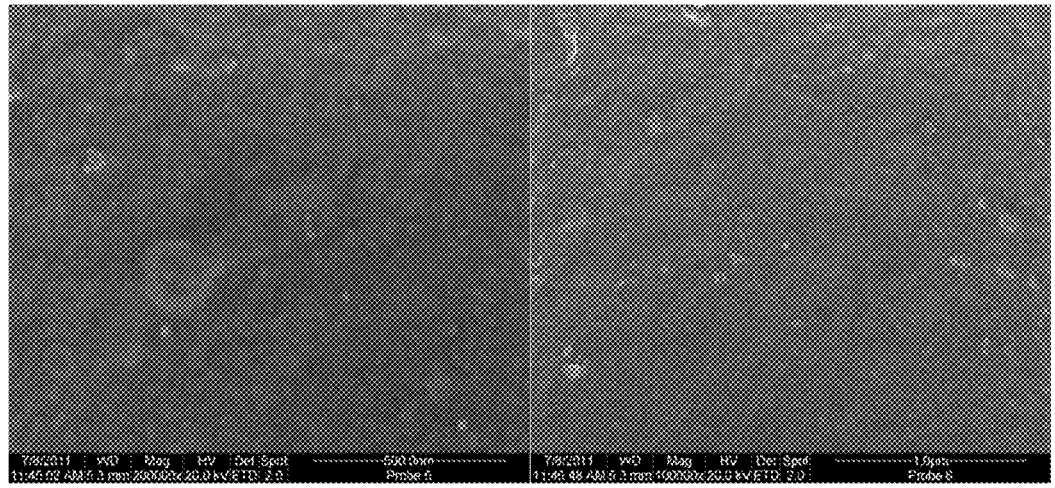
FIG. 15. Nr. 71 DG=18.4 µg/cm$^2$, 4 h, 50% initiator density, NP conc. 0.015 g/L.
Figure 16:
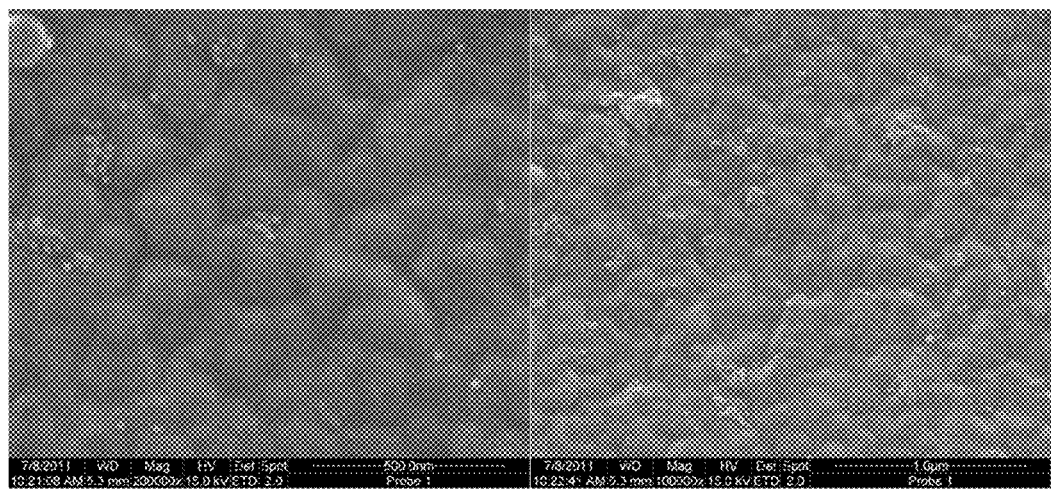
FIG. 16. Nr. 73 DG=40.8 µg/cm$^2$, 4 h, 50% initiator density, NP conc. 0.015 g/L.
Figure 17:
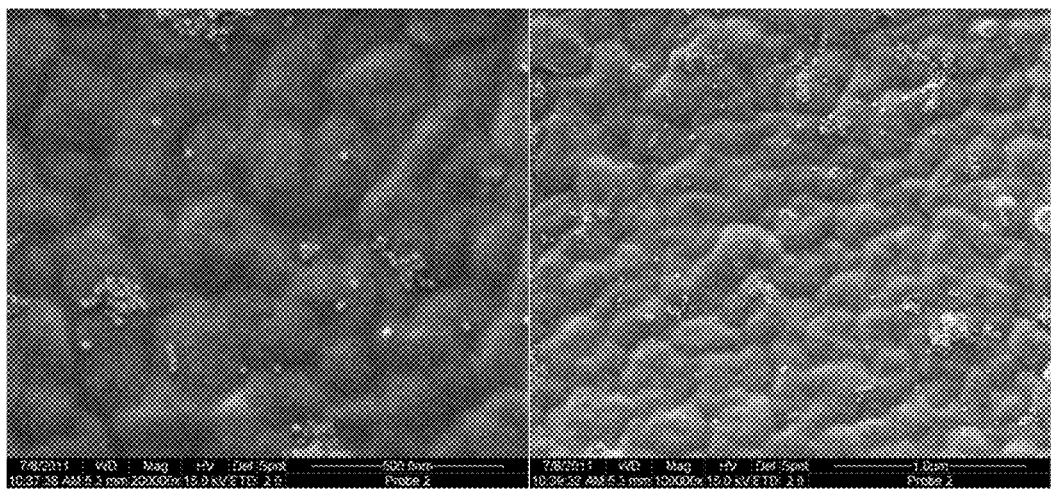
FIG. 17. Nr. 74 DG=32.7 µg/cm$^2$, 4 h, 20% initiator density (50% in reaction solution), NP concentration 0.015 g/L.

As can be seen in FIG. 10a, the fluid behavior for the unmodified membrane is well-behaved and orderly. As shown in FIG. 10b, the modified membrane at a rotational speed of 0 Hz is similarly ordered. For 9 and 22 Hz, however, the fluid behavior for the modified membrane is noticeably different compared to the 0 Hz case. The alignment of the polymer brushes with the oscillating magnetic field led to mixing, which caused the flow to change direction and/or velocity. This change appears as velocity vectors of varying direction and/or length as well as field lines with chaotic (non-parallel) pathways. This mixing reduces membrane colloidal fouling by reducing concentration polarization and deposition of particles onto the membrane surface. Mixing and increased fluid velocity at the membrane surface are both known to reduce fouling (Boussu et al., *J. Membr. Sc.*, 2008, 310, 51-65). Because the mixing provided by the filters described herein is located directly above the separation layer of the membrane, this benefit is even more pronounced in the filtration membranes described herein.

One interesting observation is the increased fluid mixing for 9 Hz compared to 22 Hz and 30 Hz. This effect can be due to the lateral distance traveled by the polymer brushes. That is, the faster the field is moving, the less time the polymer brushes travel in a given direction. A shortened travel time translates to an event where the brushes are not able to cover as much distance during lateral movement, thereby resulting in less mixing. Mathematically, the distance covered by the polymer brush/nanoparticle structure is inversely related to the frequency squared, as shown in Equation 2.

$$d \sim \frac{F}{m}\left(\frac{1}{f^2}\right) = w\left(\frac{1}{f^2}\right). \quad (2)$$

Here F is the force the magnetic field exerts on the magnetic nanoparticles, m is the mass of the magnetic polymer nanobrush, and the ratio between them is labeled as the constant (w). The distance (d) travelled is directly related to the frequency of the field (f). The dramatically shorter distances at higher frequencies would result in less brush travel and therefore less turbulence created in the fluid. In fact, the resulting mixing at 30 Hz is so small, that it appears to have almost no effect on fluid behavior.

The superparamagnetic nanoparticles experience both a force and a torque in an external magnetic field. Two mechanisms that govern the alignment of the nanoparticles in a field are Néel relaxation and Brownian relaxation. The nanoparticles physically rotate only when Brownian relaxation dominates Néel relaxation. Calculated Néel relaxation times for various examples were on the order of seconds, whereas calculated Brownian relaxation times were on the order of milliseconds. The force experienced by the nanoparticle is proportional to the gradient of the magnetic field. Optimal magnetic field frequencies to obtain maximum mixing can be about 5 Hz to about 100 Hz. In some embodiments, the field is oriented perpendicular to the polymer chains; i.e. parallel to the membrane surface. Preliminary calculations show that optimal mixing is obtained by a field strength of roughly about 0.01 Tesla to about 2 Tesla (up to about 10 Tesla, in certain embodiments). The most optimal field parameters will depend on the particular properties of a fluid and the filtration membrane, including the grafted polymer type and length, superparamagnetic nanoparticle characteristics, and the characteristics of the liquid feed to be filtered.

Electron Microscopy Analysis.

The scanning electron microscopic images in FIGS. 11-17 indicate that some areas can have a lower concentration of nanoparticles while other areas have uniform monolayer coverage. When these data are compared to PIV results, it becomes apparent that membranes can include both areas of mixing and more quiescent areas due to non-uniform coverage by the nanoparticles. Uniform coverage of the entire membrane surface by nanoparticles is typically desired for most applications. The polymer graft density can be optimized during preparation to achieve more uniform coverage. In general, a lower graft density leads to less adequate mixing. It is preferable that the graft density be high enough so that the nanoparticles will move together and produce enhanced mixing characteristics. However, a very high graft density will limit motion of the nanoparticles and in most cases, an appropriate graft density will need to strike a balance between these two factors.

Figure 18:
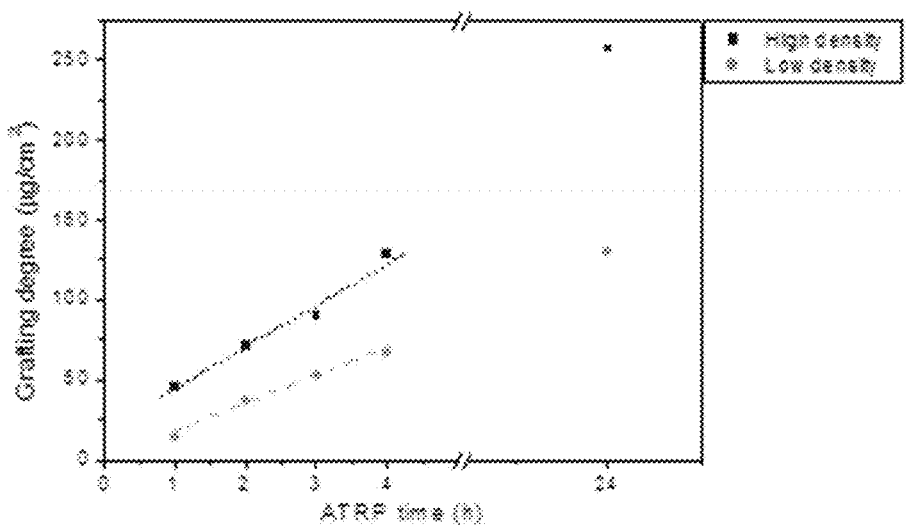
FIG. 18. Degree of grafting (DG) (µg/cm$^2$) of polyHEMA grafted from membranes with high (■) and low (●) initiator density. Low density sample was prepared by adding non-initiating species in the initiator immobilization step (1:1, v/v).
Figure 19:
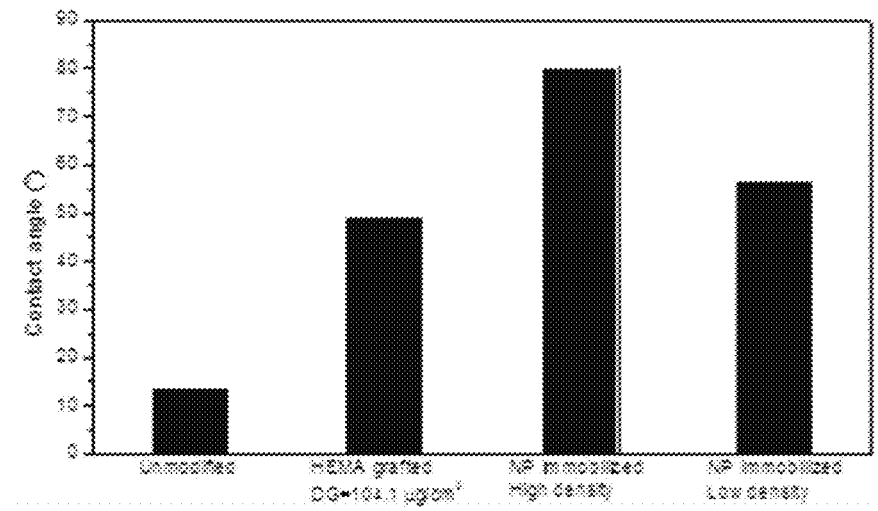
FIG. 19. Results of varying density of grafted polymer chains determined by contact angle (°). Low density sample was prepared by adding non-initiating species in the initiator immobilization step (1:1, v/v).

One method that can be used to control the graft density is through the use of surface modifications to vary the density of polymer chains on the membrane surface, as described above and in Schemes 2-5. Related species can be grafted to the substrate surface, one containing a reactive ATRP initiating group and the other without this group. By controlling the ratio of these two species, the amount of ATRP reactions can be effectively controlled. Accordingly, the number and density of polymer chains growing from the substrate surface (see FIGS. 18 and 19) can be controlled. It is also possible to control the density of initiating groups (and hence polymer chains grafted to the surface) via variation of the concentration of the initiator species during the grafting step (and without any of the non-initiating species present), however in some embodiments, the method utilizing the non-initiating species is preferred. Control of initiator density can be confirmed by measuring the weight increase after modification and by scanning electron microscopy.

For controlling the graft density, the concentration of 2-hydroxyethyl methacrylate (HEMA) in the ATRP can be about 2 M. The ratios of other components can be employed in ratios of approximately [HEMA]/CuCl/CuCl$_2$/BPy=100:0.5:0.2:1.75. A suitable and effective solvent system is Water/Methanol=1:1, however one skilled in the art can adjust the solvent components and/or ratios to provide a suitable set of properties. The initiator can be, for example, 2-bromo-2-methylpropanoyl bromide ($\alpha$-bromoisobutyryl bromide) or a similar species, and the non-initiating species can be, propionyl bromide or a similar species.

The length of the polymer chain used to attach the nanoparticles affects the observed mixing. In addition, changing the brush length typically leads to a different optimum oscillation frequency for the magnetic field. This in turn can affect energy consumption. Appropriate design for a particular effluent will include optimizing polymer chain lengths to minimize energy dissipation and maximize mixing.

The magnetic nanoparticles used in various embodiments should not attract foulants. Although many of the example embodiments discusses herein employ magnetic nanoparticles with carboxylic groups, other functional groups can be substituted to decrease attraction of certain foulants. Thus, the identity of the foulants will influence the best choice of functional groups on the magnetic nanoparticles. For example, amine-coated nanoparticles may be used in place of carboxy-coated nanoparticles. Although the chemistries necessary to attach the polymer chain to the nanoparticle must suit the type of functional group used on the nanoparticle, one skilled in the art will readily recognize the modifications needed.

Example 2

Magnetically Responsive Micromixing Membranes

The synthesis and evaluation of magnetically responsive micromixing NF membranes is described in this example. Particle image velocimetry (PIV) confirmed that the movement of polymer brushes at certain magnetic field frequencies induces mixing directly above the membrane surface. Nanofiltration performance is significantly improved (increased flux and salt rejection) with the magnetically responsive membranes by a rotating magnetic field because of reduced concentration polarization in the boundary layer.

A CPU-controlled alternating magnetic field apparatus consisting of two solenoids was constructed as described below. The membrane was placed inside a stirred filtration cell and the cell was placed in between the two solenoids so that the membrane barrier (topmost) layer was normal to the magnetic field generated along the longitudinal axis of the solenoids (see FIG. 1c). Because the brushes are concentrated on the membrane surface, the perpendicular magnetic field will impart its maximum torque and force. This leads to maximum PHEMA brush movement.

Materials.

Polyamide 20 µm neutrally buoyant seeding particles were obtained from Dantech Dynamics (Skovlunde, Denmark). Iron oxide magnetite superparamagnetic nanoparticles with 15 nm core diameter and 5 nm coating layer functionalized with carboxylic acid groups were purchased from Ocean Nanotech (Fayetteville, Ark., USA).

Chemicals.

Purified water was from a Milli-Q system from Millipore. All chemicals were at least 97% purity unless otherwise noted. Sulfuric acid was from Fisher Scientific; potassium permanganate, diisopropylcarbodiimide, N-hydroxybenzotriazole, ethanolamine, triethylamine, N,N',N',N'',N''-pentamethyldiethylenetriamine, and 4-dimethylaminopyridine (DMAP) were from Fluka; ethanol, methanol, acetonitrile, and hydrochloric acid (6 M) were from VWR; $\alpha$-bromoisobutyryl bromide, bipyridine (Reagent Plus), copper(I) and copper(II) chloride, 2-hydroxyethylmethacrylate (HEMA), hydrazine hydrate, 1-ethyl-3-(3-dimethylaminopropyl)carbodiimide (EDC), and N-hydroxysuccinimide (NHS) were from Sigma-Aldrich.

Membrane.

NF 270 flat-sheet membranes were obtained from Dow Filmtec. Membrane discs (25 mm diameter) were cut from the membrane sheets. Before use, the membranes were washed with Milli-Q water and then dried overnight at 40° C. The discs were then placed into individual plastic zip-top bags for storage.

Initiator Immobilization.

The ATRP initiator immobilization solution consisted of 2.76 g $\alpha$-bromoisobutyryl bromide, 1.515 g triethylamine, and 91.5 mg DMAP in 150 mL of dried acetonitrile. The membrane discs were placed in small glass vials to which 5 mL of this reaction solution was added. The samples were allowed to react for 2 hours at room temperature on a shaker table. This was followed by one acetonitrile wash, two methanol washes, and two deionized water washes, all for 1 minute. The membranes were then dried overnight at 40° C. and were then returned to storage.

SI-ATRP.

The monomer 2-hydroxyethylmethacrylate (HEMA) was purified through distillation and always used within 12 hours. The reaction solution for SI-ATRP consisted of HEMA (2 M), CuCl, $CuCl_2$, and bipyridine (BPy) dissolved in equal parts (v/v) water and methanol; the molar ratios HEMA:CuCl:$CuCl_2$:BPy were 100:0.5:0.1:1.5. First, HEMA and BPy were added to the solvent, and the stirred solution was degassed for 15 minutes. CuCl and $CuCl_2$ were then sequentially added to the solution with strong stifling and degassing in between. Membrane discs had been placed in vials and three times evacuated under vacuum and then filled with nitrogen gas. Immediately after preparation, 6 mL of reaction solution was injected into each of the sealed vials containing a membrane disc. Reaction time was 4 hours at room temperature. Thereafter, the membranes were placed in a quenching solution (500 mg $CuBr_2$ and 1250 µL N,N',N',N'',N''-pentamethyldiethylenetriamine in 100 mL methanol/water, 50/50, v/v) to stop polymerization and ensure the end of each polymer chain was capped with a bromine group. After 10 minutes in the quenching solution the membranes were washed with Milli-Q water for 2 minutes, washed with methanol for 1 minute, and allowed to rest in Milli-Q water for 2 hours with shaking. The membranes were then dried at 40° C. overnight and returned to storage.

Gabriel Synthesis Procedure.

To convert the alkyl halide ends of the polymer chains to primary amines, a Gabriel synthesis protocol similar to the procedure described by Monge and coworkers was used (Monge et al., *Macromol. Rapid Commun.* 2007, 28, 2272-2276). For the first step, 1 g potassium phthalimide salt was dissolved into 20 mL ethanol. 4.5 mL of this solution was placed into a small glass vial containing one membrane disc. The vials were sealed and placed in a 40° C. oil bath with shaking for 6 hours. After the reaction, the membrane was rinsed with ethanol, then with Milli-Q water twice for two minutes, and finally with ethanol before being dried. The second step included of dissolving 7 mL of hydrazine hydrate in 25 mL of 6 M HCl. 4 mL of this solution was placed into each small glass vial containing a membrane disc. The vials were placed in a 40° C. oil bath with shaking for 6 hours. Upon completion of reaction, the third step (washing) was performed, twice with Milli-Q water, once with methanol, again with water, once with ethanol, and finally once again with water to ensure that no phthalimide precipitate remained. Membranes were then dried and returned to storage.

Nanoparticle Coupling.

Carbodiimide activated amide formation was used. EDC (31.2 mg) and NHS (38.7 mg) were added to 10 mL Milli-Q water and shaken vigorously on a vortex mixer. Carboxyl shell $Fe_3O_4$ nanoparticles in buffer solution (0.3 mL; 5 g/L) were then added, but not agitated. 1.5 mL of this solution was added to a plastic jar containing a membrane disc. The container was then sealed and incubated in the dark for 4 hours. The membrane was then removed, washed twice in Milli-Q water for 5 minutes, briefly with ethanol, and finally in Milli-Q water for 10 minutes. The membrane was then dried overnight at 40° C. and returned to storage.

Membrane Surface Characterization by XPS.

Membranes were washed and dried before analysis. A Physica Electron 5800 ultra-high vacuum XPS-Auger spectrometer was used at a 45° take-off angle. 20 high-resolution scans focusing on the carbon (282-292 eV), nitrogen (394-406 eV), and iron (705-730 eV) regions were averaged to observe changes during the sequential functionalization steps.

Membrane Surface Visualization by FESEM.

Field emission scanning electron microscopy (FESEM) was used to image the filtration surface of the membranes. To prevent pore collapse, critical point drying was performed prior to analyzing samples with a JEOL field-emission scanning electron microscope (JSM-6500F, JEOL Ltd., Tokyo, Japan). Small membrane samples were placed into specimen holder vials. The vials were placed directly into a liquid transfer boat filled with absolute ethanol, and the boat placed into the critical point drying apparatus. Cold tap water was run to the jacket of the chamber, after which the chamber was filled with liquid carbon dioxide and allowed to sit for 5-10 minutes. The vent valve was then opened slightly to maintain the liquid carbon dioxide level. The drain valve was opened for approximately 3-5 minutes to remove the absolute ethanol. The vent valve and drain valve were then closed for 5-10 minutes after which the vent and drain valves were open again for 3-5 minutes. These two steps were repeated 7 times (a total of 8 flushes), until the absolute ethanol had completely displaced the water.

After flushing was complete, the chamber was again filled with liquid carbon dioxide. The temperature of the chamber was increased to 38° C. by replacing the cold water in the jacket with warm water. The carbon dioxide gas was slowly vented off. Samples were removed from the chamber and the vials and mounted on microscope stubs. Samples were sputter-coated with a 10 nm gold layer before imaging.

Monitoring of Mixing by PIV.

A time-resolved PIV system (Lavision Inc.) was used. The membranes were placed in a 90 mm diameter glass Petri dish that was filled with a mixture of 3.25% (w/w) 20 µm polyamide particles (to aid in observation of reflected light) and 0.02% (w/w) detergent acting as a surfactant to minimize polyamide particle aggregation in water. A permanent 2 kG (~50 G at the distance used in the PIV experiments) neodymium-iron-boron magnet was attached to the shaft of a variable speed motor and placed underneath the Petri dish. Observations were made at various motor speeds, as well as when the magnet was stationary. A green laser (527 nm) illuminated the fluid above the membrane. A high-resolution lens and camera yielded an observable area of 400×400 µm$^2$ at maximum resolution, corresponding to a pixel level resolution of 0.4×0.4 µm$^2$. All data sets consisted of 1000 frames taken over 1 second. By capturing the light reflected from the particles in the fluid, two-dimensional projections (4 µm depth of field) of the fluid velocity field were calculated over the field of view using the following procedure. First, the raw particle images of each data set were pre-processed to subtract background light. This was followed by standard PIV cross-correlation interrogation with a window size of 64×64 pixels with 50% overlap (see, for example, Raffel et al., *Particle Image Velocimetry: A Practical Guide*, Springer, Berlin, 2007). Window size was selected based on the size of the particles (20 µm) in the raw images. This produced a velocity vector every 32 pixels (12.8 µm) in units of m/s.

Membrane Permeate Flux Measurement.

The membrane discs were placed in an Amicon 8010 stirred filtration cell (Millipore). The cell was filled with Milli-Q water, and pressurized nitrogen provided the driving force for fluid flow through the membrane. The membranes were allowed to equilibrate for three minutes with the permeate line closed. The permeate line was then opened and allowed to flow for three minutes before measurements began. Permeate was collected for six minutes and the flux calculated. Five measurements (6, 12, 18, 24, and 30 minutes) were taken. The fluxes were stable after 18 minutes and reported in units of L/m²·h.

For investigation of the stimulus-response, an apparatus designed and built to generate an oscillating magnetic field at a desired frequency and intensity was used. The cell was placed in a custom-made apparatus consisting of two stainless-steel core solenoids; see FIG. 2. A computer-operated programmable logic controller (PLC) controlled the rate at which the two solenoids received power by alternatively activating two solid state relays. This determined the frequency of the alternating of the magnetic field. The solenoids were powered by an Agilent Technologies (Santa Clara, Calif.) 20 V, 25 A power supply. The solenoids were positioned on two opposite sides of the filtration cell so that the magnetic field direction was parallel to the topmost selective layer of the membrane. This arrangement provided the greatest lateral movement of the end of the nanoparticle-capped polymer brushes and thus the greatest agitation of the feed solution above the membrane surface. The output voltage and amperage of the power source and the frequency of field oscillation were varied to generate the desired alternating magnetic field of ~50 G and 10 Hz to match the field used in the PIV experiments. Filtrate fractions were collected in time intervals of 30 seconds, and salt concentrations were measured with a conductivity meter (Oakton, model CON11). Salt rejection was calculated as $$1 - \frac{conductivity_{permeate}}{conductivity_{feed}}.$$

Consecutive 30 second intervals were averaged to yield an average flux reported at one minute intervals. Fluxes stabilized after no more than 20 minutes, and average values and standard deviations were calculated for data for up to 1 hour for the control and for up to 2 hours for the modified membranes.

Membrane Surface Functionalization with Grafted Magnetic Nanoparticle-Polymer Conjugate Layers.

NF membranes were chosen because they have no permanent pores in their barrier and, consequently, accumulation of rejected matter (concentration polarization) and fouling occur only on the outer surface. SI-ATRP was used to grow poly(2-hydroxyethyl methacrylate) (PHEMA) chains from the surface of commercially available polyamide thin-film composite NF membranes. A variety of techniques can be used for grafting polymer chains onto membrane surfaces (Susanto et al., *Langmuir* 2007, 23, 7818-7830; Stuart et al., *Nature Materials* 2010, 9, 101-113; Ulbricht et al., *Chem. Mater.* 2005, 17, 2622-2631; Ying et al., *J. Membr. Sci.* 2003, 224, 93-106; Tomer et al., *Sep. Sci. Technol.* 2009, 44, 3346-3368).

Immobilization of the ATRP initiator was performed by an efficient acylation reaction of amino end groups of the polyamide. The conditions for controlled SI-ATRP from polymer membrane surfaces, which retains the end-functionality of the growing polymer chain, had been established by the inventors of embodiments described herein (*Macromolecules* 2009, 42, 1838-1848). After PHEMA grafting, a Gabriel synthesis reaction was used to convert the alkyl halide end group of the polymer chains to primary amines, which were capable of coupling to carboxylic acid coated iron oxide superparamagnetic nanoparticles through an amide linkage. An overview of the reaction sequence is shown in Scheme 2-1 below.

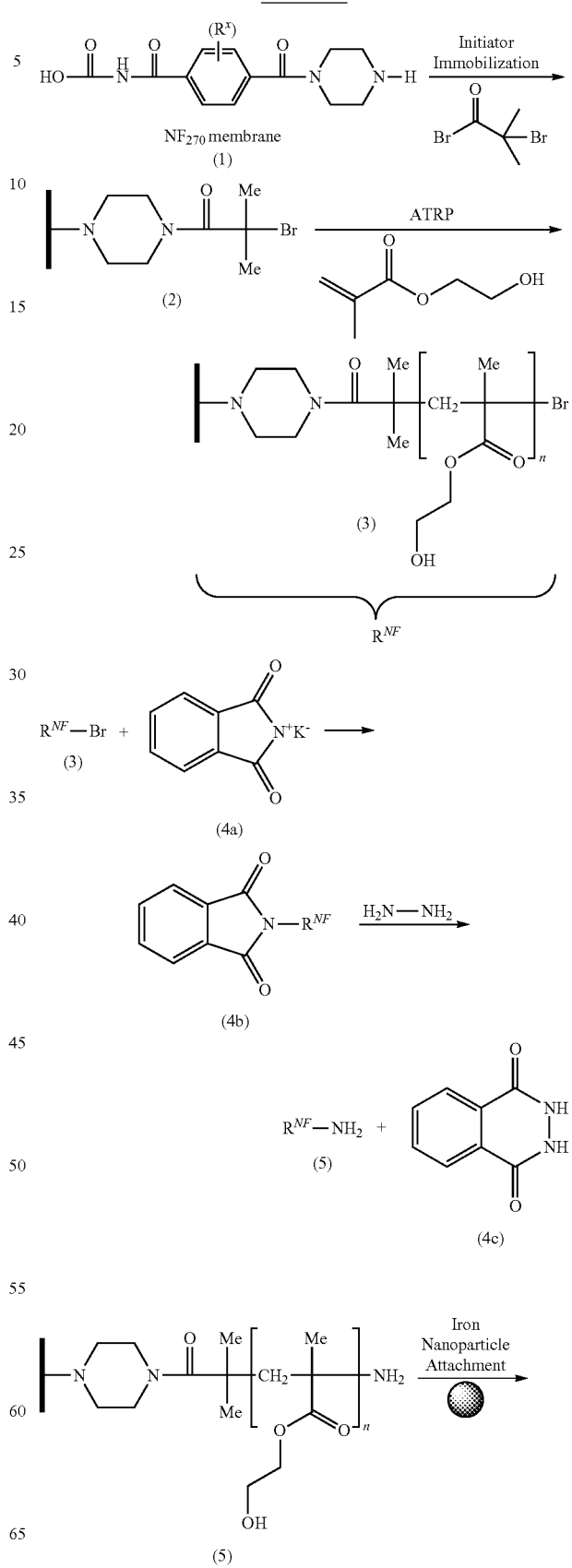

-continued

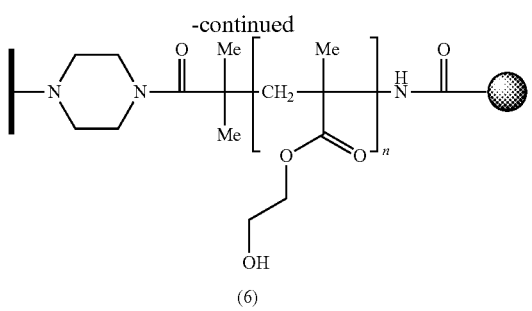

(6)

The preparation of previous micromixers involved significantly larger paramagnetic particles than are used for the micromixers described herein. The grafted PHEMA chains are more flexible in aqueous solutions than chains of other linked magnetic particles because the PHEMA is hydrophilic. More flexible chains induce more effective mixing. The increased flexibility and the large number of anchored mixers per surface area lead to highly effective mixing on a large scale.

In parallel SI-ATRP experiments with an established model system (track-etched PET membranes (Friebe and Ulbricht, *Macromolecules* 2009, 42, 1838-1848)), it was confirmed that the chosen reaction conditions led to controlled polymerization with a time-dependent linear increase of grafted polymer mass and corresponding linear growth of PHEMA layer thickness. After 4 hours of SI-ATRP, a chain length of at least 60 nm was achieved.

Because the density of amino end groups is known to be relatively low, the initiator/grafting density on the polyamide membranes is likely to be relatively low. The NF composite membranes have a thin (<50 nm) layer of a semi-aromatic poly(piperazinamide) on top of a porous polysulphone membrane and a non-woven polyester support (Freger, V. *Langmuir* 2003, 19, 4791-4797). The characterization of the surface functionalization of this membrane with a thin grafted layer is challenging. X-ray photoelectron spectroscopy (XPS) is one of the very few suitable methods because it provides information about chemical composition and structure for the top 1 to 10 nm of the sample. Consequently, XPS was used to follow the reaction steps; data are shown in FIG. 20.

Figure 20A:
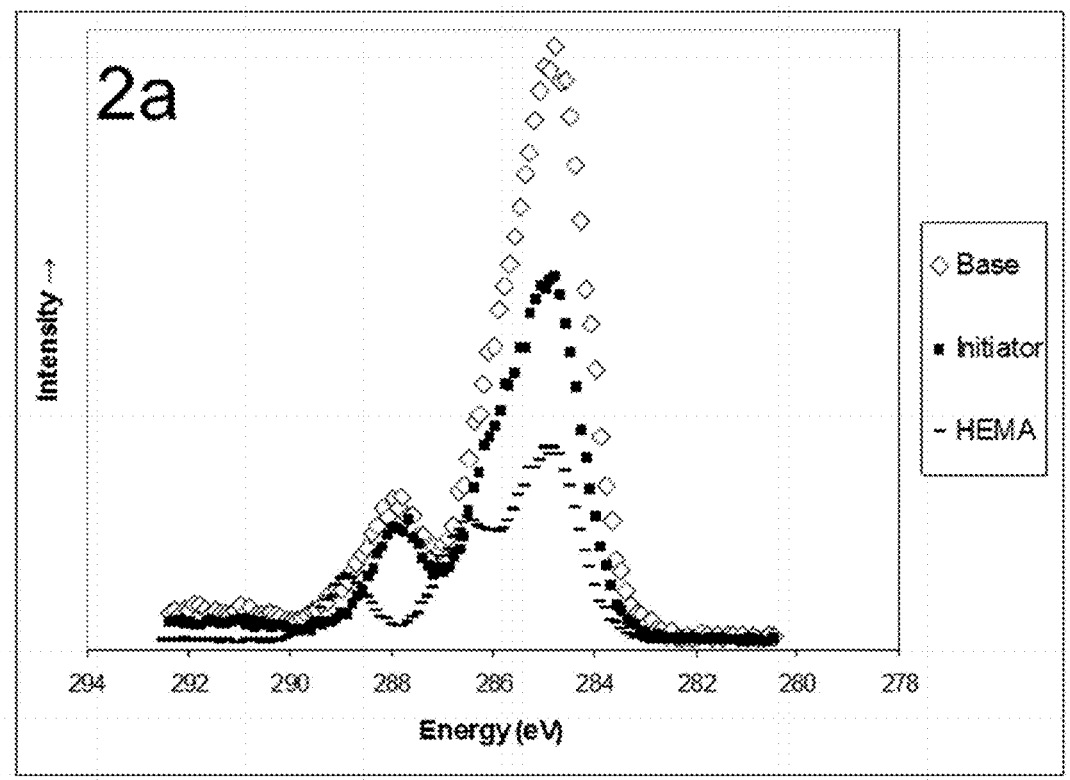
FIG. 20. High resolution XPS spectra for carbon (2a), nitrogen (2b), and iron (2c) regions during various stages of modification (corresponding to Scheme 2-1: Base=(1), Initiator=(2), HEMA=(3), Gabriel synthesis product=(5), Nanoparticle conjugates=(6)).

FIG. 20a presents a high-resolution spectrum of the is carbon region for various stages of functionalization. The peak associated with the C—OH bond appears at ~286.4 eV after PHEMA grafting. This functionality is not present in the base membrane. The pronounced development of this peak with polymerization indicates that PHEMA has been successfully grafted from the membrane surface.

The peaks at 288 and 289 eV are also of note. These correspond to carbonyl (C=O) and ester groups (O—C=O) respectively. The topmost surface of NF 270 membranes is rich in amide groups, which explains the strong peak for both the base and initiator-immobilized membranes at 288 eV. The excitation energy of the carbon atoms of carbonyl in the amide group introduced during initiator immobilization is ~288.2 eV; however, a distinct peak does not appear because of the small number of these groups compared to the various other carbonyl groups associated with the membrane matrix. After polymerization, however, the peak at 288 eV reduces to almost zero while the peak at 289 eV, assigned to ester groups, becomes quite defined. Thus, the presence of grafted PHEMA, covering the polyamide, is further confirmed.

Figure 20B:
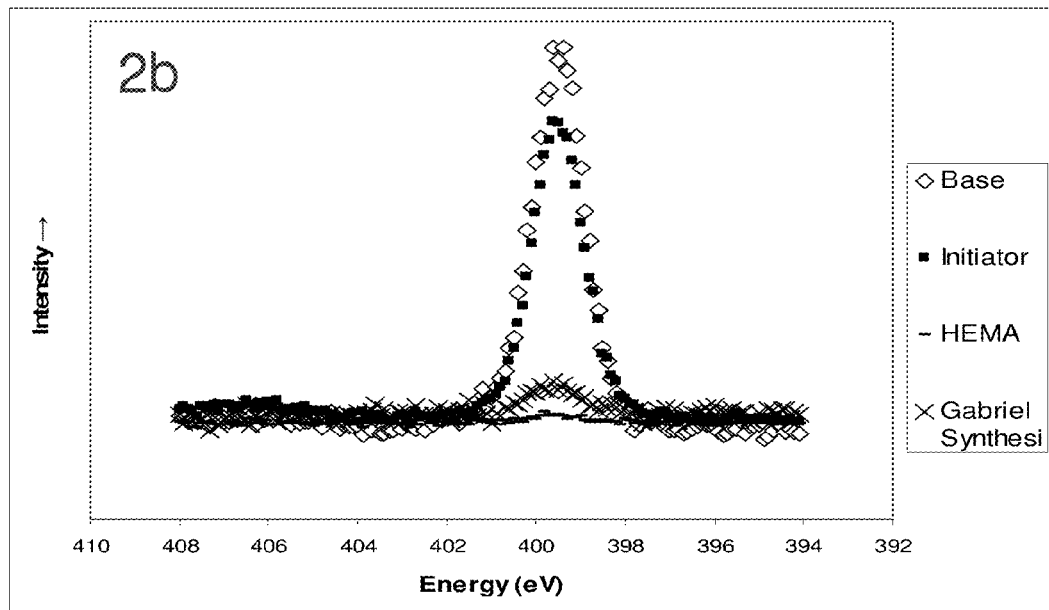

FIG. 20b is a high-resolution spectrum for the nitrogen region. The amine peak (399.5 eV) is present for the unmodified polyamide top layer. This peak is suppressed somewhat after immobilization of the initiator (containing no nitrogen) and then disappears completely after PHEMA grafting. This indicates that the dry grafted PHEMA layer is of significant thickness (>10 nm) so that the polyamide layer of the base membrane can no longer be detected with XPS. This is in line with a chain length of at least 60 nm and a sufficient grafting density to fully cover the polyamide surface with collapsed PHEMA. After the Gabriel synthesis the amine peak appears again, confirming the generation of amine functionalities on the ends of the PHEMA chains.

Figure 20C:
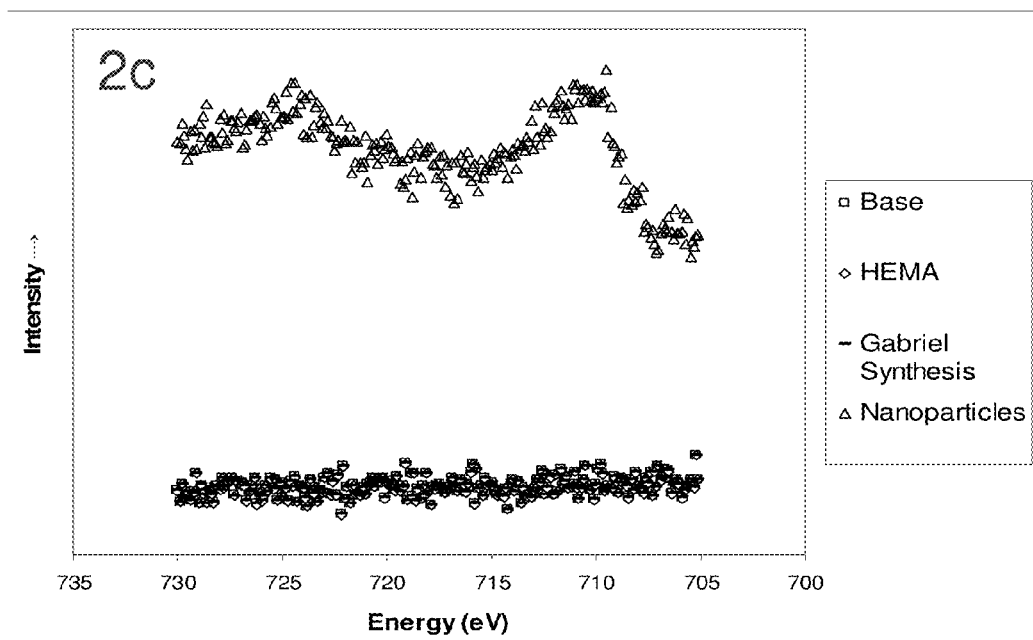

FIG. 20c is a high-resolution spectrum for the iron region. This was used to verify the presence of iron oxide nanoparticles after modification. No iron was detected until after attaching the nanoparticles, via carbodiimide activation, to amino-capped grafted PHEMA. Strong peaks appeared at 710 and 725 eV, which are associated with Fe(II).

Scanning electron microscopy (FESEM) was used to visually confirm nanoparticle attachment. FESEM creates 2-D images of the membrane surface topography by bombarding the surface with an electron beam. The membrane surface is coated with a thin film of conductive material (here 10 nm of Au), which scatters the incoming electrons. These backscattered electrons can be analyzed to generate an image of the topmost few nm of the membrane surface. FESEM is useful because it can verify nanoparticle attachment visually, and also give some indication of nanoparticle density on the membrane surface.

Figure 21:
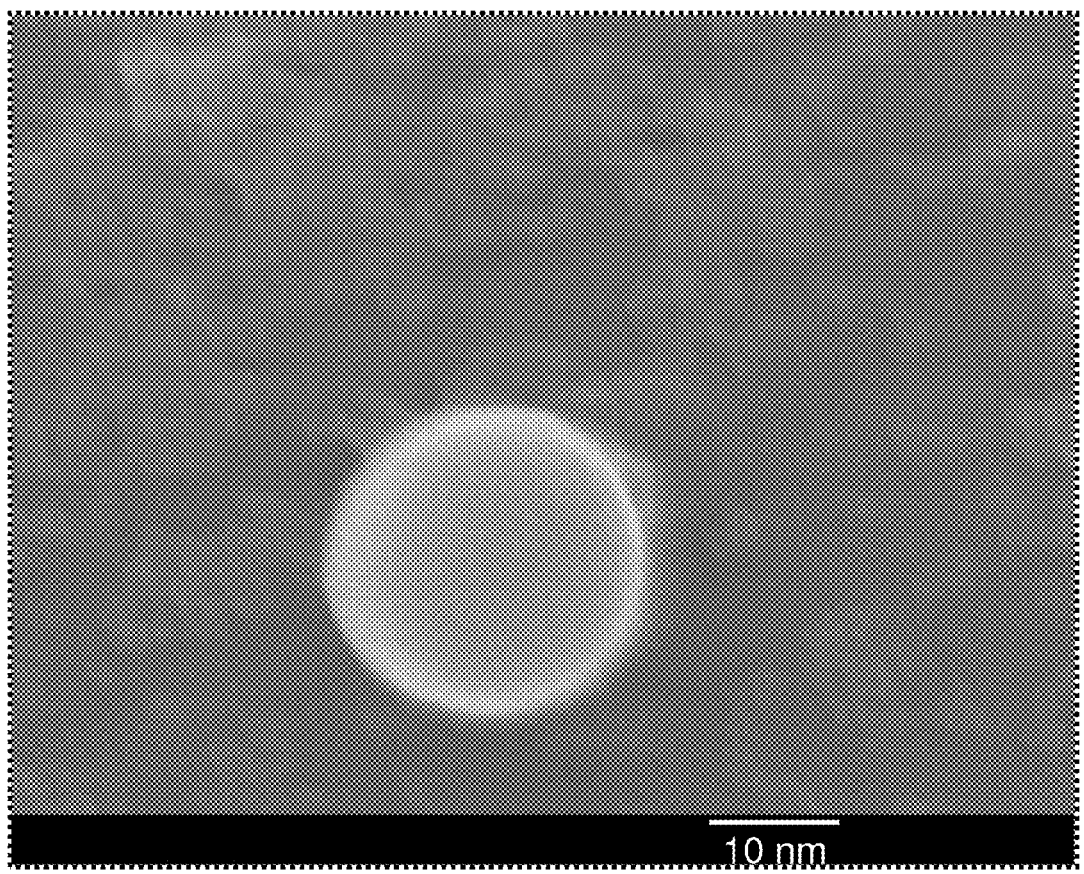
FIG. 21. Field emission scanning electron microscopy (FESEM) image showing an isolated nanoparticle on a membrane surface (100 k magnification).

FIG. 21 shows two FESEM images for a modified membrane. The larger image depicts the membrane surface at a 25 k magnification. A number of nanoparticles, the bright gray circles, can be seen on the membrane surface. An important aspect of the figure is that the nanoparticles are distributed across the membrane surface; i.e. they are not present in aggregates of multiple particles. This is important because an aggregate of nanoparticles would not effectively respond to a magnetic field, leading to inefficient mixing or no mixing at all. This image shows that the modification protocol was successful at attaching superparamagnetic nanoparticles to the end of PHEMA chains in a semi-controlled manner. The smaller inset image in FIG. 21 shows a view of a single superparamagnetic nanoparticle at 100 k magnification. The nanoparticle cannot be mistaken for other structures on the membrane surface because it is a perfect sphere and is quite bright. This image also confirms the nanoparticle diameter as roughly 20 nm.

Mixing Induced by an Oscillating Magnetic Field.

Once the polymer chains with magnetic nanoparticles were grafted to the membrane surface, evaluation of whether an oscillating external magnetic field could induce movement of the polymer brushes commenced. The evaluation was carried out using particle image velocimetry (PIV). PIV tracks the movement of dispersed particles in a fluid by using a camera to record the light reflected off dispersed particles so that time-resolved flow patterns and velocity vectors of the fluid can be determined. By monitoring the velocity profile of water above the membrane surface in the presence and absence of a magnetic field, macroscopic mixing due to movement of the polymer chains can be observed. The rotational speed of a permanent magnet placed below the membrane was varied to generate three different time-alternating magnetic fields, resulting in four observed frequencies: 0 (no rotation), 9, 22, and 30 Hz. The results for unmodified and functionalized membranes are shown in FIG. 10.

The fluid behavior above the unmodified membrane was well-behaved and orderly; i.e., the field lines are orientated in the same direction and were roughly parallel. The pattern above the modified membrane at 0 Hz was similar; however, for 9 and 22 Hz, the fluid behavior was noticeably different. Mixing caused the flow to change direction and/or velocity. This change appears as velocity vectors of varying direction and/or length as well as field lines with chaotic (non-parallel) pathways.

The superparamagnetic nanoparticles in an external field will experience both a force $\vec{F} = (\vec{\mu} \cdot \vec{\nabla})\vec{B}$ and a torque $\vec{\tau} = \vec{\mu} \times \vec{B}$, where μ is the magnetic moment of the nanoparticle and B is the external magnetic field. The force is proportional to the gradient of the field and will induce nanoparticle lateral movement. The torque will align the magnetic moment of the nanoparticle with the external field.

There are two mechanisms for this alignment. Néel relaxation time refers to the time required for the magnetic moments of the nanoparticles to orient randomly once an external magnetic field is removed without actual physical rotation. It is also the characteristic time for the magnetic moments of the nanoparticles to align with an external field without physical rotation. Similarly, Brownian relaxation time refers to randomization of the magnetic moments by Brownian motion once an external field is removed. Brownian motion also aligns the magnetic moments of the nanoparticles to the applied magnetic field. The nanoparticles will physically rotate only when Brownian mechanism dominates. Néel relaxation time is proportional exponentially to the magnetic volume of the particle, whereas Brownian relaxation is linearly dependent on the hydrodynamic volume of the nanoparticles. Because the movement of the nanoparticles is desired to induce mixing, the Brownian mechanism is preferred for the alignment of the magnetic moment to the external field.

Besides physical rotation, the nanoparticles will also experience a magnetic force for lateral movement. Based on the size of the nanoparticle used in the experiment, 15 nm magnetic core diameter and 5 nm coating, the calculated Néel relaxation time is much larger than 1 s, significantly longer than Brownian relaxation time estimated to be on the scale of only ~$10^{-3}$ s. Because the oscillating frequency used here lies between 0 and 30 Hz with equivalent time scale ranging between 0.01 and 1 s, only lateral movement due to the presence of magnetic force will be expected to be significant.

Interesting to note is the more pronounced fluid mixing for 9 Hz compared to 22 Hz. This is believed to be due to the lateral distance traveled by the tips of the polymer chains (at least 60 nm long, at relatively low density, i.e., little mutual hindrance). The length of the polymer chains will affect particle movement by limiting the distance the particle can travel. Longer polymer chains increase the flexibility and the distance the nanoparticles can travel, but also impart additional resistance to slow down the magnetic particle movement. The relationship between polymer chain length and magnetic particle movement provides a method for optimizing flux and particle rejection.

Because ATRP is a controlled polymerization mechanism, each grafted polymer chain will be essentially the same length. Any effect of polymer chain length should therefore be nearly identical for each polymer chain. For this reason, a discussion of chain length is omitted below.

The faster the applied field is oscillating, the less time the polymer chains travel in a given direction. Thus, the chains will not be able to cover as much distance during the lateral movement, thereby resulting in less mixing. Accordingly, the 30 Hz data for the modified membrane appears similar to the 0 Hz data. If the magnetic field is switching too quickly, then the chains can only travel a very short distance in a given direction, causing ineffective mixing. The viscous drag force, which is proportional to the viscosity of the fluid and the relative velocity of the fluid and the chains, is ignored here, assuming low viscosity of the solution and low relative velocity. This viscous drag force can become significant for solutions of higher viscosity and for more rapid movement of the nanoparticles. The distance covered by the magnetic polymer chain to a first approximation is proportional to the time squared and inversely related to the frequency squared, as shown in Equation 1.

$$d \sim \frac{F}{m}\left(\frac{1}{f^2}\right) = a\left(\frac{1}{f^2}\right) \quad (1)$$

Here F is the force the magnetic field exerts on the magnetic nanoparticles and m is the effective mass of the magnetic polymer-nanoparticle conjugate (F/m is re-labeled as the constant acceleration, a). This can be used to explain the results shown in FIG. 10. The distance traveled by the chains at 9 Hz is proportional to a/81. By contrast, the maximum distance traveled for the same chain, in the same field, at 22 Hz and 30 Hz is proportional to a/484 and a/900, about five to ten times shorter, respectively, than the distance traveled with 9 Hz external field. The dramatically shortened distances at these higher frequencies would result in less turbulence created in the fluid. In fact, the resulting mixing at 30 Hz is so small that it appears to have little or no effect on fluid behavior.

Influence of Membrane Functionalization and Magnetic Field on Separation Performance.

Separation performance of the membranes was investigated. The unmodified NF membrane had an average water flux of 35 L/m² h at 45 psig (3.1 bar). The modified membranes exhibited a noticeably lower average flux of 15 L/m² h, a decline of roughly 60%. This loss is larger than expected for an added grafted layer of a hydrophilic polymer with less than 100 nm thickness, but the conditions during chemical functionalization also likely reduced the permeability of the polyamide layer. Thereafter, NF studies have been performed with aqueous salt solutions (Table 2).

TABLE 2

Average flux and salt rejection for control and modified membranes (45 psig; 3.1 bar).

|  | 500 ppm $CaCl_2$ | | 2000 ppm $MgSO_4$ | |
| --- | --- | --- | --- | --- |
|  | Control | Modified | Control | Modified |
|  | Salt rejection (%) | | | |
| With Field | 34.4 ± 0.2 | 40.4 ± 0.2 | 66.5 ± 0.2 | 74.4 ± 0.2 |
| Without Field | 32.5 ± 0.2 | 34.2 ± 0.2 | 66.0 ± 0.2 | 67.7 ± 0.2 |

TABLE 2-continued

Average flux and salt rejection for control and modified membranes (45 psig; 3.1 bar).

| | 500 ppm $CaCl_2$ | | 2000 ppm $MgSO_4$ | |
|---|---|---|---|---|
| | Control | Modified | Control | Modified |
| | Filtrate flux (L/m² h) | | | |
| With Field | 13.4 ± 0.6 | 9.6 ± 0.7 | 5.4 ± 0.3 | 6.0 ± 0.4 |
| Without Field | 12.8 ± 0.6 | 7.8 ± 0.7 | 5.6 ± 0.4 | 4.0 ± 0.2 |

All filtrate fluxes were much lower than water fluxes, which can be attributed to concentration polarization; this effect was larger at higher salt concentration. In line with the reduced water permeability, the modified membrane had a higher salt rejection. This may be due to a slight change of the barrier structure in the course of the modification, but, importantly, no defects have been created. However, while the performance of the original membrane was not influenced by the magnetic field, significant changes occurred for the modified membrane. The filtrate flux and the salt rejection were higher, e.g., for the $CaCl_2$ solution by 30 and 15%, respectively. For the $MgSO_4$ solution with a higher salt concentration, the fluxes of the modified membrane with magnetic field were identical to those of the original membrane, but the salt rejection was higher.

These data are a result of a significantly reduced concentration polarization within the boundary layer of the membranes triggered by the magnetic field. Because the large effects occurred only for the modified but not for the control membrane, possible direct effects of the magnetic field on mixing of ions are negligible. This indicates that the surface-attached micromixers indeed improve the membrane performance.

SI-ATRP with PET Membranes as Model System.

Track-etched polyethylene terephthalate (PET) membranes (Oxyphen GmbH, Switzerland) with a pore diameter of about 690 nm were modified in an analogous manner to the NF membranes. The same ATRP initiator was immobilized to the surface of the pre-modified PET membranes, containing reactive hydroxyl groups in a density of about 1 $nm^{-2}$ (see *Macromolecules* 2009, 42, 1838-1848). By using track-etched PET membrane as model system, optimization of ATRP conditions (monomer concentration, ratio between ligand and transition metal catalyst and solvent) was achieved and subsequently also applied for the surface functionalization of the NF membranes via SI-ATRP, as described above. Because track-etched membranes consist of well-defined, uniform, straight-through cylindrical pores, this parallel study also allowed a facile way to monitor increase of grafted polymer mass with polymerization time and also of the grafted layer thickness. A capillary flow porometer (Porous Materials, Inc., USA) was used to measure the average pore diameter of the PET membranes before and after SI-ATRP of varied time. Due to the very narrow pore size distribution, which was preserved upon controlled SI-ATRP, the change in pore radius could be directly related to the dry layer thickness of the grafted PHEMA on the pore walls.

Figure 22:
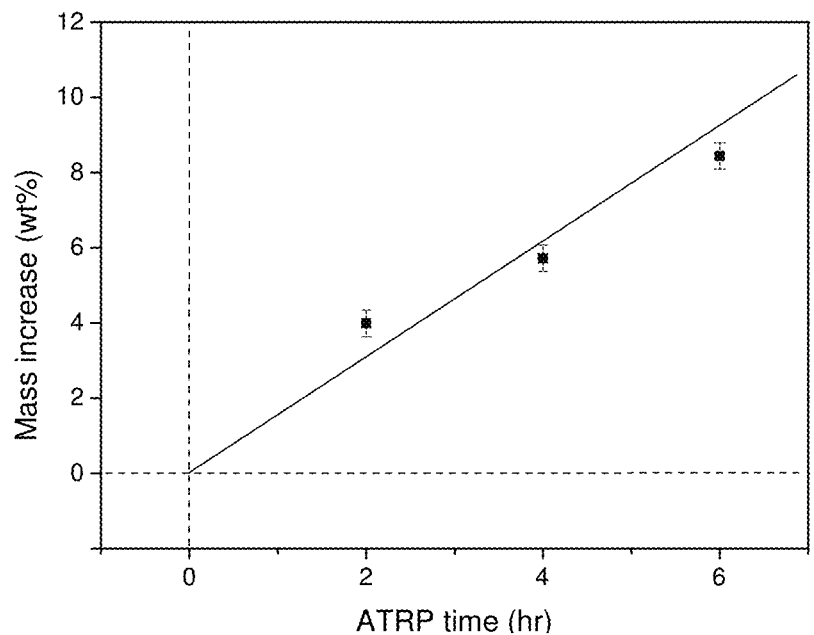
FIG. 22. Effect of ATRP time on degree of grafting of PHEMA on track-etched PET membranes under one set of optimized ATRP conditions (2 M HEMA in water/methanol, v/v=1:1; molar ratios HEMA:CuCl:CuCl$_2$:BPy were 100:0.5:0.1:1.5), which were the same as those used in NF membrane surface functionalization.

FIG. 22 shows the effect of ATRP time on the degree of grafting (DG) of PHEMA. Within 6 hours, the DG showed a linear increase along the ATRP time indicating the growth of polymer chains from the surface with immobilized initiator in a "living" manner.

Figure 23:
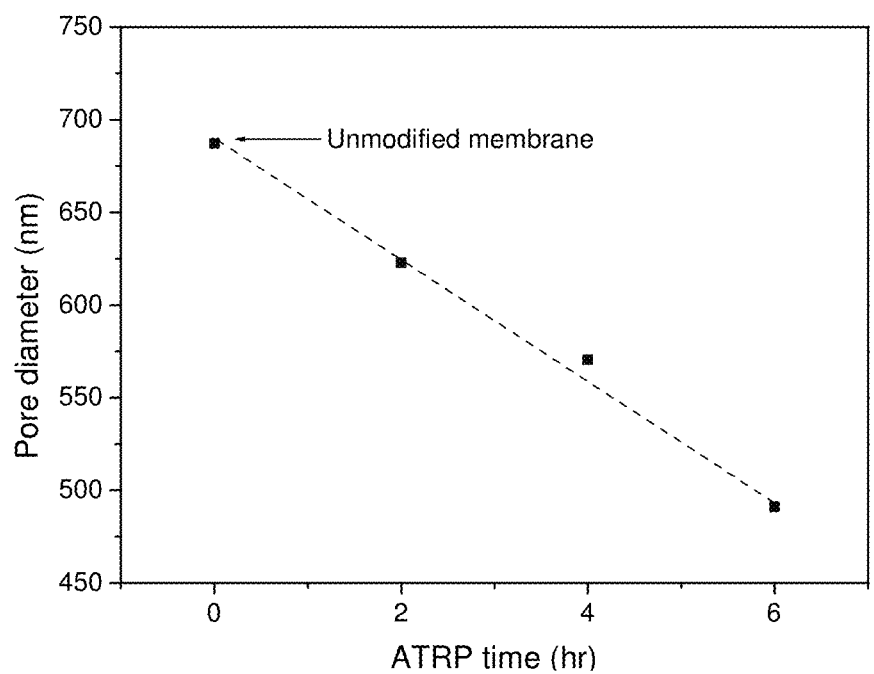
FIG. 23. Average pore diameter (from gas flow/liquid dewetting permporometry measurement) of track-etched PET membranes after grafting of PHEMA with different ATRP time (cf.

Data from pore diameter measurement are shown in FIG. 23. With the increase of ATRP time, pore diameter decreased significantly. The pore diameter of unmodified PET membrane used in this study was 690 nm and a linear decrease of pore diameter, corresponding to a linear increase of PHEMA layer thickness, with ATRP time was observed. Pore diameter after 4 hours was 570 nm, i.e., the dry grafted PHEMA was about 60 nm thick. Because of the high initiator/grafting density on the PET surface, the grafted PHEMA chains are in the "brush" regime and adopt a somewhat stretched conformation. Therefore, 60 nm is a conservative determination of average chain length; the fully stretched chain length, especially in water as solvent, can be longer. Because the polymerization growth conditions were the same (only the initiator/grafting density, i.e., the number of chains per area, was smaller for the NF compared to the track-etched membranes), the chains on the NF membranes were also roughly 60 nm in length.

This example therefore shows the active alteration of macroscopic flow via surface-anchored micromixers based on polymer-nanoparticle conjugates. Permeable, magnetically responsive NF membranes were successfully created by attaching superparamagnetic nanoparticles to the end of flexible hydrophilic polymer chains, which were grafted on the membrane surface using SI-ATRP. Each step of the chemical functionalization was confirmed using XPS. The fluid behavior the membranes described herein was observed under an oscillating magnetic field. Mixing above the membrane surface was observed using a PIV system. This mixing led to a significantly improved membrane performance with an external magnetic field as a result of reduced concentration polarization. Similarly, the mixing also led to reduced fouling by colloids present in the feed. The specific membranes described herein may not be efficient for all fouling conditions but adaptations of the grafted polymer-nanoparticle conjugate layers can be carried out by one of skill in the art using the techniques known for modifying polymer chains and brushes. Thus, the surface-grafted polymeric cilia-like micromixers that can be activated by an oscillating magnetic field can significantly improve the performance of a variety of filtration systems.

Example 3

Magnetic Field Responsive Nanofiltration Membranes

Base, thin film composite, nanofiltration membranes were modified using surface initiated atom transfer radical polymerization to graft poly(2-hydroxyethyl methacrylate) (poly-HEMA) chains to the surface of the membrane. A modified Gabriel synthesis procedure was used to attach superparamagnetic ($Fe_3O_4$) nanoparticles to the chain ends, as described in Example 2. Chain density and chain length were independently varied by adjusting the initiator density and polymerization time.

The performance of modified membranes was investigated by determining deionized water fluxes. Permeate fluxes and salt rejection were also analyzed for aqueous feed streams containing 500 ppm $CaCl_2$ and 2000 ppm $MgSO_4$. Each experiment was conducted in dead-end mode. Modified membranes displayed a reduced permeate flux and increased salt rejection compared to unmodified membranes. Because both grafted chain density and chain length affect membrane performance differently, the decrease in permeate flux and increase in salt rejection was not directly proportional to the increase in grafted polymer weight. Modified membranes displayed both increased permeate fluxes and increased salt rejection in the presence of an oscillating magnetic field compared to their performance in the absence of an oscillating magnetic field. Magnetically responsive membranes therefore represent a new class of fouling resistant membranes.

The grafted chain density and chain length are changed independently by changing the concentration of active SI-ATRP initiator and polymerization time. Both variables affect membrane performance. The results obtained here provide further evidence of the ability of these membranes to suppress concentration polarization and fouling and provide further improved membrane for filtration applications.

Materials.

NF 270, flat-sheet, thin film, composite polyamide membranes were donated by Dow Filmtec (Edina, Minn., USA). Membrane samples used in this example were cut from large sheets into circular specimens with a diameter of 25 mm. All membrane samples were washed with Milli-Q water before use to remove any protective coating layer that may be present. Iron oxide superparamagnetic nanoparticles with 15 nm core diameter and a 5 nm coating layer functionalized with carboxylic acid groups were purchased from Ocean Nanotech (Springdale, Ark., USA). All of the following chemicals were obtained from Sigma Aldrich (St Louis, Mo., USA). 2-Hydroxyethyl methacrylate (HEMA) was distilled under vacuum before use. Acetonitrile was purified by refluxing with boric anhydride and distillation before use. Copper (I) chloride (99.995+%) and copper(II) chloride (99.999%) were used without further purification. 2-Bromo-2-methyl-propionyl bromide (BMPB), propionyl bromide (PB), triethylamine (TEA), 2,2'-bipyridine (BPy), 4-(N',N'-dimethylamino) pyridine (DMAP), N,N',N',N'',N'''-pentamethyl diethylenetriamine (PMDETA), potassium phthalimide salt (>99%), hydrazine hydrate, hydrochloric acid (6 M), 1-ethyl-3-(3-dimethylaminopropyl)carbodiimide (EDC), N-hydroxysuccinimide (NHS), ethanol and methanol were used as received. The water used in all syntheses and measurements was from a Milli-Q system.

Initiator Immobilization.

A reaction solution was prepared from 10 mL freshly dried acetonitrile containing DMAP (5 mM) and TEA (10 mM). NF270 membrane samples were placed in small vials and 10 mL of the above mentioned reaction solution was added to each vial. Then, 100 μL pentamethyl diethylenetriamine (BMPB) was added to each sample and the vial was sealed. After reaction for 2 h on a shaker at room temperature, membranes were removed and rinsed with acetonitrile and water/ethanol mixture solution (1:1, v/v), then dried in a vacuum oven at 40° C. overnight.

To decrease the initiator density on the membrane surface, a mixture (1:1, v/v) of BMPB and propionyl bromide (PB) was used in the initiator immobilization step. PB served as a non-initiating species to achieve diluted initiator concentration and, consequently, lower grafted polymer chain density.

SI ATRP of polyHEMA.

Initiator immobilized membrane samples were placed in Schlenk flasks equipped with rubber stoppers (one membrane sample per flask) and the flasks were sealed. The flasks were evacuated and back-filled with argon three times. Freshly distilled HEMA (2 M) and BPy were dissolved in 1:1 (v/v) methanol/water mixture and purged with nitrogen for 30 min. Next, copper(I) chloride and copper(II) chloride were added to the solution with vigorous stirring under argon. The ratio between components in the ATRP reaction solution was [HEMA]/[CuCl]/[CuCl$_2$]/[Bpy]=100:0.5:0.2:1.75. Thereafter the reaction solution was transferred into the Schlenk flasks (7 mL per flask) by a syringe and the reaction mixture was incubated at room temperature for a predetermined time. The following reaction times were investigated: 1, 2, 3, 4 and 24 hours. After ATRP reaction, a quenching solution was used to stop the polymerization and to ensure that the polymer chain ends are terminated by an alkyl halide. The membranes were quickly removed from the Schlenk flask and immersed in 50 mL 1:1 (v/v) methanol/water solution containing 250 mg copper(II) bromide and 625 μL PMDETA. A 1:1 (v/v) water/ethanol mixture was then used to clean the membranes. After drying in a vacuum oven at 40° C. overnight, the degree of grafting, DG (μg/cm$^2$), was calculated by following equation:

$$DG = \frac{W_1 - W_0}{A_m}$$

where $W_0$ is the mass of the unmodified membrane and $W_1$ is the mass of the membrane after modification and drying. $A_m$ represents the area of the membrane (4.9 cm$^2$ in this example).

Gabriel Synthesis.

To convert the alkyl halide at the end of the polymer chains to a primary amine, a modified Gabriel synthesis protocol similar to that of Monge et al. was used. Initially, 4.5 mL of saturated potassium phthalimide solution in ethanol was placed into a small glass vial containing one membrane disk. The vials were sealed and placed on an incubator shaker at 40° C. for 6 h. After reaction, the membranes were rinsed twice with ethanol, then with a water/ethanol mixture for 2 min, and finally with ethanol before being dried. The second step consisted of dissolving 7 mL of hydrazine hydrate into 25 mL of 6 M HCl. The solution (4 mL) was placed into each small glass vial containing a membrane disk. The vials were placed on an incubator shaker at 40° C. for 6 h. Upon completion of the reaction, the membrane samples were thoroughly washed with water/ethanol mixture to ensure no phthalimide precipitate remained. Membranes were then dried under vacuum at 40° C. overnight.

Nanoparticle Coupling.

Nanoparticles were attached to the membrane surface by reacting carboxyl groups on the nanoparticle surface to the primary amine at the polyHEMA chain ends via an amide linkage. For the coupling, a carbodiimide activated amide formation protocol was used. 31.2 mg of EDC and 38.7 mg of NHS were added to 10 mL of Milli-Q water and shaken vigorously on a vortex mixer. Next, 0.3 mL of carboxyl shell $Fe_3O_4$ nanoparticles in buffer solution (5 g/L) were added, but not agitated. 1.5 mL of this solution was then added to a glass vial containing a membrane disk. The concentration of nanoparticles was 0.015 g/L. However 0.15 g/L (i.e. 10 fold higher concentration) was also used with membranes modified using 100% active initiator and a 4 hour polymerization time. The vial was sealed and incubated in the dark for 4 h. Next, the membrane was removed, rinsed twice with water and then washed in a water/ethanol mixture. The membrane was finally dried in a vacuum oven overnight at 40° C.

Surface Characterization.

Scanning electron microscopy (SEM) images were taken using a FEI/Philips Sirion Field Emission SEM (Hillsboro, Oreg., USA). Samples were coated with a 10 nm gold layer before SEM analysis.

X-ray photoelectron spectroscopy (XPS) of the membrane surface was conducted using a Physical Electron 5800 ultra-high vacuum XPS-Auger spectrometer (Chanhassen, Minn., USA) using a 45° takeoff angle. Twenty high-resolution scans focusing on the carbon (282-292 eV), nitrogen (395-407 eV), oxygen (527-541 eV) and iron (705-730 eV) regions were averaged to observe changes during the sequential functionalization steps. All samples were measured sequentially under the same conditions (area analyzed and incidence angle).

Water contact angles were measured using an OCA20 contact angle system (Dataphysics, Filderstadt, Germany) at room temperature. The static contact angle was measured by the sessile drop method as follow. First, a water drop (~5 μL) was lowered onto the membrane surface from a needle tip. Contact angles were calculated after 5 seconds using imaging software. Contact angles were measured at 7 different points on the membrane and an average value was used.

Membrane Performance.

Each membrane was rinsed with Milli-Q water for 30 seconds per side and placed in an Amicon 8010 stirred filtration cell (EMD Millipore, Billerica, Mass., USA). The cell was filled with a 1:1 (v/v) water/ethanol mixture. Pressurized nitrogen was used to flow the fluid through the membrane at 1.4 bar for 5 minutes. The membrane was removed, rinsed with water and then pre-compacted at 4.8 bar for 5 minutes with Milli-Q water. Finally, the membrane was taken from the cell and allowed to equilibrate in Milli-Q water for 2 hours. After this the Milli-Q water flux was determined.

The membrane was placed back in the stirred cell and salt solutions were pumped through the membrane at 3.1 bar. Filtration was conducted for 30 minutes, filtrate fractions were collected every 30 s. Flux values reported were averaged over a 5 min interval, thus 6 values were obtained for each experimental run. Fluxes are reported in Table 3-1 as an average value plus the range of the 6 values.

Membrane performance in an oscillating magnetic field was studied using a custom built system (see Examples 1 and 2). The stirred cell was placed between two stainless-steel core solenoids. A computer-operated programmable logic controller (PLC, Click Koya, Automation Direct, Cumming, Ga., USA) controlled the rate at which the two solenoids receive power by alternatively activating two solid-state relays. This determined the frequency of the alternating magnetic field. The solenoids were powered by an Agilent Technologies (Santa Clara, Calif., USA) 20 V, 25 A power supply. The solenoids were positioned on two opposite sides of the filtration cell so that the magnetic field direction was parallel to the topmost selective layer of the membrane and the frequency of the oscillating magnetic field was set at 10 Hz. Studies described in Examples 1 and 2 indicated that this arrangement yielded the greatest lateral movement of the end of the nanoparticle-capped polymer chains and thus the greatest mixing.

Salt concentrations were measured with a conductivity meter (Oakton, model CON11, Cole Parmer, Vernon Hills, Ill., USA). Salt rejection was calculated as:

$$\left(1 - \frac{C_p}{C_f}\right) \times 100\%$$

where $C_p$ is the conductivity of permeates and $C_f$ is the conductivity of the feed solution. Modified and unmodified (control) membranes were tested. Flux and rejection values were averaged over a 5 minute period. Experiments were run for 30 minutes giving 6 data points for each run. Results are reported in Table 3-1 as the average of the 6 values plus the range of the 6 values.

PolyHEMA was grafted to membrane surfaces using SI-ATRP as described in Examples 1 and 2. Superparamagnetic nanoparticles were then attached to the chain ends, thus the polyHEMA chains acted as spacers between immobilized particles and the membrane surface.

Results.

The use of SI-ATRP to grow polyHEMA chains from the surface of the membrane offers a number of advantages. As this is a so called "living" polymerization, the polymerization can be terminated after a specified time and then, selectively, the alkyl halide groups at the chain ends can be converted into amine groups via a modified Gabriel synthesis procedure. This ensures that the nanoparticles which contain a carboxylic coating are attached only to the chain ends via an amide linkage. Attachment of the superparamagnetic particles to the chain ends is important to maximize movement of the chains in an oscillating magnetic field.

SI-ATRP modification conditions were based on our previous work using PET membranes (Tomicki et al., *J. Membr. Sci.* 377(1-2) (2011) 124-133). As can be seen from FIG. 18, the grafting was well controlled and the degree of grafting (DG) increased linearly with reaction time over 4 hours. Moreover, even after 24 hours reaction time, an obvious, though decelerated, increase in DG was still observed, indicating that the chain ends were still "living". To achieve low chain density, a non-initiating species, propionyl bromide (PB), was added to the initiator immobilization solution in a 1:1 (v/v) ratio. By using a molar ratio of initiator (BMPB) to non-initiating species (PB) of 1:1.4 the DG was reduced by 50% for the same polymerization time. Since the reactivity of BMPB and PB are different, the initiator dilution factor cannot be used to directly determine the reduction in DG.

SEM images confirmed XPS results that showed samples with high chain density have a greater density of immobilized nanoparticles. Low chain density samples have fewer attached nanoparticles. Samples with the same chain density but different DG exhibited no significant difference in the number of attached nanoparticles on the surface. The concentration of nanoparticles in the solution used during the coupling step also affects the number of attached nanoparticles. For the same modification conditions, increasing the concentration of nanoparticles in solution leads to a higher density of attached nanoparticles on the membrane surface. The results indicate that only a fraction of the amine terminated polymer chains are attached to nanoparticles. Thus, the density of attached nanoparticles depends not only on chain density but also on the concentration of nanoparticles in solution.

Membrane performance was investigated in the presence of an oscillating magnetic field in dead end filtration. The results are shown below in Table 3-1. The unmodified NF membrane had an average water flux of 35 $Lm^{-2} h^{-1}$ at 3.1 bar. Table 3-1 shows that the water flux for the modified membranes is less than for the unmodified membrane. This lower flux is due to the additional resistance of the grafted nanolayer and perhaps modification of the permeability of the barrier layer during the five-step membrane surface modification. Experiments showed that salt rejections for the base NF 270 membrane of 32.5 and 66.0% for 500 ppm $CaCl_2$ and 2,000 ppm $MgSO_4$, respectively. Table 3-1 shows that rejection of $CaCl_2$ and $MgSO_4$ is slightly decreased at low grafting densities. These results again indicate that the observed changes in membrane performance are due to both the additional resistance of the grafted nanolayer as well as changes in the barrier layer during chemical modification.

tively little effect on the permeate flux of unmodified membranes. However, for modified membranes a significant improvement in both flux and rejection was observed in the presence of an oscillating magnetic field.

The results of the current study given in Table 3-1 are in agreement with these earlier results. As was the case for the DI water flux, Table 3-1 indicates that increasing the degree of grafting in general leads to a decrease in flux for $CaCl_2$ and $MgSO_4$ feed streams. Again as was observed for DI water

TABLE 3-1

Average fluxes and salt rejection for modified membranes with different polymer/nanoparticle density and DG at 3.1 bar.

| | | | | 500 ppm $CaCl_2$ | | | | 2000 ppm $MgSO_4$ | | |
|---|---|---|---|---|---|---|---|---|---|---|
| | | Water flux ($Lm^{-2}h^{-1}$) | | Flux | | Rejection (%) | | Flux ($Lm^{-2}h^{-1}$) | | Rejection (%) | |
| | | With | Without | ($Lm^{-2}h^{-1}$) | | With | Without | With | Without | | Without |
| DG ($\mu g/cm^2$) | Chain density | field ±0.5 | field ±0.7 | With field ±0.9 | Without field ±0.5 | field ±0.2 | field ±0.8 | field ±0.7 | field ±0.2 | With field ±0.2 | field ±0.7 |
| 38.8 | high | 16.0 | 14.8 | 9.1 | 5.6 | 35.4 | 32.8 | 5.3 | 4.5 | 68.1 | 64.4 |
| 116.3 | | 13.0 | 11.1 | 7.6 | 4.7 | 37.2 | 31.5 | 4.3 | 3.7 | 74.1 | 66.4 |
| 20.4 | low | 19.5 | 20.0 | 11.4 | 8.6 | 29.9 | 29.1 | 6.8 | 6.0 | 64.2 | 60.4 |
| 51.0 | | 18.0 | 17.1 | 10.1 | 8.3 | 32.3 | 30.1 | 6.0 | 5.4 | 67.1 | 65.2 |

Table 3-1 also shows that the water flux for a grafting degree of 38.8 $\mu g\ cm^{-2}$ is lower than for a grafting degree of 51.0 $\mu g\ cm^{-2}$. The former grafting degree was obtained at higher grafting density. Consequently the increase in resistance to permeate flow depends both on the density and length of the polymer chains. At both grafting densities, the water flux decreased with increasing chain length, but much lower fluxes were observed at higher grafting density.

Closer examination of the water flux data indicate that in all cases except for a grafting density of 20.4 $\mu g\ cm^{-2}$ the water flux increases in the presence of an oscillating magnetic field. Table 3-2 provides the percentage increase in water flux. This change in water flux is likely due to changes in the grafted polymer chain conformation in the presence and absence of an oscillating magnetic field. Changes in polymer conformation, e.g. unfolding enforced by the movement of the tethered nanoparticles, can lead to changes in resistance to permeate flow. The effect is greatest for the highest grafting density and non-existent for the lowest grafting density. However, except for the highest grafting density, the fluxes in the presence and absence of an oscillating magnetic field do fall within the uncertainty of the measurements.

fluxes, at a grafting degree of 38.8 $\mu g\ cm^{-2}$, the flux is lower than at a grafting degree of 51.0 $\mu g\ cm^{-2}$. The result indicates that both grafting density and grafting degree can be tuned independently in order to minimize the decrease in permeate flux due to the added resistance of the grafted nanolayer.

Table 3-1 indicates that in the presence of an oscillating magnetic field, for feed streams containing $CaCl_2$ and $MgSO_4$, the permeate flux is higher than in the absence of an oscillating magnetic field. Table 3-2 gives the percentage increase in flux. At higher grafting density the percentage improvement is higher than at lower grafting density. Flux data for 500 ppm $CaCl_2$ show a greater percentage improvement than for 2000 ppm $MgSO_4$.

A decrease in concentration polarization due to mixing of the fluid at the membrane surface leads to lower concentration of rejected species at the membrane surface and hence an increase in the permeate flux. The results in Tables 3-1 and 3-2 indicate that this is the case. A decrease in the concentration of rejected species at the membrane surface also leads to an increase in the apparent rejection coefficient of the membrane. Table 3-1 indicates that in the presence of an oscillating magnetic field the rejection coefficient increases for feed

TABLE 3-2

| | | 500 ppm $CaCl_2$ | | 2000 ppm $MgSO_4$ | |
|---|---|---|---|---|---|
| DG ($\mu g/cm^2$) | Chain density | Improvement in water flux (%) | Improvement in flux (%) | Improvement in rejection (%) | Improvement in flux (%) | Improvement in rejection (%) |
| 38.8 | high | 8 | 63 | 8 | 18 | 8 |
| 116.3 | | 17 | 62 | 18 | 16 | 12 |
| 20.4 | low | −3 | 33 | 3 | 13 | 6 |
| 51.0 | | 5 | 22 | 7 | 11 | 3 |

In previous experiments (Example 2), the unmodified NF membrane also displayed significantly lower flux than the DI water flux for aqueous feed streams containing 500 ppm $CaCl_2$ and 2000 ppm $MgSO_4$ due to concentration polarization. The presence of an oscillating magnetic field had relastreams containing 500 ppm $CaCl_2$ and 2000 ppm $MgSO_4$. Table 3-2 gives the percentage improvement in the rejection coefficient.

Closer examination of Table 3-2 indicates that the improvement in rejection is greater at higher chain density. The improvement in performance is generally greater at lower solute concentrations. Taken together the results indicate that the increase in permeate flux and rejection depend differently on chain density and chain length. Short chains will have less freedom of movement and will create less mixing than longer chains. However the movement of very long chains will be limited by viscous forces. Low chain densities will lead to less effective mixing while chain densities that are too high will lead to less movement due to steric hindrance.

Because these results indicate that at the highest chain density better performance is obtained, even higher chain densities can be advantageous. These results also indicate that at a given grafting density increasing the degree of grafting (chain length) generally improves rejection but leads to a lower improvement in flux. Thus, the results indicate that denser shorter chains can yield greater improvements in permeate flux at the expense of slightly lower improvements in rejection. It should be noted that in this work the frequency of the oscillating magnetic field was 10 Hz based. However, the optimum oscillation frequency can also depend on chain length and density.

In practice, modified nanofiltration membranes can be run in tangential flow mode. A number of considerations govern the economic viability of nanofiltration processes. Membrane productivity (total amount of feed that can be treated before the membrane module must be taken off line and cleaned), should be maximized. Membrane regeneration costs should be minimized by minimizing the cleaning time and the quantity of chemical cleaning agents used. Minimizing concentration polarization suppresses deposition of rejected species on the membrane surface, increases permeate flux and leads to an increase in the apparent rejection coefficient. Because the magnetically responsive nanofiltration membranes described herein are able to disrupt the concentration polarization boundary layer, they can radically improve membrane performance. Any increased costs associated with the establishment of an oscillating magnetic field and membrane surface modification can be offset by improved performance.

In this example, polyHEMA chains that act as micromixers were attached to the surface of nanofiltration membranes. Both the density and length of the polymer chains were controlled independently using surface-initiated atom transfer radical polymerization. Superparamagnetic nanoparticles were covalently attached to the chain ends. The results obtained here indicate that only a fraction of the polyHEMA chain ends are terminated with nanoparticles. Changes in nanoparticle density were confirmed by XPS and SEM as well as contact angle measurements.

Dead end filtration was conducted in order to determine membrane performance. Water fluxes for modified membranes were lower than for the base membrane due to the added resistance of the grafted nanolayer. Comparing performance of modified membranes in the presence and absence of an oscillating magnetic field, permeate fluxes and rejection of $CaCl_2$ and $MgSO_4$ generally increased in the former case. The increase was greater for higher densities of attached nanoparticles. The result indicate that optimization of the density of attached nanoparticles as well as the length of the polyHEMA chains can be performed to maximize the improvement in performance while minimizing the added resistance to permeate flow from the grafted nanolayer.

Example 4

Filtration of Model Produced Water

A model produced water (PW) was developed to have similar physical characteristics and fouling behavior as actual PW. The model PW mixture included soybean oil metal salts mixed with DI water.

Both modified nanofiltration (NF) membranes (as described in Example 1) and unmodified nanofiltration (NF) membranes were used to filter the model PW. An alternating magnetic field was applied for 10 seconds and then turned off for 120 seconds as previously described. The membranes were placed in a 50 mL Amicon stirred filtration cell connected to a reservoir. Filtration proceeded for 700 minutes during which the flux of all membranes decreased due to the highly fouling nature of the model PW. However, the modified membranes showed significantly less flux decline than the unmodified (control) membrane.

Figure 24:
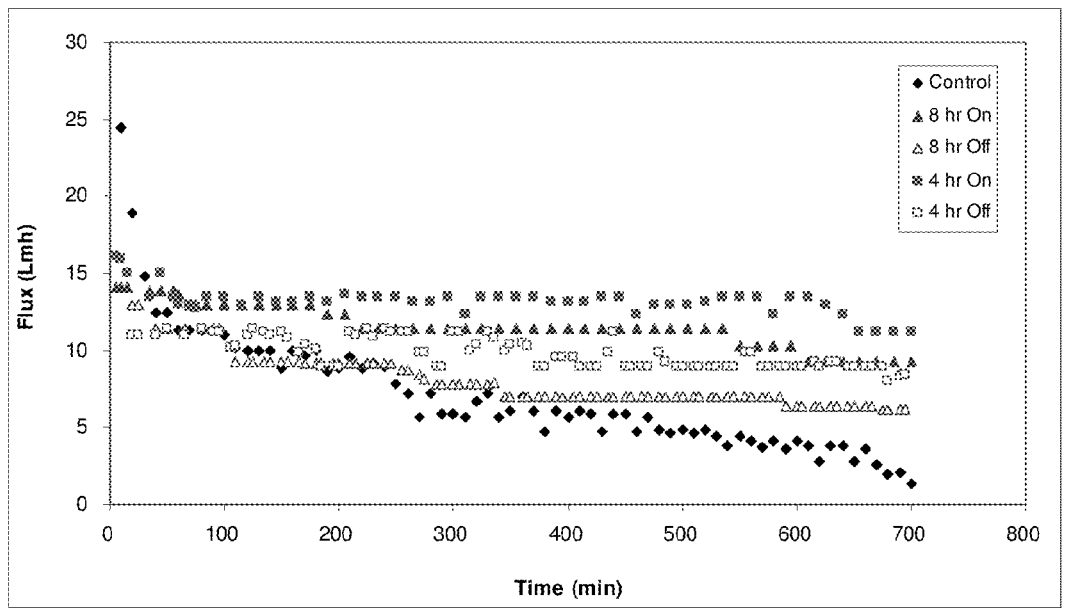
FIG. 24. Membrane flux during filtration of model PW. Solid points indicate when the magnetic field is on; open points are when the field is off.

As shown in FIG. 24, the flux through the unmodified membrane rapidly decreased during the first 50 minutes and steadily decreased thereafter (diamonds). This flux decline behaved similarly to the flux decline of an unmodified membrane filtering actual PW, confirming that our model PW was satisfactory and analogous to actual PW.

Figure 25:
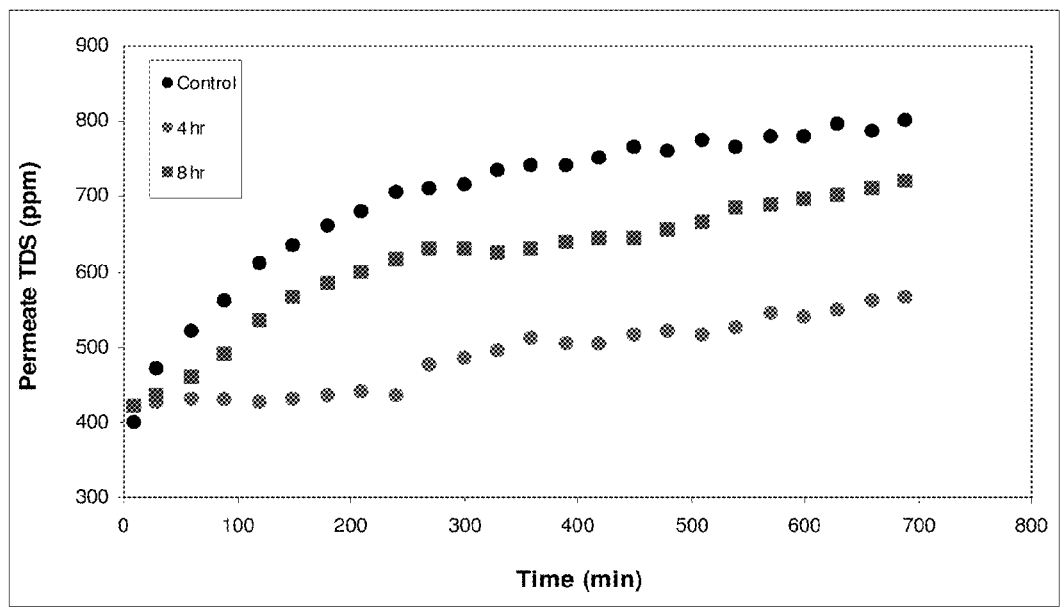
FIG. 25. Permeate quality measured during filtration of model PW.

The modified membranes showed three important improvements. First, the flux decline was much less severe and decreased only slightly over the course of the test. Second, application of the magnetic field (solid symbols) increased membrane flux for a short time after each application compared to the membrane flux during the 120 second off period (open symbols). This indicates that the application of a field led to mixing significant enough to reduce the amount of foulants that are irreversibly fouling the membrane surface. Third, the increase in membrane flux with field application was relatively constant throughout the test. This confirmed that the magnetic response of the membranes does not decrease with increasing filtration time or field applications. In addition, the permeate quality for the two modified membranes, measured as total dissolved solids (TDS), was improved compared to the unmodified membrane (FIG. 25).

Following the model PW filtration, the membranes underwent a very basic washing procedure. The membranes were first rinsed with DI water. A 0.5N NaOH solution was then filtered through the membranes to remove loosely deposited foulants. Finally, DI water was filtered through the membrane to remove any residual foulants and NaOH. The membranes were used to treat the model PW for another 280 minutes, followed by another washing procedure, 280 minutes of filtration, washing, and finally another 30 minutes of model PW filtration.

Figure 26:
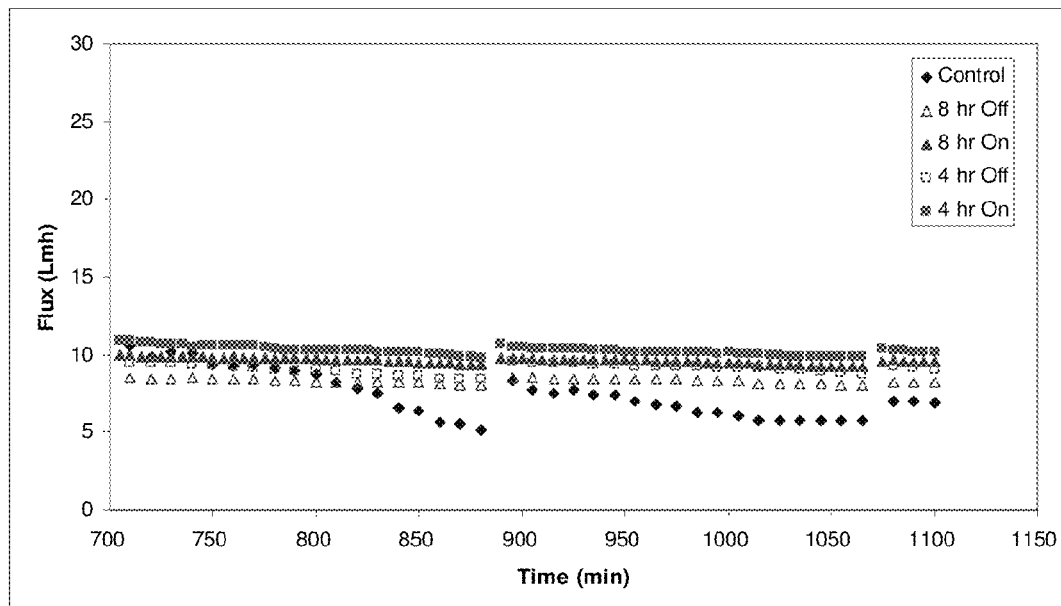
FIG. 26. Membrane flux during filtration of model PW following washing cycles.

As shown by FIG. 26, the modified membranes recovered a greater percent of their original flux (~12 Lmh) than did the unmodified membrane (~25 Lmh). As with the previous filtration, the modified membranes showed constant magnetic response and very little flux decline. The unmodified membrane showed little flux recovery and a greater flux decline (diamond symbols). Permeate quality followed similar trends as seen in FIG. 24.

This preliminary data shows that the modified membranes, in an alternating magnetic field, have improved performance compared to unmodified membranes. In addition, the modified membranes were more easily cleaned. A stronger and more specific cleaning procedure can be used to improve the flux recovery of the modified membranes to greater than 90%. Although the modified membranes displayed a lower initial membrane flux due to the increased resistance due to the presence of the grafted PHEMA chains, the throughput of the membranes overtime was higher than the unmodified membranes. Additionally, because the flux and rejection of the modified membranes was more reproducible with repeated simple cleanings, the modified membranes have a longer operational lifetime. This greatly decreases capital costs because fewer membranes need to be purchased. The reduction in capital costs far outweighs the marginally higher operational costs associated with the electricity needed to generate the magnetic field.

Figure 27:
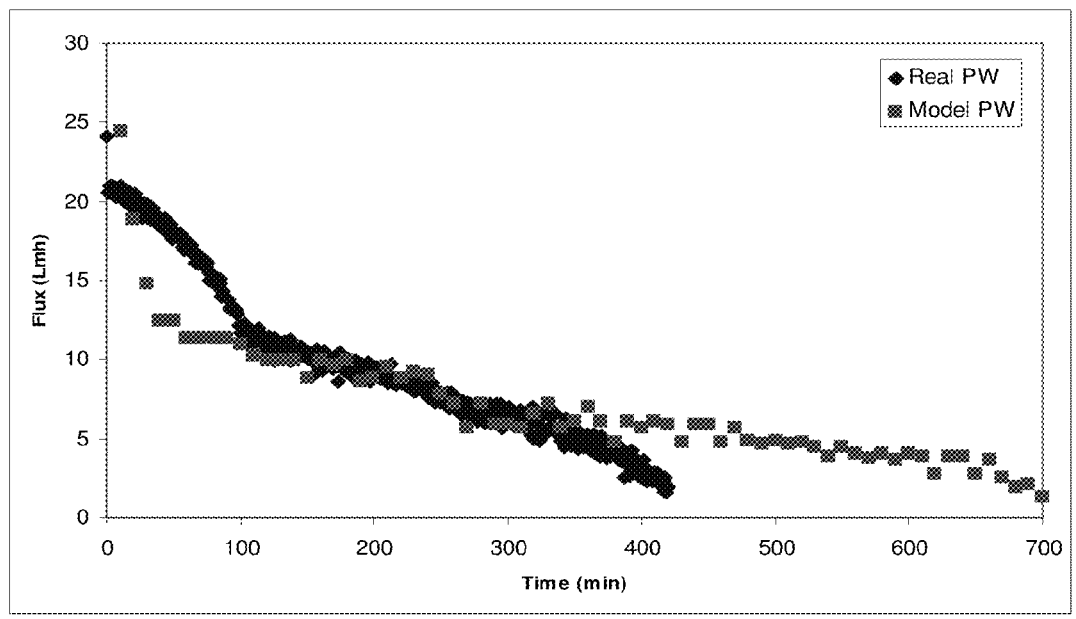
FIG. 27. High flux decline during filtration of both model PW and actual PW.
Figure 28:
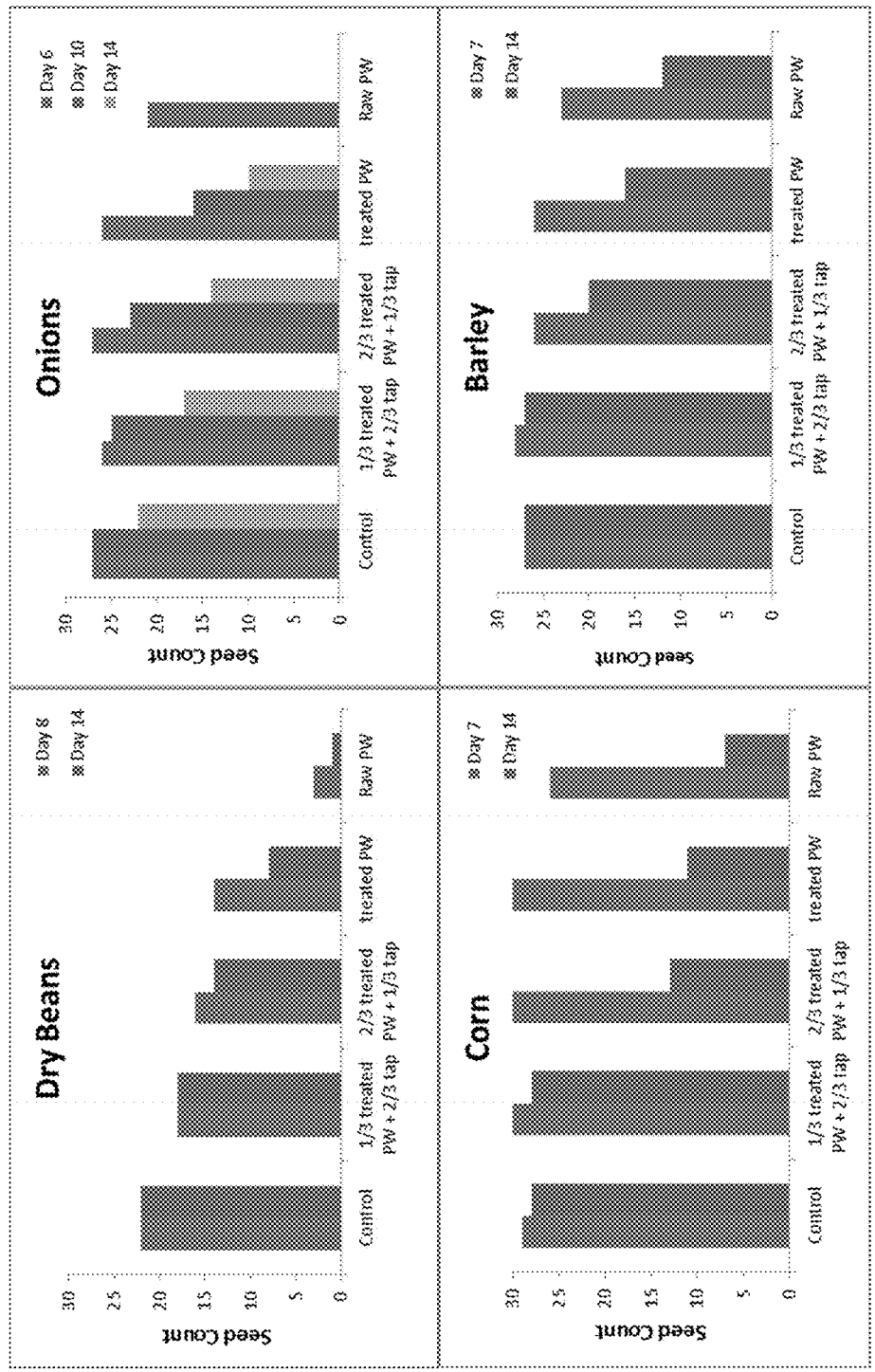
FIG. 28. Effect of treated PW dilutions on plant seedling germination (a=dry beans; b=onions; c=corn; d=barley).

The highly fouling nature of the model PW compared to an actual PW sample from an operating coal bed methane well in northern Colorado is shown in FIG. 27. Filtration of both the model and actual PW resulted in an initially rapid decrease in membrane flux followed both a constant decrease in flux. Although the flux declines are not identical, the model PW results in a similar overall flux decline as the actual PW.

Example 5

Filtration of Produced Water

Actual produced water (PW) was filtered following the procedure used for the filter and wash cycles using the model PW described in Example 3. The same alternating magnetic field variables were also used. The resulting permeate (clean water product) was then tested, in various dilutions, as a potential irrigation water.

Five types of water were tested:
1) raw, untreated PW;
2) treated PW using modified membranes (as in Example 1) in an alternating magnetic field;
3) two parts treated PW mixed with one part tap water;
4) one part treated PW mixed with two parts tap water; and
5) tap water, which acted as a control.

Four species of commercially important seeds were selected, which ranged from highly salt sensitive to fairly salt tolerant. The species selected, in increasing order of salt tolerance, were dry beans (most sensitive), onions, corn, barley (most tolerant). Blotting towels were wetted with one of the five waters, the seeds were added to the blotting towels, and the assemblies were placed in large, clear plastic bags. The seeds were kept at room temperature and had 8 hours of light applied each day. The number of healthy seeds was counted at the end of 6, 7, 8, 10, and/or 14 days, depending on the standard described by the State of Colorado Seed Lab. The waters containing more foulants (further to the right of FIGS. 28a-d) yielded a noticeable decrease in healthy seeds compared to the control. The 1/3 treated PW dilution (#4) performed comparably to the control, especially for corn and barley.

Although preliminary, the data show that treated PW, in certain dilutions, can be suitable as irrigation water for many plant species. This confirms the feasibility of the technology by providing a practical commercial product, and aids the goals of the U.S. Department of Energy's Advanced Research Projects Agency-Energy (ARPA-E) to reduce dependence on foreign commodities.

Example 6

Remote-Controlled Valve Functions Via Magnetically Responsive Capillary Pore Membranes The example evaluates the various modification steps in the preparation of magnetically responsive membranes in a controlled environment. Track-etched poly(ethylene terephthalate) (PET) microfiltration (MF) membranes with a pore diameter of about 650 nm were used to characterize the modification chemistry because of their near-uniform pore diameter, well-understood cylindrical pore structure, and isotropic construction. Poly(2-hydroxyethyl methacrylate) (poly-HEMA) chains were grafted from the membrane surface in a controlled manner using SI-ATRP. The density of the grafted polyHEMA chains was varied via the density of surface-immobilized ATRP initiator. By varying the density of the initiation sites for polymerization, high and low density functionalized membranes were prepared. The membranes were modified by adapting the protocol of Examples 1 and 2, used for functionalization of polyamide NF membranes, to the functionalization of PET MF membranes. In this example, the preparation and characterization of capillary pore membranes comprising superparamagnetic nanoparticles tethered to the ends of hydrophilic chains is described, and the response of such membranes with varied grafting densities and chain lengths to different types of magnetic fields is evaluated.

Thus, polyethyleneterephthalate track-etched membranes with a pore diameter of 650 nm were functionalized via surface-initiated atom transfer radical polymerization with grafted poly(2-hydroxyethylmethacrylate). Grafted chain length and density were varied. Superparamagnetic nanoparticles ($Fe_3O_4$; core diameter 15 nm) were selectively covalently coupled to the end groups of the grafted chains. The membranes were characterized by grafting degree, X-ray photoelectron spectroscopy, electron microscopy, zeta potential and pore size in dry state via gas flow/pore dewetting permporometry. The results confirmed that all functionalization steps were well controlled. Water permeability measurements allowed estimation of the hydrodynamic pore diameter of the membranes, and, hence, the hydrodynamic polymer layer thickness on the pore walls. The water permeability of the nanoparticle hybrid membranes was then measured in a static or an alternating external magnetic field. Significant and reversible decreases of permeability were observed, with the largest effects for membranes with high polymer grafting density and long polymer chains (hydrodynamic layer thickness up to 100 nm). The maximum change in effective pore diameter was only 6%. However, the estimated change of swollen polymer layer thickness (originally between 60 and 100 nm) was up to 13 nm. The functionality of the membranes can be tuned by variations of straightforward parameters such as pore size or grafted chain lengths. The example is relevant as system for altering the effective thickness of grafted polymer layers on a surface by an external magnetic field for various applications, such as those described herein.

Materials.

Water was obtained from a Milli-Q purification system from Millipore (Billerica, Mass.) and had a measured conductivity of 0.054 µS/cm. All chemicals were 97+% unless otherwise noted. Sulfuric acid was from Fisher Scientific (Schwerte, Germany); potassium permanganate, N,N'-diisopropylcarbodiimide (DPCI), N-hydroxybenzotriazole, ethanolamine, triethylamine, and 4-N,N-dimethylaminopyridine (DMAP) were from Fluka (Munich, Germany); dimethylformamide (DMF) was from Acros Organics (Geel, Belgium); ethanol (pure), methanol, acetonitrile, and hydrochloric acid (6 M) were from VWR (Darmstadt, Germany); α-bromoisobutyryl bromide, 2-hydroxyethylmethacrylate (HEMA), 1-ethyl-3-(3-dimethylaminopropyl)carbodiimide (EDC), 1-hydroxybenzotriazolehydrate (HOBth), and N-hydroxysuccinimide (NHS) were from Sigma-Aldrich (Munich, Germany). Iron oxide core, oleic acid shell superparamagnetic nanoparticles with a core diameter of 15 nm were purchased from Ocean Nanotech (Fayetteville, Ark., USA).

Membranes.

Polyethylene terephthalate (PET) 400 microfiltration (MF) membranes were obtained from Oxyphen AG (Lachen, Switzerland) in sheet form. The average pore diameter was measured to be ~650 nm using gas flow/pore dewetting permporometry. Although 650 nm is larger than the nominal pore size of 400 nm given by the manufacturer, the value agrees with previous findings. Before functionalization, the membranes were washed with Milli-Q water for 1 minute, then in methanol for 15 minutes, and finally in ethanol for 1 minute with gentle mixing. Membranes were dried for 30 minutes at 45° C. in a vacuum oven.

Membrane Modification.

Figure 29:
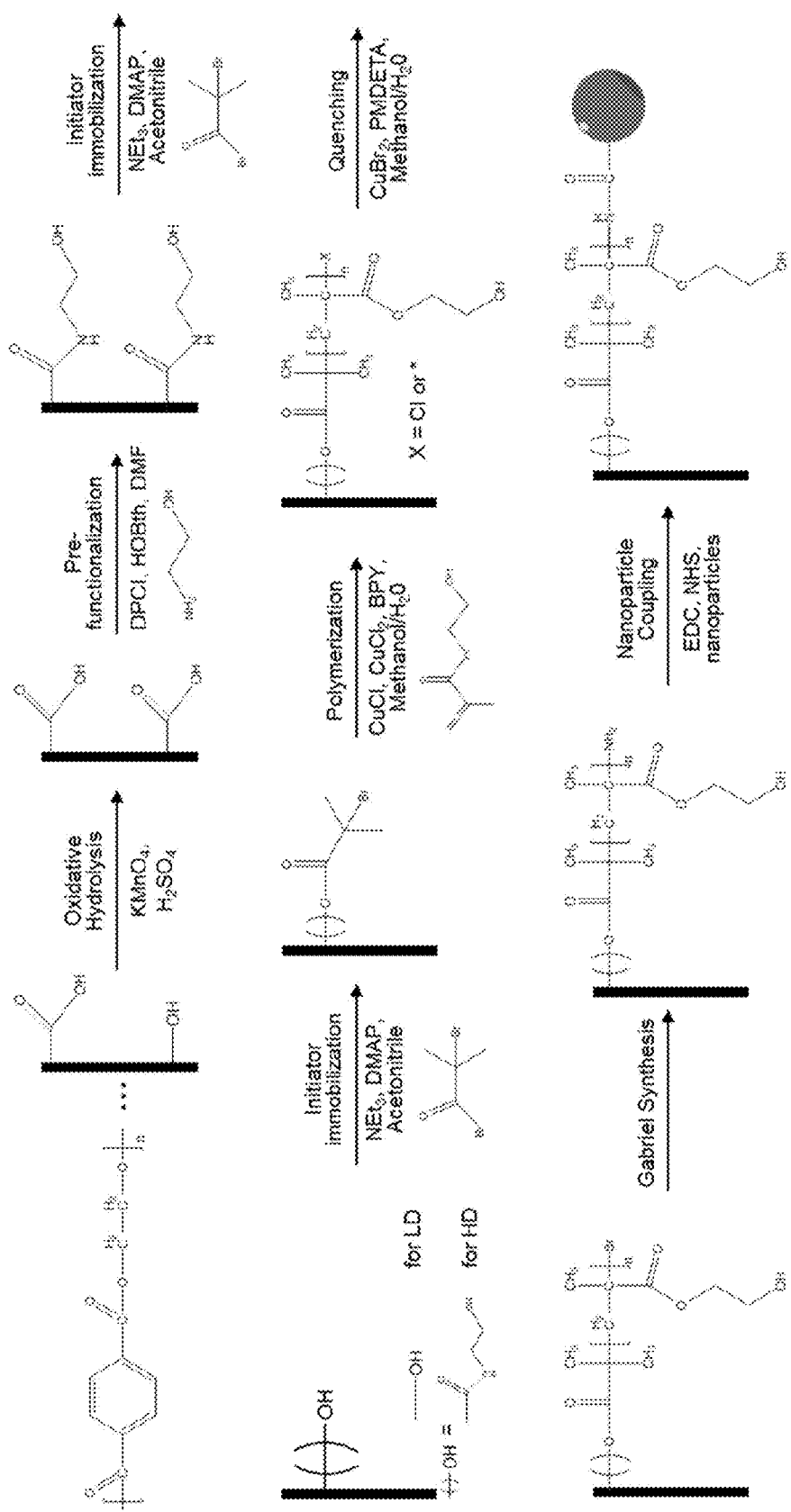
FIG. 29. HD and LD functionalization schemes for PET membranes. The HD scheme increases the number of initiation sites by converting surface hydroxyl and carboxyl groups into hydroxyl terminated amides. The LD scheme generates initiation sites only at the hydroxyl groups present on the as-received membrane surface, not the carboxyl groups.

An overview of the functionalization process, initiator immobilization through nanoparticle coupling, is shown in FIG. 29. Two functionalization protocols, high density (HD) and low density (LD), were performed. For the HD method, a four-step functionalization procedure was used to increase the number of possible initiation sites on the membrane surface. Briefly, ester groups and hydroxyl groups on the membrane surface were first hydrolyzed and oxidized, respectively, to carboxyl groups. These newly oxidized groups along with carboxyl groups originally present on the membrane surface were used, via amidation, to introduce hydroxyl functionalities. Finally, via esterification, the bromine-terminated SI-ATRP initiator was attached. The LD procedure consisted of immobilizing the initiator to the as-received membranes with no pre-functionalization. There were fewer initiation sites on the LD membranes as compared to the HD method, since the α-bromoisobutyryl bromide only bound to the hydroxyl groups originally present on the membrane surface.

Oxidative Hydrolysis.

The dry membrane sheets were placed in a solution of 7.50 g $KMnO_4$ in 150 mL 0.75 N $H_2SO_4$ and tightly sealed. The membranes were reacted for 2.5 hours under gentle shaking. The membranes were then washed twice with purified water, four times with 6 M HCl for two minutes, four times with water for two minutes, and finally twice with ethanol for two minutes. The membrane sheets were then dried for 3 hours at 50° C.

Pre-Functionalization.

The membrane sheets were submerged in a solution of 2.30 g HOBth and 0.95 g DPCI in 150 mL DMF. The membranes were reacted in for 30 minutes with gentle shaking. The membranes were washed twice with DMF and then immediately placed in a solution of 4.58 g ethanolamine in 150 mL DMF for 3 hours under gentle shaking. The membrane sheets were washed twice with DMF for two minutes and twice with ethanol for two minutes. The membranes were then dried for 30 minutes in a 45° C. vacuum oven.

Initiator Immobilization.

The procedure as described in Examples 1 and 2 was followed. Briefly, the pre-functionalized membrane sheets were cut into 25 mm diameter discs. These discs were reacted in a solution of 1.515 g triethylamine, 91.5 mg DMAP, and 2.76 g α-bromoisobutyryl bromide in 150 mL dried acetonitrile for two hours at room temperature.

SI-ATRP.

The HEMA monomer was purified through distillation before use in SI-ATRP to remove any inhibitors present. The pure monomer was degassed with argon gas for 10 minutes. Both LD and HD membranes followed the same SI-ATRP procedure as described in Examples 1 and 2. The reaction solution consisted of HEMA (2 M), CuCl, $CuCl_2$, and BPy dissolved in equal parts (v/v) water and methanol. The molar ratios of the final solution were 100:0.5:0.1:1.5 for HEMA:CuCl:$CuCl_2$:BPy. The reaction occurred at room temperature for a chosen reaction time, which was varied to study grafting kinetics. Thereafter, the membranes were placed in a quenching solution (500 mg $CuBr_2$ and 1250 μL PMDETA in 100 ml equal parts methanol/water (v/v)) to terminate the polymerization and ensure the end of each polymer chain was capped with a bromine atom.

The amount of polyHEMA grafted from the membrane, i.e., the degree of grafting (DG), can be readily calculated by dividing the membrane mass difference before and after SI-ATRP grafting by the specific area of the membrane.

$$DG = \frac{m_{ATRP} - m_{base}}{A_{specific}} \quad (1)$$

The specific area is the sum of the surface area of the top and bottom of the membrane plus the surface area of the pores surface; i.e., the total area available for grafting. The surface area of the pores was calculated by using the known membrane thickness (pore length) as well as calculated pore density (see eq. (2)) and measured average pore diameter (described below). Furthermore, using a known density of grafted pHEMA (1.15 g/cm$^3$) it is possible to confirm that the DG values obtained yield similar grafted layer thicknesses as those determined using PMI and the Hagen-Poiseuille equation (see eq. (2)).

Gabriel Synthesis Procedure.

A Gabriel synthesis reaction was used to convert the terminal bromide to a primary amine, as described in Examples 1 and 2. Because the PET 400 membranes are quite stable, DMF was used as a solvent rather than ethanol. The stronger polarity of DMF is advantageous for the reaction. The discs were reacted in a 60° C. oil bath for six hours in a solution of 3 g potassium phthalimide salt in DMF. Gentle shaking was used to ensure good mixing. Next the discs were reacted in a 60° C. oil bath in a solution of 7 mL hydrazine hydrate in 25 mL of 6 M HCl for 6 hours again with gentle shaking.

Nanoparticle Coupling.

Carboxylic acid coated nanoparticles were covalently bound to the primary amine capped polyHEMA chains via a proven coupling reaction yielding an amide bond. The discs were incubated in a solution of 31.2 mg EDC, 38.7 mg NHS, 0.3 mL nanoparticle stock solution, and 10 mL DI water for 4 hours in the dark. After incubation, the membrane was removed, washed, and dried. Dispersions of the $Fe_3O_4$ nanoparticles in water, adjusted to different pH values, were characterized using a ZetaSizer from Malvern, Inc. (Malvern, U.K.)

Permporometry.

A capillary flow porometer (Porous Materials, Inc., NY, USA) was used to measure the average pore diameter in dry state of the various membrane discs using a gas flow/pore dewetting procedure, with Galwick (surface tension 16 dyn/cm) as the wetting liquid, analogous to previous work (see, e.g., Friebe and Ulbricht, *Macromolecules*. 42 (2009) 1838-1848; Friebe and Ulbricht, *Langmuir*. 23 (2007) 10316-10322). Permporometry tests were performed twice for each membrane sample.

Membrane Permeability.

The dry membrane discs were placed in an Amicon 8010 stirred filtration cell (Millipore, Billerica, Mass.) connected to an open reservoir providing a hydrostatic pressure for fluid flow through the membrane. The membranes were allowed to equilibrate for 3 minutes with the permeate line closed. The permeate line was opened and allowed to flow for 3 minutes before measurements began. Permeate was collected for 5 minutes and then returned to the reservoir to maintain equal pressure over the course of the filtration. Three measurements were taken; thereafter the membrane was removed, washed briefly with MilliQ water, and stored. The Hagen-Poiseuille equation was used to calculate pore density for the unmodified membrane:

$$\rho_P = \frac{128 \cdot \eta \cdot l \cdot V}{A \cdot \pi \cdot \Delta P \cdot d^4 \cdot t} \quad (2)$$

Here $\rho_p$ is the pore density, d is the pore diameter (from permporometry; cf. 2.8.1), $\Delta P$ is the trans-membrane pressure, l is the membrane thickness, $\eta$ is the viscosity of water, and V/A*t is the volume of permeate through an area of membrane per unit time, also called flux. Assuming that the now known pore density will not change due to modification, the pore diameter for all functionalized membranes in wetted state was then obtained from water permeability. All membrane permeabilities are reported in units of L/(m²*hr*bar), abbreviated as Lmh/bar. Membrane permeability measurements for each membrane type were done in triplicate.

Figure 30:
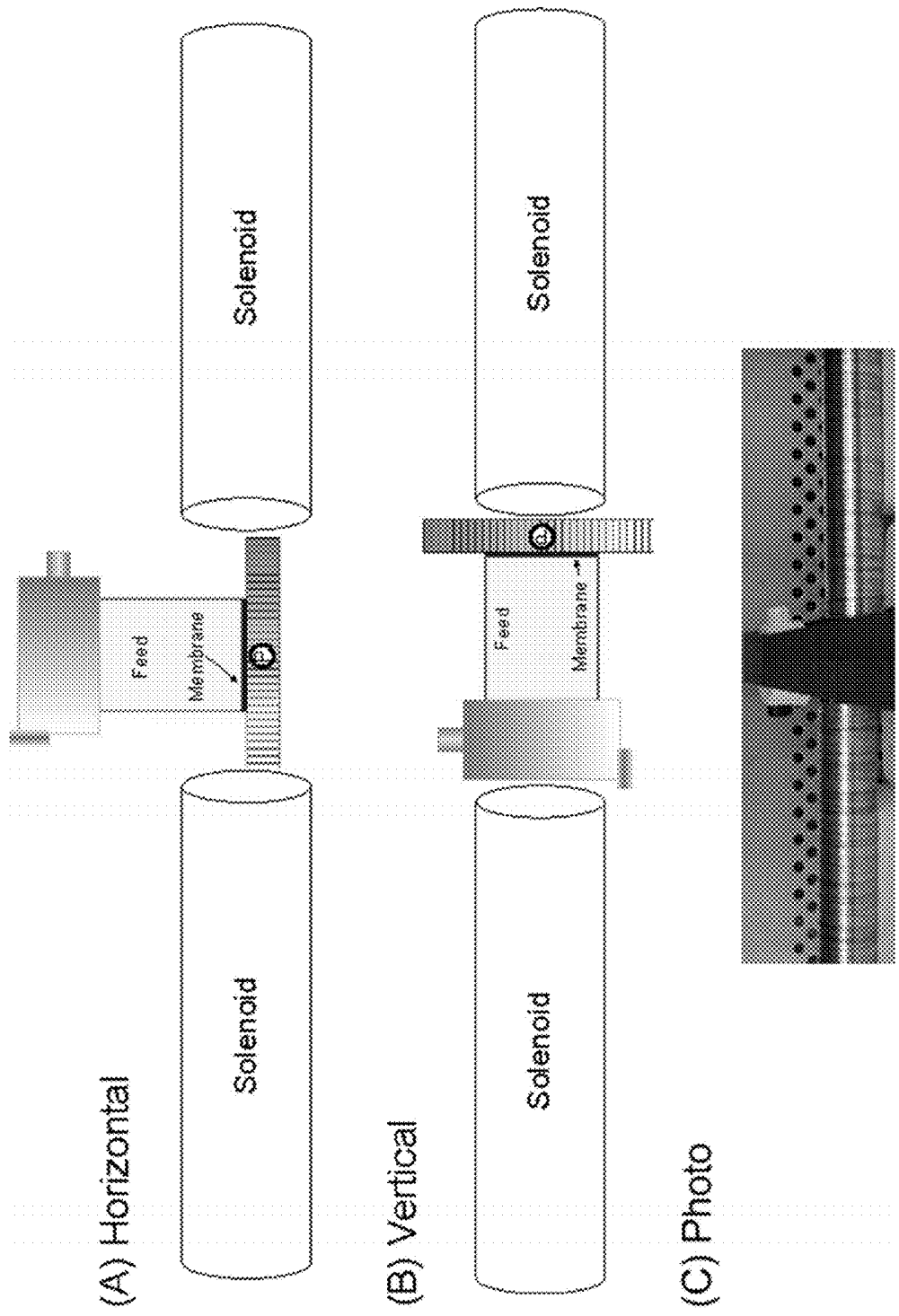
FIG. 30. Schematic showing (A) the horizontal and (B) the vertical field orientations as well as (C) a photo of the experimental setup in the horizontal orientation. The small P at the base of the membrane cell in (A) and (B) corresponds to the permeate line coming out of the page.

Magnetic fields were generated using a computer-controlled system comprising two iron-core solenoids located on opposite sides of the stirred cell; see FIG. 30. The power supplied to the solenoids was tuned to yield a field strength of 50 G at the center of the membrane cell, measured by a probe HHG-23 Gauss/Teslameter (Omega Inc., Stamford, Conn.). Static fields were produced by continuous powering. Dynamic fields were produced by alternatively powering each solenoid. Dynamic fields were operated at a frequency of 9 Hz, which was found to yield enhanced mixing above the membrane surface.

Membrane Zeta Potential.

The zeta potential of unmodified and grafted membranes was measured by using a custom built setup for streaming potential analysis (see Lettmann et al., *J. Mem. Sci.* 159 (1999) 243-251; Rodemann et al., *J. Mem. Sci.* 104 (1995) 147-155). The measurements were always started at ~pH 9 in a $10^{-3}$ M KCl in water solution; dilute HCl in water solution was added to obtain multiple pH values over the range 2-7. The streaming current was measured and converted to the zeta potential using the Helmholtz-Smoluchowski model.

$$\varsigma = \frac{\eta \cdot \kappa \cdot \Delta E_{SP}}{\varepsilon_o \cdot \varepsilon_r \cdot \Delta P} \quad (3)$$

Here $\eta$ is the viscosity of the feed, $\kappa$ is the conductivity of the feed, $\varepsilon_o$ is the permittivity of free space, $\varepsilon_r$ is the permittivity of the feed, $\Delta E_{SP}$ is the streaming potential, and $\Delta P$ is the transmembrane pressure. All zeta potential experiments were performed in tangential flow mode, and the average value of four measurements at each pH is reported.

Field Emission Scanning Electron Microscopy (FESEM).

FESEM was used to image the surface and cross section of the membrane to visualize the presence of nanoparticles and verify that the functionalization did not damage the structural integrity of the membranes. To prevent pore collapse, critical point drying was performed prior to analysing samples with a JEOL field-emission scanning electron microscope (JSM-6500F, JEOL Ltd., Tokyo, Japan). Membranes for cross sectional imaging were placed in liquid nitrogen for 10 seconds and then cracked.

X-Ray Photoelectron Spectroscopy (XPS).

XPS is particularly useful for studying membrane surface chemistry; i.e. the topmost 1-10 nm of the sample. A Physical Electron 5800 ultra-high vacuum XPS-Auger spectrometer (Chanhassen, Minn.) was used. 20 scans at high resolution of 0.1 eV focusing on individual regions of interest were averaged to characterize small changes in the surface chemistry with respect to Br, Fe, and 0.

Membrane Functionalization Results.

Figure 31:
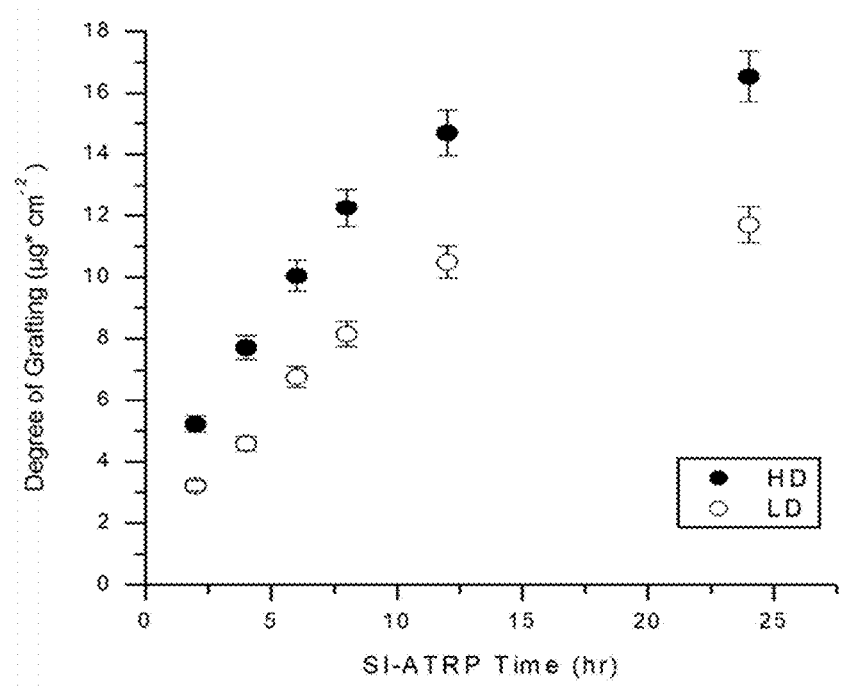
FIG. 31. Average degree of grafting (DG) for polyHEMA SI-ATRP for both high density (HD) and low density (LD) membranes.

Degree of grafting (DG) was calculated to determine the amount of polyHEMA grown from the membrane surface. FIG. 31 shows the average DG versus time for SI-ATRP for both HD and LD membranes. In both cases, grafting initially followed a linear trend before leveling out. This trend was observed for SI-ATRP of other similar polymers as described in the previous examples. The greater number of initiation sites for HD membranes yielded a greater DG. The LD membranes showed less variance than the HD membranes due to the lack of pretreatment to adjust the surface chemistry. The variability of data for both HD and LD increased with increasing SI-ATRP reaction time. The departure from linear growth indicates that the frequency of termination events increases at longer polymerization times.

Figure 32:
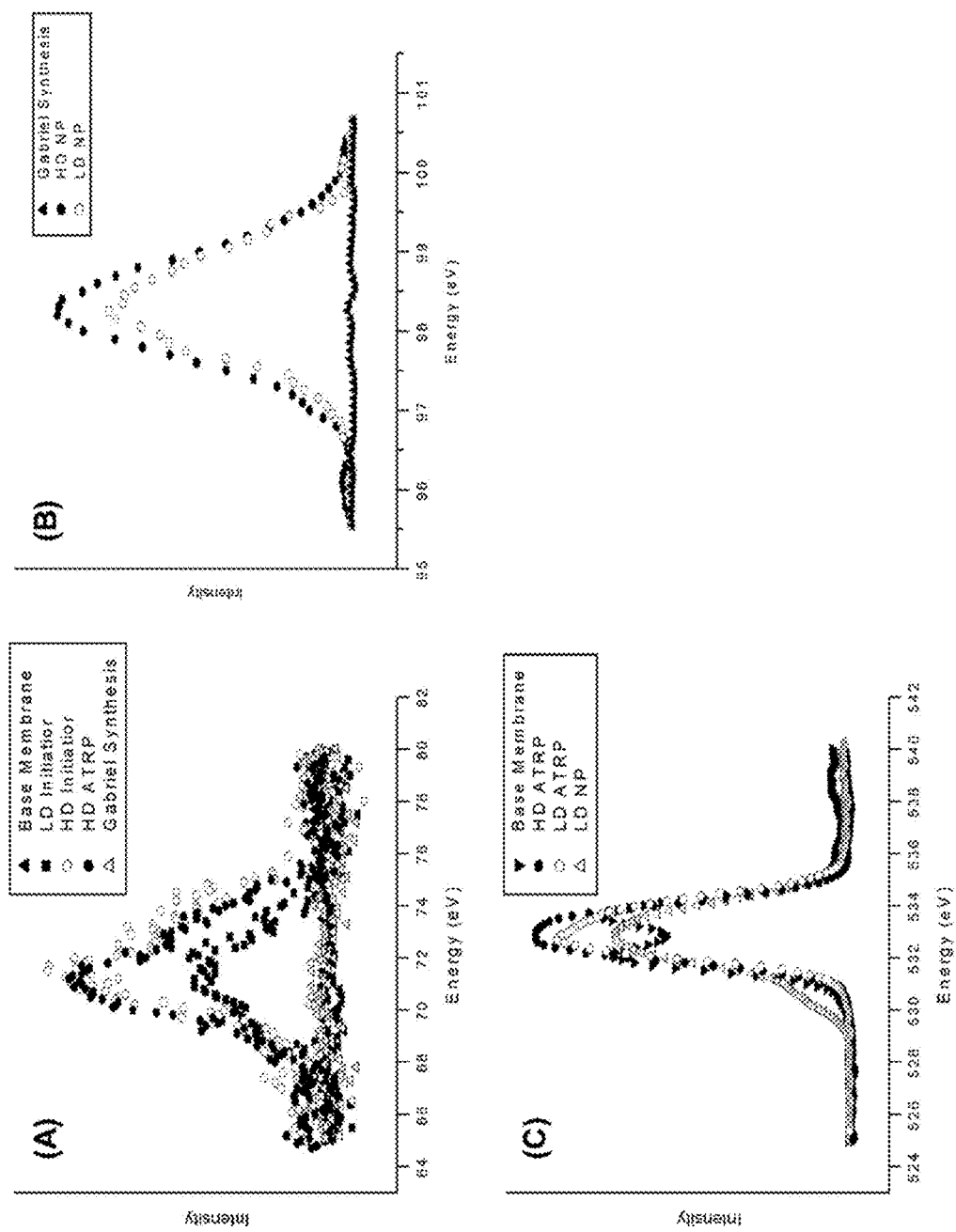
FIG. 32. High resolution XPS spectra for bromine (A), iron (B), and oxygen (C) regions. Data for LD membranes after ATRP in the bromine region and HD membranes after nanoparticle attachment in the oxygen region were excluded for clarity.

All stages of membrane functionalization were monitored using XPS to observe compositional changes in the topmost few nanometers of the membrane. The regions of interest for direct evidence of the various stages of modification were bromine (Br3d) and iron (Fe3s); the oxygen (O1s) region served as supporting evidence. Spectra for the bromine region are shown in FIG. 32a. Because the unmodified PET membranes contained no bromine, there was no associated peak for the base membrane. After initiator immobilization a distinct peak (71.5 eV) developed due to the presence of the bromine-capped initiator groups. The height and area of the HD peak were larger than for the LD peak, confirming that the HD protocol successfully led to greater initiator density. Following ATRP, the bromine peak for HD and LD was practically identical to the respective data following initiator immobilization. This is to be expected because the number of bromine atoms should be equal for both the initiator immobilized and ATRP-grafted states (cf. FIG. 29). The post Gabriel synthesis membranes showed no measurable bromine peak, which suggested that most, if not all, of the bromine sites on the end of the polyHEMA chains were successfully converted to amino groups. Analysis of the nitrogen region spectra (Example 2) supports this because no nitrogen peak was observed following initiator immobilization, but a strong nitrogen peak appeared following the Gabriel synthesis (cf. FIG. 29).

Figure 33:
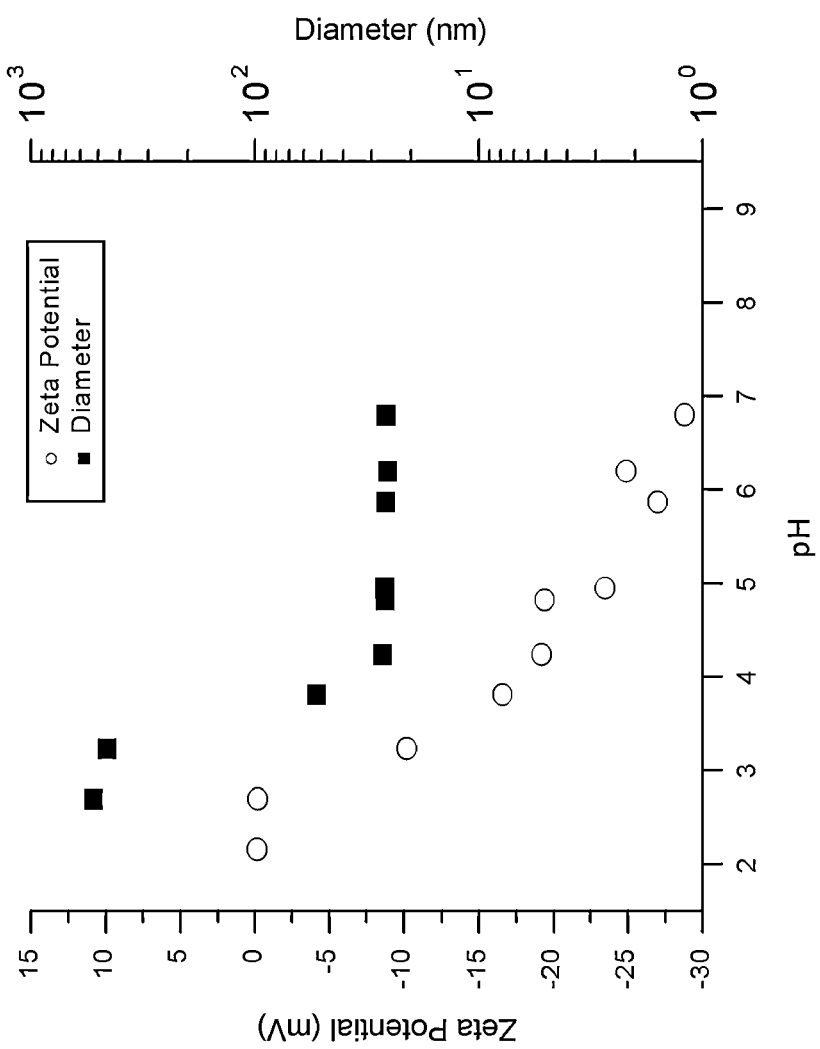
FIG. 33. Average zeta potential and average diameter of the free nanoparticles dispersed in water as a function of pH. The size of the data points represents the measurement uncertainty.

FIG. 33 shows the effect of pH on zeta potential and diameter of the iron oxide nanoparticles when freely dispersed in water. The nanoparticles had a consistent average diameter of ~25 nm above pH 3.8, confirming the 15 nm iron oxide core with a ~5 nm carboxylic acid shell as described by the manufacturer; however, the nanoparticles rapidly aggregated below pH 3.5 due to neutralization of the surface charges on the nanoparticles. For this reason all functionalization protocols and applications of the membranes remained at pH values greater than 4 to prevent aggregation. Secondly, FIG. 33 shows that at pH values greater than 6 the nanoparticles were strongly negatively charged. The absolute zeta potential decreased with decreasing pH. This can be explained by the effect of pH on the carboxylic acid coating of the nanoparticles, which can become deprotonated (negative charge) at more alkaline conditions and protonated (neutral) in more acidic conditions.

Figure 34:
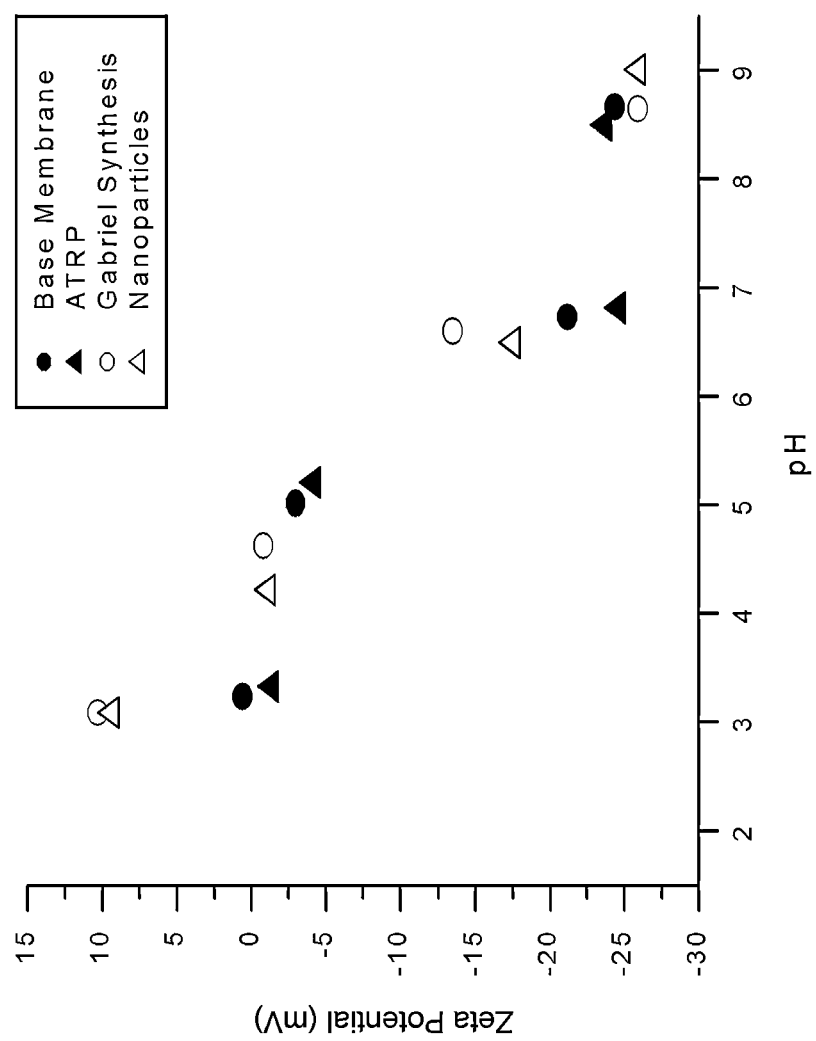
FIG. 34. Zeta potential vs. pH for the modified membranes after various steps in the modification procedure. The size of the data points represents the measurement uncertainty.

FIG. 34 shows the effect of pH on the zeta potential of the membrane surface at various stages of functionalization. The nonfunctionalized PET membrane was strongly negative above pH 6. As the pH decreased the zeta potential decreased linearly until pH ~5 before it became slightly positive between pH 3 and 4. The amine-capped chains following the Gabriel synthesis lead to a less negative potential which became positive around pH 4.5, matching well with known behavior for amines. Finally, the coupling of the nanoparticles to the end of the grafted chains decreased the zeta potential slightly again, agreeing with behavior for the freely dispersed particles (cf. FIG. 33).

SEM was performed on samples of the membranes at various stages during functionalization. The three cross-sectional images of the membranes at 35,000 fold magnification were obtained. The highly cylindrical pores and smooth interior surface of the PET 400 membranes were observed. The apparent roughness of the membrane was noticeably increased following polyHEMA ATRP because the polymer chains in the dry state agglomerated on the pore wall making it appear rougher. No discernible difference was seen between LD and HD membranes at this stage. Finally, an HD membrane was imaged to observe the numerous nanoparticles present following coupling. The nanoparticles covered large areas of the pore walls. LD membranes had a similar appearance; however, they did not have as many nanoparticles present. The size of the nanoparticles is roughly 25 nm, which agrees with manufacturer data and the DLS data shown in FIG. 33.

Effect of Functionalization on Average Pore Diameter.

Figure 35:
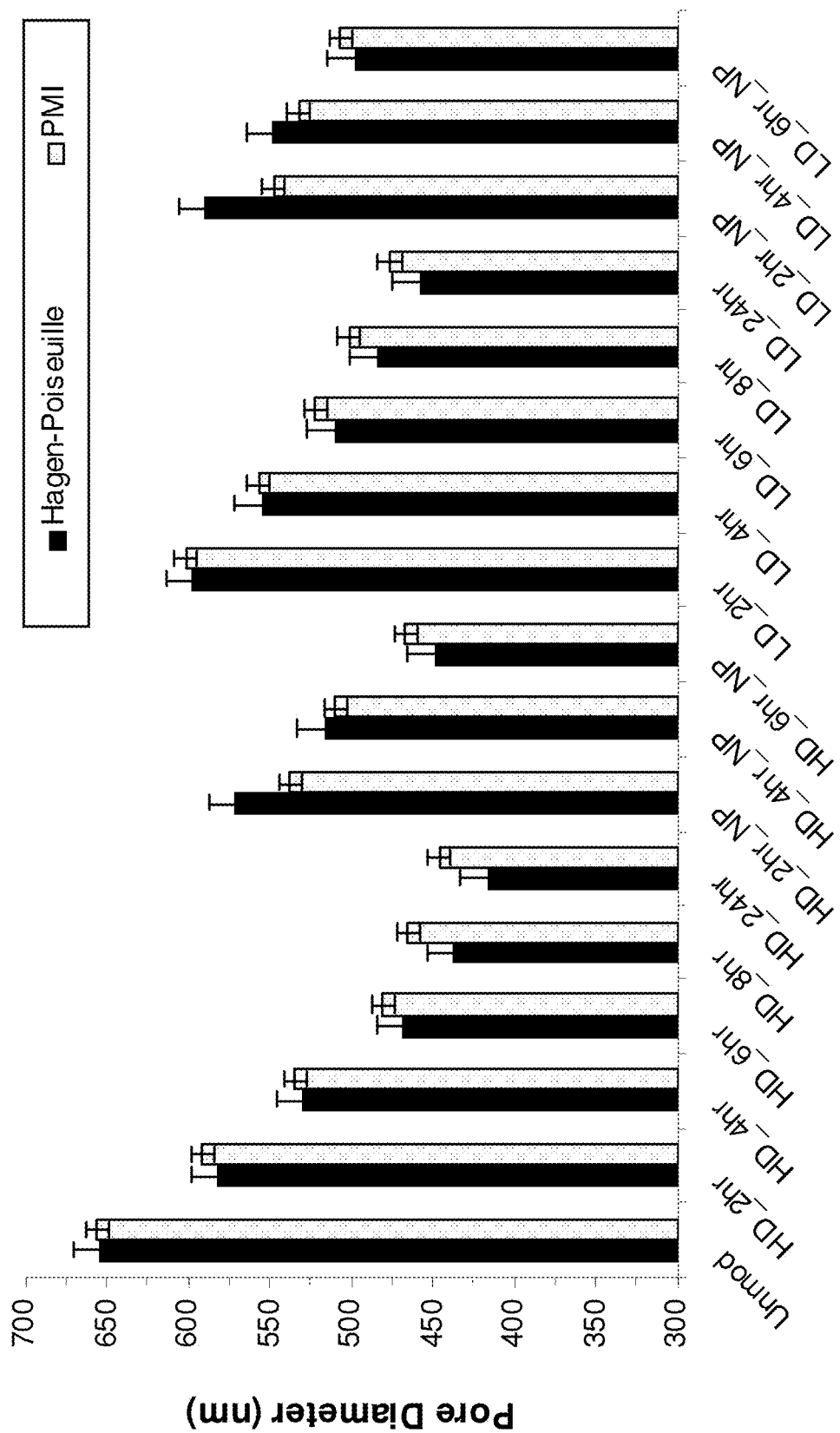
FIG. 35. Average pore diameter measured using the Hagen-Poiseuille (HP) equation in the wet state and permporometry (PMI) in the dry state.

Eight successfully modified membranes for each high and low grafting density were used to determine the effect of functionalization and, subsequently, of a magnetic field on pore diameter and flux. FIG. 35 presents the average pore diameter of the dry membranes following each functionalization step for the HD and LD membranes, measured using gas flow/pore dewetting permporometry. Because the polyHEMA chains grew within the membrane pores, longer SI-ATRP time lead to a greater decrease in membrane pore diameter. The HD membranes showed a greater decrease in pore diameter due to the increased density of polyHEMA chains, i.e., a thicker grafted layer, for the same polymerization time (chain length). The pore diameter decreased again following the nanoparticle coupling.

The average pore diameter was then estimated by performing membrane filtration experiments with purified water. By combining the measured membrane permeability with the Hagen-Poiseuille equation, the average pore diameter of the wetted membrane, also shown in FIG. 35, was calculated. It is assumed that no liquid flows within the polyHEMA nanolayer; the decrease in pore radius relative to the unmodified membrane is discussed as hydrodynamic layer thickness on the pore wall. As with the permporometry data, the pore diameters decreased with increasing ATRP reaction time, with the HD membranes again having a greater decrease for the same reaction time. The difference in values obtained from the two pore diameter methods can be attributed to the swelling of the grafted polyHEMA layer in the presence of water, similar to results for capillary pore membranes with other grafted hydrophilic polymers. The pore diameter decrease compared to the dry state data is more pronounced with increasing SI-ATRP time because the longer polyHEMA chains occupy more space when fully hydrated. Following nanoparticle coupling, the calculated pore diameter decreased slightly, in agreement with the permporometry data.

Effect of Magnetic Field on Membrane Performance.

Figure 36:
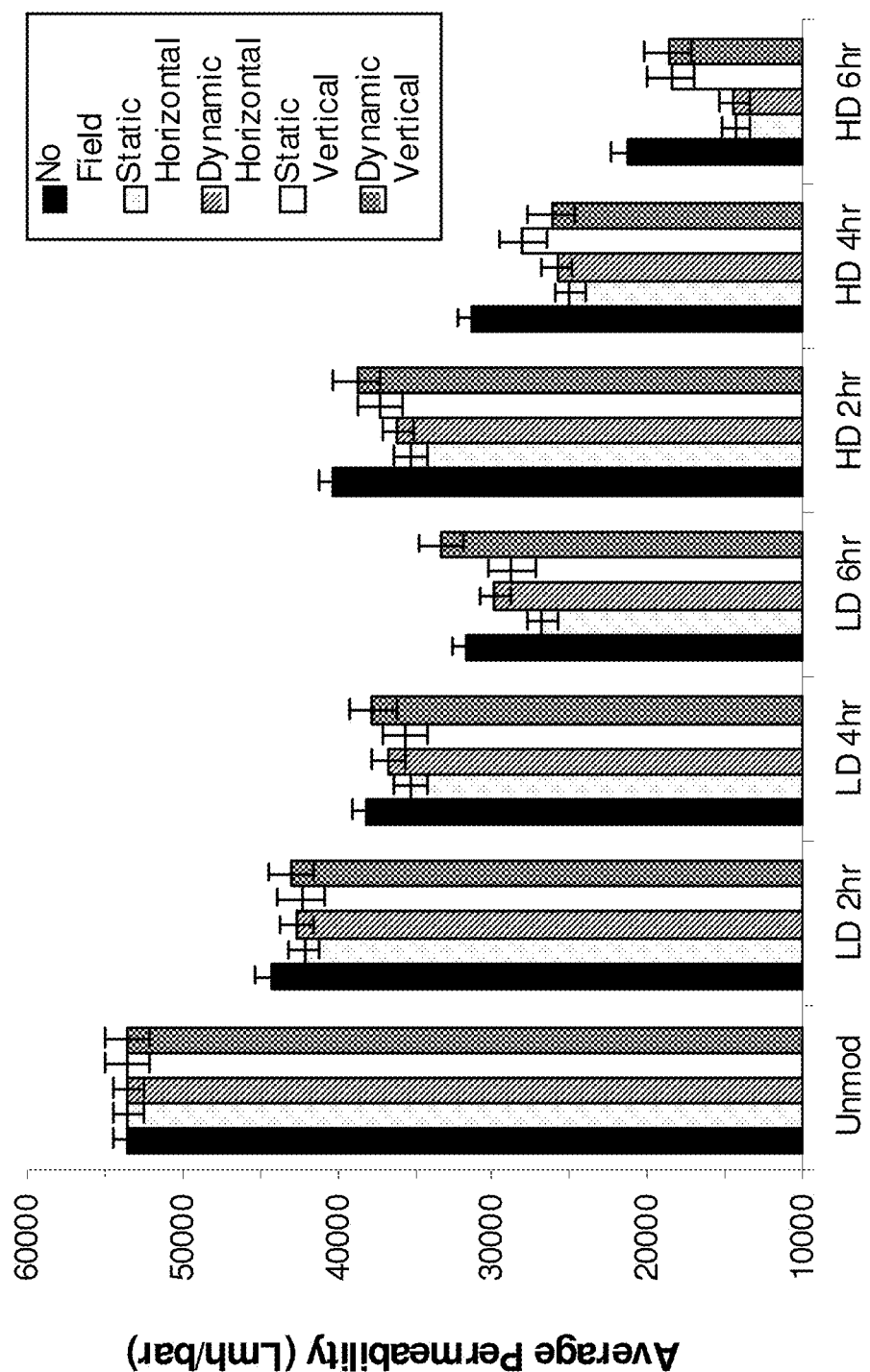
FIG. 36. Average membrane water permeability in the presence of both static and dynamic magnetic fields, both horizontal and vertical relative to the membrane plane.

The average flux through the membrane following HD and LD functionalization at different grafting times under different magnetic field conditions is presented in FIG. 36. The functionalization process caused a decrease in membrane permeability due to the hydrodynamic resistance of the grafted polyHEMA layer. Flux decreased with increasing SI-ATRP time (longer polyHEMA chains) and grafting density as expected. The hydrodynamic pore diameters discussed above (cf. FIG. 35) were calculated using these "No Field" flux data. The flux was also measured in static and dynamic magnetic fields in two different orientations, defined relative to the membrane surface: parallel/horizontal to the membrane surface and tangential/vertical to the membrane surface, see FIG. 30. The presence of a horizontal magnetic field leads to a slightly greater decrease in membrane flux for all the membranes tested than those in the presence of a vertical field. This is due to increased hydrodynamic resistance of the extended polyHEMA chains, described in detail below. The measured fluxes in a dynamic field were similar, but almost always slightly higher than those in a static field. Examples 1 and 2 showed that in an alternating field, the movement of the chains as they align with the changing field disrupted the liquid boundary layer directly above the membrane surface, by mixing generated by the moving chains, leading to a higher flux for the dynamic fields.

Figure 37:
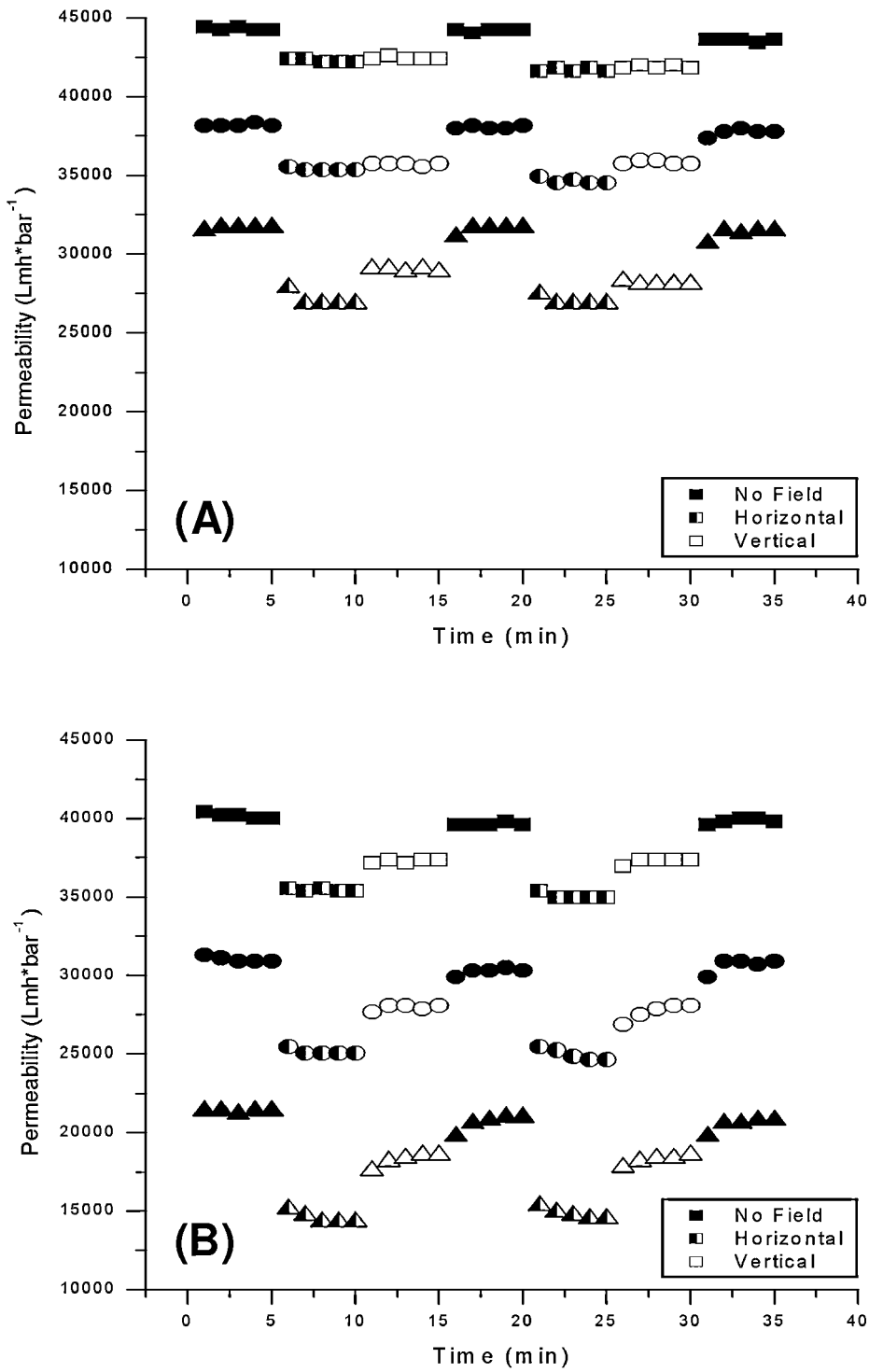
FIG. 37. Variation in water flux due to application of different static magnetic fields for LD (A) and HD (B) membranes, prepared by 2 (●), 4 (●), and 6 hours (◇) SI-ATRP.

An important aspect of the membranes is how quickly the membranes responded to the application of a field and the reversibility of this change. The flux as a function of time in the presence and absence of static magnetic fields is shown in FIG. 37. The permeability of unmodified membranes, a constant ~54,000 Lmh/bar, is not shown since no magnetic field effect was seen for nonfunctionalized membranes. Flux was measured for five minutes with no field present, then five minutes in a horizontal field, and finally five minutes in a vertical field. This cycle was then repeated. The magnetic field in both orientations lowered the flux as expected; however, what is important is that the flux for each field orientation was the same for the two cycles. Furthermore, after the magnetic field is removed the flux returned to its former value. This means the response was reversible, a key feature if these membranes are to be used as stimuli-responsive membranes. The response appeared to be slightly quicker for the shorter polyHEMA chains. Steric hindrance of the longer chains might slow the magnetic response somewhat.

Membrane Magnetic Response.

Figure 38:
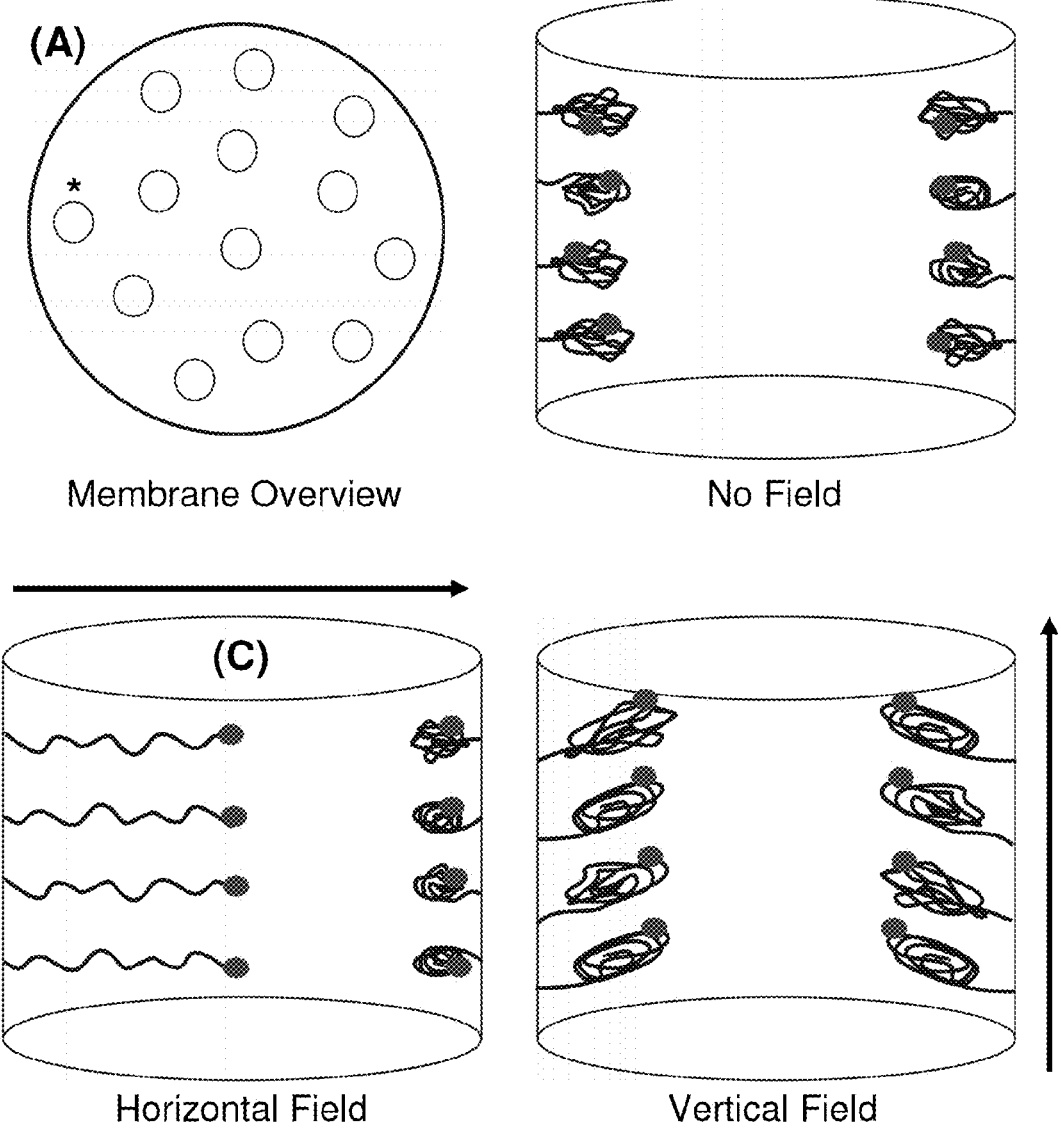
FIG. 38. (A) A top-down view of the membrane surface with multiple pores. The response of the polyHEMA chains within the pores will vary based on the physical location of the pore. The inside of the starred pore is shown as one example. (B) The grafted polyHEMA chains are relaxed coils in the most favorable position when no field is present. (C) In a horizontal field the chains on the left side of the pore will extend towards the middle of the pore while those on the right side will contract. (D) In a vertical field the coils will extend vertically and some chain segments will probably be forced to unfold thus leading to an overall more expanded conformation compared to (B).

The decrease in water flux for the functionalized membranes in the presence of a magnetic field can be explained by the hydrodynamic resistance associated with the physical conformation of the polyHEMA chains, conceptually illustrated in FIG. 38. The leftmost image shows the chains when fully hydrated. Because polyHEMA is fairly hydrophilic, the chains are free to occupy space in the most favorable (lowest energy) conformation. The grafted polyHEMA chains for both LD and HD will be in the "mushroom" regime; that is, the lowest energy state will be a random coil; however, for the HD functionalization the chains will be slightly stretched random coils due to steric hindrance from neighboring chains.

Superparamagnetic $Fe_3O_4$ nanoparticles have magnetic moments randomly oriented in the absence of an external field due to thermal excitation. However, in the presence of an external magnetic field, the magnetic moment of a nanoparticle will align with the applied field to minimize its energy. This alignment is achieved either by flipping the magnetic moment without physical rotation (Néel mechanism), or by rotating the particle physically (Brownian mechanism). In addition, the setup with two solenoids from either side of the membrane cell (see FIG. 30) creates a magnetic field gradient across the membrane. In a non-uniform magnetic field, the magnetic nanoparticles will move in the direction of the gradient. The magnetic force exerted on the nanoparticle is proportional to the magnetic moment and the magnitude of the gradient with $F=\mu\nabla B$, where $\mu$ is the magnetic moment and VB is the gradient. This magnetic force and the subsequent movement of the nanoparticles attached to the polyHEMA chain ends will alter the conformation of the polymer chains.

The direction of the gradient produced by the twin solenoid apparatus in the horizontal and vertical configuration is not necessarily strictly horizontal or vertical with respect to all the locations on membrane. This is particularly true towards either side of the solenoids; however, for this explanation, the fields will be assumed to be exactly horizontal and vertical. For a membrane pore surface modified with polyHEMA chains and coupled nanoparticles, all of the nanoparticles inside a pore will experience a force in the presence of a magnetic field.

When applying a horizontal field as shown in FIG. 38 with the gradient going from left to right, polyHEMA chains on the left side of the pore will be stretched towards the center of the pore structure. On the other hand, polyHEMA chains on the right will move toward the pore wall causing polyHEMA structures to be more condensed. Because polyHEMA chains will encounter more resistance upon condensing due to steric hindrance, the effective pore size will be decreased. This will cause the flux to decrease.

When applying a vertical field, the nanoparticles attached to the polymer chain ends will move in the direction of the gradient, and the polymer coils will be deformed in the vertical direction, thereby enforcing the unfolding of some segments. Because this deformation is just slightly expanding the condensed coil conformation, a smaller decrease in flux is observed compared to the horizontal field where a fraction of chains is stretched. Whenever the field is removed, the chains return to the most favorable (lowest energy) position, reducing the resistance to flow within the pore as seen in the leftmost image. That the changes are smallest for alternating fields can be a result of the rate of polymer relaxation. On the other hand, it has recently been shown for a different responsive polymer (poly-N-isopropylacrylamide) that the change of swelling (response to temperature) of a layer of about 100 nm is in the range of milliseconds (Naini et al., *Angew. Chem., Int. Ed.* 50 (2011) 4513-4516), although the overall effects were relatively small. Because the response is both significant and reversible, see FIG. 37, these membranes can be used as stimuli-responsive filtration membranes.

To quantify the degree of pore diameter change, the Hagen-Poiseuille equation was used to calculate the pore diameter of the wetted membranes in the presence of various magnetic fields. The average absolute decrease of pore diameter in nm and the actual calculated pore diameter for the functionalized membranes with no field present are shown in Table 6-1. The longer polyHEMA chains and higher grafting density (HD) impart a greater hydrodynamic resistance when extended, resulting in a greater pore diameter decrease than the LD membranes. Pore diameter decreased in both horizontal and vertical magnetic fields; however, the decrease is less drastic for vertical fields, as described above. Additionally, the slightly higher fluxes of the dynamic fields compared to the static fields, see FIG. 36, lead to smaller decrease in pore diameter, and even an increase in calculated pore diameter for the dynamic fields used with the LD membranes.

TABLE 6-1

Average absolute decrease of membrane pore size.

| | Actual Pore Diameter (nm) | Pore Diameter Decrease (nm) | | | |
|---|---|---|---|---|---|
| | No Field | Static Horizontal | Static Vertical | Dynamic Horizontal | Dynamic Vertical |
| LD 2 hr | 590 ± 2 | 1 ± 1 | 2 ± 1 | −1 ± 1 | −1 ± 1 |
| LD 4 hr | 548 ± 3 | 2 ± 1 | 2 ± 1 | 0 ± 1 | −5 ± 1 |
| LD 6 hr | 499 ± 5 | 2 ± 1 | 2 ± 1 | −7 ± 2 | −9 ± 1 |
| HD 2 hr | 572 ± 2 | 21 ± 1 | 15 ± 1 | 16 ± 1 | 9 ± 1 |
| HD 4 hr | 517 ± 5 | 24 ± 1 | 12 ± 1 | 14 ± 1 | 7 ± 1 |
| HD 6 hr | 449 ± 8 | 26 ± 2 | 11 ± 1 | 26 ± 2 | 7 ± 2 |

In Table 6-1, average absolute decrease of membrane pore size was calculated using the Hagen-Poiseuille equation. The pore diameter of the functionalized membranes with no field present is also provided. The negative numbers indicate an increase in calculated pore diameter corresponding to the increase in membrane flux observed for the dynamic fields used with the LD membranes.

The changes in pore diameter correspond to relative changes of up to 6% compared to when no field is present. However, considering the membranes with largest degree of functionalization and largest magnetic response, the grafted layer thickness in swollen state is 67 nm (for HD 4 hr) and 100 nm (for HD 6 hr), calculated using the hydrodynamic pore diameter of the unmodified membrane, 652 nm. These layers can, on average, be "stretched" by the applied magnetic field by 12-13 nm. This corresponds to a maximum of 18% (for HD 4 hr). This is a remarkable and can be applied to a variety of membranes. These results indicate the unique versatility of magnetically responsive polymer nanostructures to control membrane pore size without changing the conditions of the feed stream. The reversible response of these magnetically responsive nanostructures can be used to selectively switch the pore size of filtration membranes. In addition, as shown in the previous examples, in an oscillating magnetic field, these responsive polymer chains can suppress deposition of solute species on the membrane pore walls. The membranes described herein can be used in other applications such as "fluid steering" in microchips analogous to the work of Pappas and Holland (*Sensor. Actuat. B-Chem.* 128 (2008) 427-434) using thermally responsive phospholipids. An additional advantage of the system described herein is that all changes in resistance to flow down a given channel can be created by an external magnetic field.

Increasing the magnitude of change in pore diameter can also be achieved. SI-ATRP reaction time can be increased to maximize magnetic response. A stronger magnetic field can also be used to achieve a larger response. Additionally, applying this functionalization method to membranes of smaller pore diameter can yield an increased absolute change in pore diameter, which is advantageous with respect to remote control of membrane size selectivity. Hence, the membranes described herein are a versatile system that can be tailored to provide higher magnitudes of response based upon the needs of the chosen application.

Accordingly, track-etched PET membranes were used to characterize the functionalization and magnetic response of magnetically-responsive filtration membranes. Permporometry and hydraulic flux measurements yielded effective pore diameters in both the dry and wet states. XPS, SEM, and zeta potential characterized the membrane surface at various stages during the modification. The response of the superparamagnetic nanoparticles tethered to grafted polyHEMA chains in various magnetic field orientations showed that effective membrane pore size under filtration conditions can be changed via a "remote control" mechanism. This response is quick and reversible. The forced extension of the polyHEMA chains into the pore flow channel during application of a magnetic field introduces additional hydrodynamic resistance to fluid flow that decreases the effective pore diameter and by extension the flux through the membrane. This decrease in membrane flux is greater for horizontal fields. Longer chains (longer SI-ATRP times) and denser grafting (HD functionalization) yielded a greater decrease in flux and pore size in a magnetic field due to the greater contributions to hydrodynamic resistance. Membranes responsive to an external magnetic field have numerous applications because the pore diameter (and thus separation ability) of the membranes can be altered at any time. Moreover, the system described herein for altering the effective thickness of grafted polymer layers on a surface by an external magnetic field can be used for a variety of systems and applications.

Example 7

Modification of Cellulosic Ultrafiltration Membranes

The modification of cellulosic ultrafiltration membranes can be carried out as described below. One variation from the techniques described above is an expanded Gabriel synthesis procedure that avoids the use 6 M HCL, which can be advantageous for membranes that would degrade in the presence of a strong aqueous acid. The alternative procedure is highlighted by the Gabriel synthesis Steps 2 and 3 described below.

Each value below is for a specific embodiment and such values can be adjusted according to the knowledge of one skilled in the art to achieve a desired outcome with other membranes or polymerization procedures.

Pre-Wash Protocol:
1. Wash in methanol for 1 hour shaking at 200 rpm;
2. Wash in Milli-Q water for 21 hours shaking at 200 rpm;
3. Rinse briefly in ethanol; and
4. Dry overnight.

Initiator Immobilization Protocol (10% Initiator):
1. Distill acetonitrile;
2. Add 30.5 mg DMAP (4.88 mM), 643.5 µL TEA (90 mM), 0.1 mL BiB (16 mM), and 0.291 mL propionyl bromide (65 mM) to 50 mL of acetonitrile;
3. 4 mL of solution per membrane;
4. React for 90 minutes at room temperature, shaking at 200 rpm;
5. Wash membranes for 30 minutes with acetonitrile (twice) at 200 rpm;
6. Wash membrane with methanol and water for 15 minutes each at 200 rpm; and
7. Rinse membranes with ethanol and dry at 40° C. overnight.

ATRP Protocol:
1. Create ATRP solution and react with membranes under argon;
2. HEMA:CuCl:$CuCl_2$:BPy (100:0.5:0.1:1.5) ratio;
3. ATRP amounts used:
   a. 28.8 mL HEMA then add 1:1 methanol:water by volume to increase volume to 120 mL;
   b. 118.8 mg CuCl;
   c. 32.4 mg $CuCl_2$;
   d. 562.2 mg BPy;
4. Place membranes in reaction vessels;
5. Purge reaction vessels of air by an alternating vacuum and argon purge three times;
6. Add 20 mL solution to each membrane, so that each membrane is submerged;
7. Quench membranes in solution for at least 1 hour;
8. Rinse and wash in Milli-Q $H_2O$ bath for 30 minutes at 200 rpm;
9. Wash with acetonitrile for 15 minutes at 200 rpm (twice);
10. Wash in methanol for 15 minutes at 200 rpm;
11. Wash in $H_2O$ for 15 minutes at 200 rpm; and
12. Rinse in ethanol and dry overnight at 40° C.

Gabriel Synthesis Procedure (Step 1):
1. One gram of potassium phthalimide in 20 mL of ethanol;
2. Place each membrane in an individual vial;
3. Add 4.5 mL of the reaction solution to each vial;
4. Cap each vial and wrap in parafilm;
5. Wrap vials in aluminum foil and place in incubator at 40° C. and 300 rpm;
6. React for 6 hours;
7. Wash in ethanol @ 200 rpm for 30 minutes;
8. Wash in Milli-Q water @ 200 rpm for 15 minutes and repeat;
9. Wash in ethanol @ 200 rpm for 15 minutes; and
10. Dry overnight at 40° C.

Gabriel Synthesis Procedure (Step 2):
1. Weigh out 163 mg of sodium borohydride;
2. Add 1.3 mL of Milli-Q water and 7.7 mL of isopropanol for scale up; the volumetric ratio should be kept at ~(1:6 water:isopropanol);
3. Add the above solution to each membrane vial and cap;
4. Provide ventilation of reaction gas from the cap (gas is hydrogen); and
5. Wrap in parafilm and react for 24 hours.

Gabriel Synthesis (Step 3):
1. Add 0.9 mL of glacial acetic acid to the solution from Gabriel synthesis Step 2 (add gradually, waiting for the bubbling to subside before adding more);
2. Cap the flasks, provide ventilation and let react at 75° C. for 2 hours;
3. Rinse in Milli-Q water;
4. Wash in Milli-Q water for 15 minutes and repeat;
5. Wash in methanol for 15 minutes;
6. Wash in methanol/Milli-Q water solution for 15 minutes (preferably 1:1 by volume);
7. Wash in Milli-Q water for 15 minutes;
8. Wash in ethanol for 15 minutes; and
9. Dry overnight at 40° C.

Nanoparticle Attachment:
1. Add 31.2 mg 1-ethyl-3-(3-dimethylaminopropyl)carbodiimide (EDC) to 10 mL of Milli-Q water;
2. Add 30 µL of magnetic nanoparticles (5 g/L) to the solution and gently swirl;
3. Add 38.7 mg of N-hydroxysuccinimide to the solution;
4. Aliquot 2.5 mL of the reaction solution to each vial containing a membrane;
5. React for 4 hours in the dark;

6. Wash in Milli-Q water for 15 minutes;
7. Wash in Milli-Q water for 15 minutes;
8. Rinse in ethanol;
9. Wash in Milli-Q water for 10 minutes; and
10. Dry overnight at 40° C.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A magnetically responsive filtration membrane comprising:
    a filtration membrane polymer suitable for fluid filtration;
    a plurality of hydrophilic polymer brushes conjugated to the surface of the filtration membrane polymer; and
    a plurality of magnetic nanoparticles covalently bonded to the ends of a plurality of the hydrophilic polymer brushes, wherein the hydrophilic polymer brushes are movable with respect to the surface of the filtration membrane polymer surface in the presence of an oscillating magnetic field.

2. The filtration membrane of claim 1 wherein the filtration membrane polymer suitable for fluid filtration comprises a microfiltration (MF) membrane, a ultrafiltration (UF) membrane, a nanofiltration (NF) membrane, or a reverse osmosis (RO) membrane.

3. The filtration membrane of claim 2 wherein the filtration membrane polymer suitable for fluid filtration comprises a polyamide composite nanofiltration (NF) membrane or a polyester microfiltration (MF) membrane.

4. The filtration membrane of claim 3 wherein the filtration membrane polymer suitable for fluid filtration comprises a layer of a semi-aromatic poly(piperazinamide) of less than about 75 nm thick on top of a porous polysulphone membrane and a non-woven polyester support.

5. The filtration membrane of claim 1 wherein the hydrophilic polymers comprise poly(2-hydroxyethyl methacrylate) (PHEMA), poly(methacrylic acid) (PMAA), poly(acrylic acid) (PAA), or a combination thereof.

6. The filtration membrane of claim 1 wherein a plurality of the hydrophilic polymers are end-capped with superparamagnetic nanoparticles.

7. The filtration membrane of claim 6 wherein a plurality of the hydrophilic polymers are end-capped with superparamagnetic iron oxide magnetite ($Fe_3O_4$) nanoparticles having diameters of about 10 nm to about 100 nm.

8. The filtration membrane of claim 1 wherein the diameter of the magnetic nanoparticles is about 10 nm to about 500 nm.

9. The filtration membrane of claim 1 wherein the length of the hydrophilic polymer brushes is about 20 nm to about 120 nm.

10. The filtration membrane of claim 1 wherein the degree of grafting of the hydrophilic polymer brushes is about 10 $\mu g/cm^2$ to about 150 $\mu g/cm^2$.

11. A method of preparing a magnetically responsive filtration membrane comprising:
    installing hydrophilic polymers onto a surface of a filtration membrane polymer that is suitable for fluid filtration, to form a plurality of hydrophilic polymer brushes on the surface of the filtration membrane polymer; and
    covalently attaching a plurality of magnetic nanoparticles to ends of a plurality of the hydrophilic polymer brushes to provide magnetic nanoparticle end-capped hydrophilic polymer brushes, wherein the magnetic nanoparticle end-capped hydrophilic polymers are movable with respect to the surface of the filtration membrane polymer surface in the presence of an oscillating magnetic field.

12. The method of claim 11 wherein the hydrophilic polymer brushes are grafted to the surface of a filtration membrane polymer via controlled surface-initiated atom transfer radical polymerization (SI-ATRP), wherein the surface of the filtration membrane polymer comprises a thin layer of a semi-aromatic poly(piperazinamide) on top of a porous polysulphone membrane and a non-woven polyester support, and the hydrophilic polymer brushes are then end-capped with superparamagnetic nanoparticles.

13. The method of claim 12 wherein the superparamagnetic are superparamagnetic iron oxide magnetite ($Fe_3O_4$) nanoparticles having diameters of about 10 nm to about 100 nm, and the length of the hydrophilic polymer brushes is about 20 nm to about 120 nm.

14. A magnetically responsive fluid filtration system comprising:
    a magnetically responsive filtration membrane and an oscillating magnetic field apparatus;
    wherein a plurality of hydrophilic polymer brushes are attached to the surface of a filtration membrane polymer suitable for fluid filtration; and a plurality of magnetic nanoparticles are covalently bonded to the ends of a plurality of the hydrophilic polymers brushes, to form the magnetically responsive filtration membrane; wherein the hydrophilic polymer brushes are movable with respect to the surface of the filtration membrane polymer surface in the presence of an oscillating magnetic field;
    wherein the magnetically responsive filtration membrane is located inside an optionally pressurized filtration cell and the cell is located within the oscillating magnetic field apparatus so that a membrane barrier layer during filtration is normal to a magnetic field generated along a longitudinal axis of the oscillating magnetic field apparatus (solenoids).

15. The system of claim 14 wherein the alternating magnetic field apparatus comprises two solenoids.

16. The system of claim 15 wherein the alternating magnetic field apparatus is controlled by a CPU.

17. A method of filtering a fluid comprising passing a fluid through the system of claim 14 while applying an oscillating field to induce motion of the magnetic nanoparticles covalently bonded to the ends of the hydrophilic polymers, thereby reducing concentration polarization and membrane fouling.

18. The method of claim 17 wherein the magnetically responsive fluid filtration system effectively rejects one or more of colloids, aggregates, salts, metal ions, fatty acids, oils, and proteins.

* * * * *